(12) United States Patent
Barton et al.

(10) Patent No.: US 12,278,577 B2
(45) Date of Patent: Apr. 15, 2025

(54) POWER TOOL BATTERY PACK

(71) Applicant: BLACK & DECKER INC., New Britain, CT (US)

(72) Inventors: Alexander R. Barton, Baltimore, MD (US); Mark T. Cherry, White Marsh, MD (US); Timothy J. Hennesy, Baltimore, MD (US); William Thomas Lunsford, V, Towson, MD (US); Michael W. Roberts, Red Lion, PA (US); Nathan J. Osborne, Baltimore, MD (US); Elizabeth Wink, Baltimore, MD (US); Daniel F. Nace, Towson, MD (US); Philip Gilde, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/744,455

(22) Filed: May 13, 2022

(65) Prior Publication Data

US 2022/0368258 A1 Nov. 17, 2022

Related U.S. Application Data

(60) Provisional application No. 63/188,268, filed on May 13, 2021.

(51) Int. Cl.
*H02P 23/14* (2006.01)
*B25F 5/00* (2006.01)
(Continued)

(52) U.S. Cl.
CPC .......... *H02P 23/14* (2013.01); *H01M 10/482* (2013.01); *H01M 50/247* (2021.01); *B25F 5/00* (2013.01); *H01M 2220/30* (2013.01)

(58) Field of Classification Search
CPC .......... H02J 7/0024; H02J 5/00; H02J 7/0013; H02J 7/0022; H02J 7/0029; H02J 7/022;
(Continued)

(56) References Cited

U.S. PATENT DOCUMENTS

2003/0222607 A1* 12/2003 Simizu .................... B60L 50/52
318/139
2006/0087283 A1* 4/2006 Phillips ............... H01M 10/441
320/114
(Continued)

OTHER PUBLICATIONS

PCT International Search Report dated Aug. 25, 2022, issued in connection with PCT Application No. PCT/US22/29300.

*Primary Examiner* — Zoheb S Imtiaz
(74) *Attorney, Agent, or Firm* — Michael Aronoff

(57) ABSTRACT

The present directed to a cordless power tool system including a plurality of cordless power tools, a plurality of fixed voltage and multi-voltage battery packs and a plurality of battery pack chargers. The battery packs include circuitry to indicate various parameters about the battery pack and communicate this indication to the power tools in order to enable the power tools to alter their motor output schemes to improve performance. The indication may include whether the battery pack is a fixed voltage battery pack or a multi-voltage battery pack and when the multi-voltage battery pack is in a first configuration or a second configuration.

3 Claims, 54 Drawing Sheets

(51) Int. Cl.
*H01M 10/48* (2006.01)
*H01M 50/247* (2021.01)

(58) Field of Classification Search
CPC ..... H02J 7/045; H02J 7/00045; H02P 29/032; H02P 25/14; H02P 27/08; H02P 29/00; H02P 29/024; H02P 29/0241; B25F 5/00; B25F 5/02; H01M 10/0445; H01M 10/4207; H01M 10/425; H01M 50/20; H01M 50/209; H01M 50/213; H01M 50/244; H01M 50/247; H01M 50/296; H01M 50/502; H01M 50/543; H01M 50/572; H01M 50/588; H01M 50/597; H01M 10/441; H01M 10/46; H01M 2220/30; Y02E 60/10; Y02P 70/50
See application file for complete search history.

(56) References Cited

U.S. PATENT DOCUMENTS

| | | | |
|---|---|---|---|
| 2008/0231144 A1* | 9/2008 | Grant | H02J 7/1415 |
| | | | 310/339 |
| 2009/0015208 A1* | 1/2009 | White | B25F 5/00 |
| | | | 320/150 |
| 2018/0262152 A1* | 9/2018 | White | H02P 25/14 |
| 2019/0280630 A1* | 9/2019 | Kraft | H02P 23/14 |
| 2019/0312242 A1 | 10/2019 | Barton et al. | |
| 2021/0283761 A1* | 9/2021 | Schadow | A41D 1/002 |
| 2022/0001504 A1* | 1/2022 | Wiker | B27G 21/00 |

\* cited by examiner

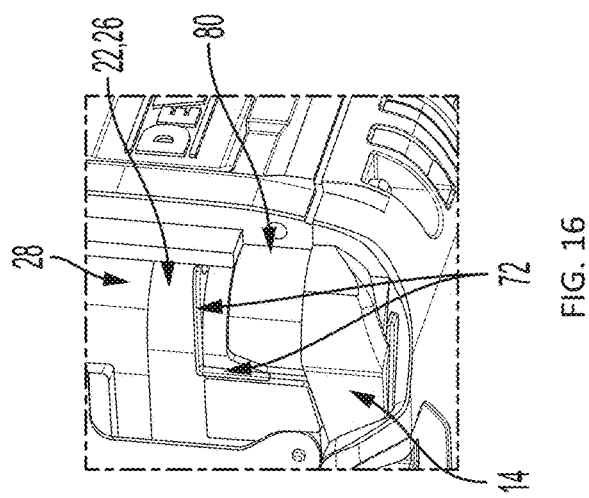
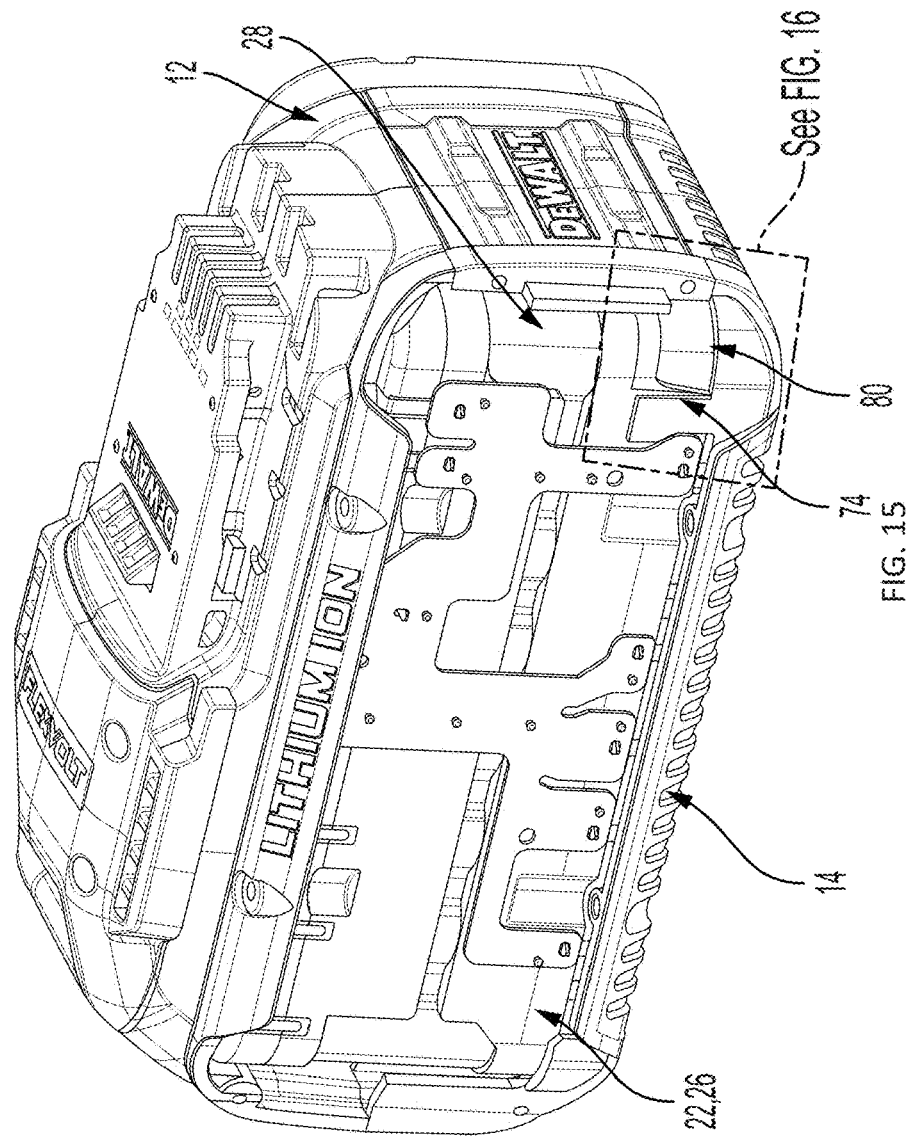

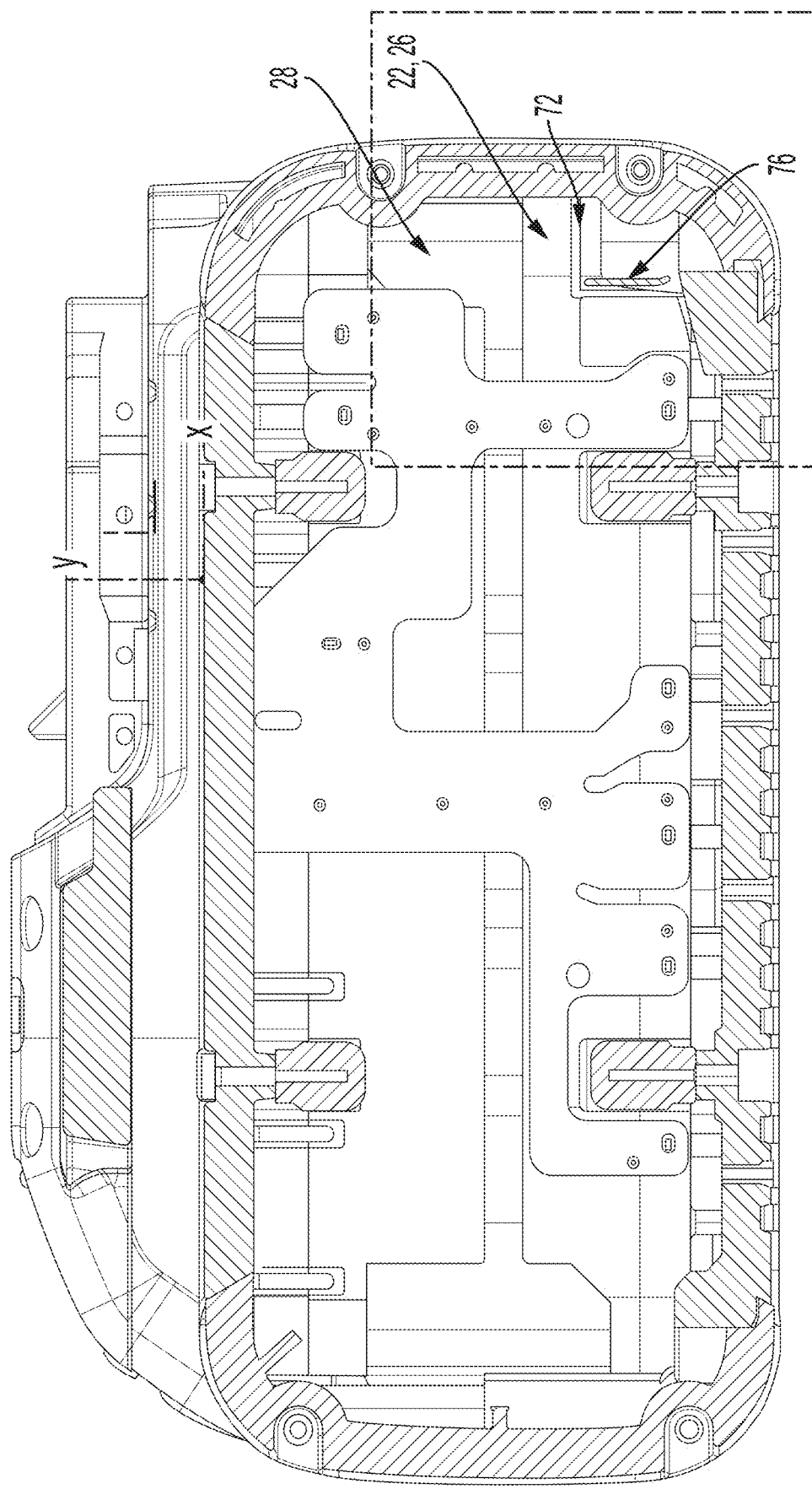

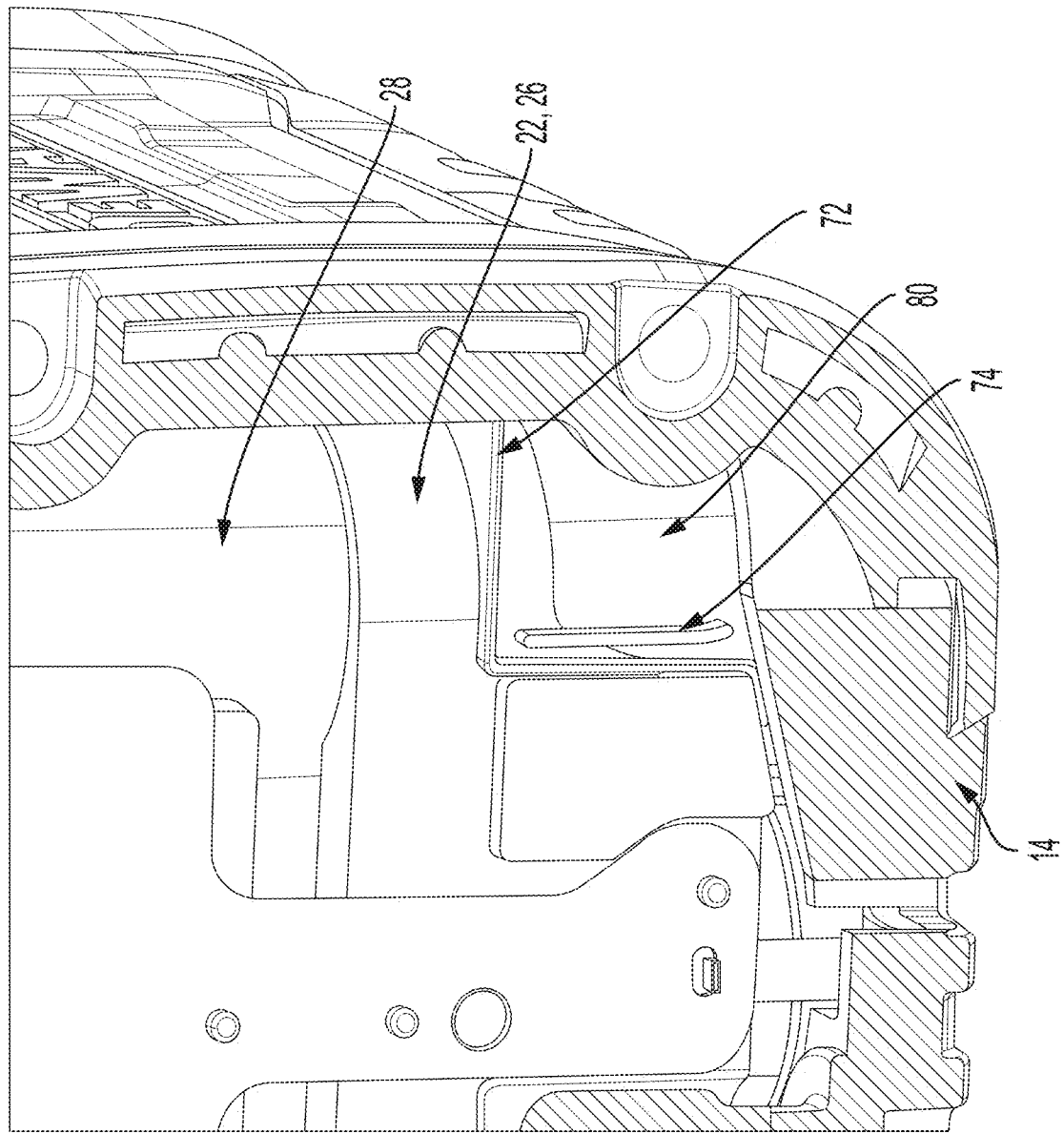

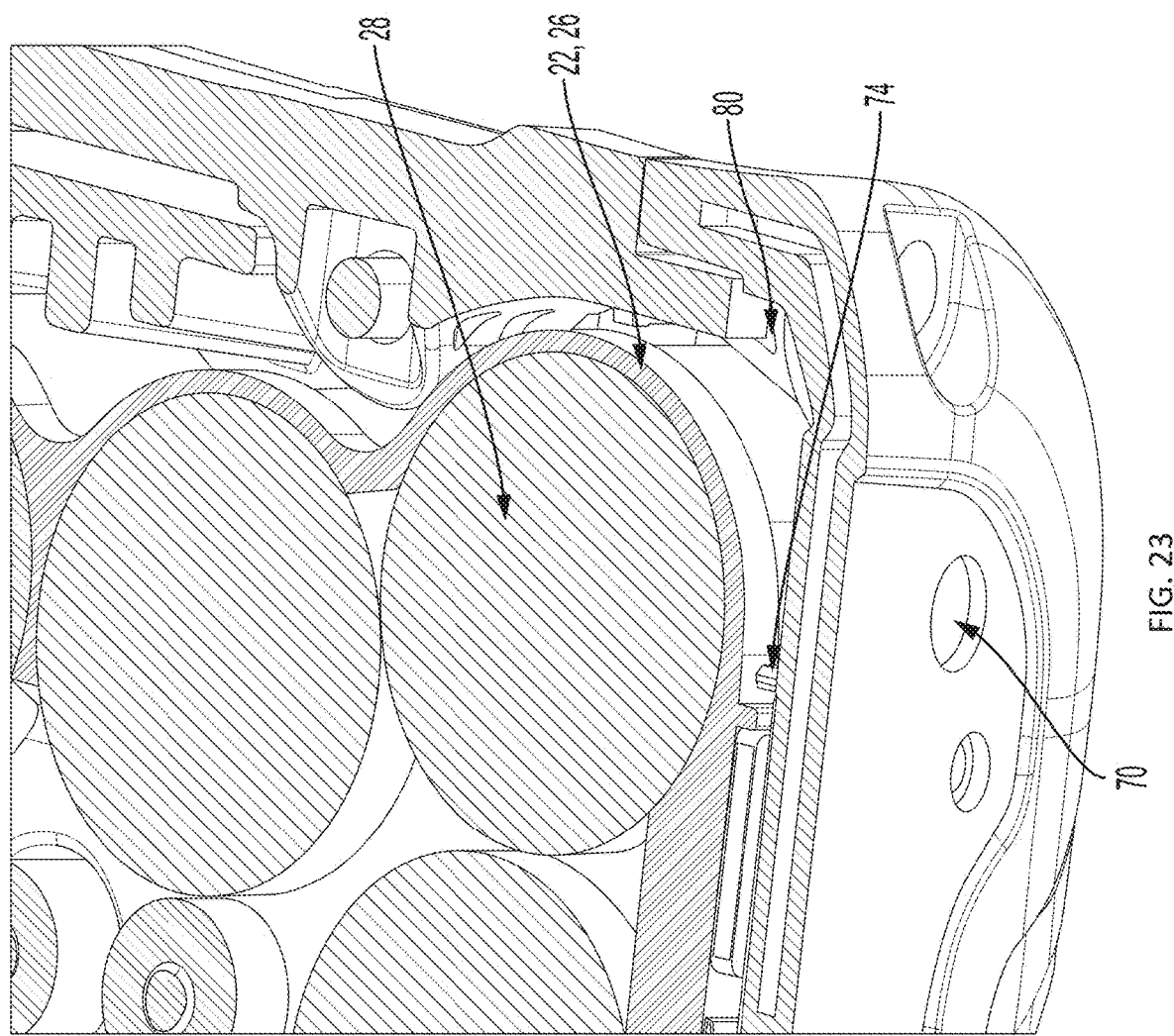

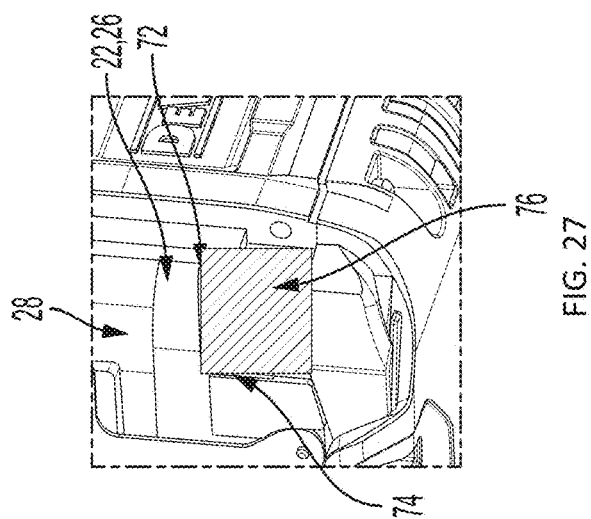
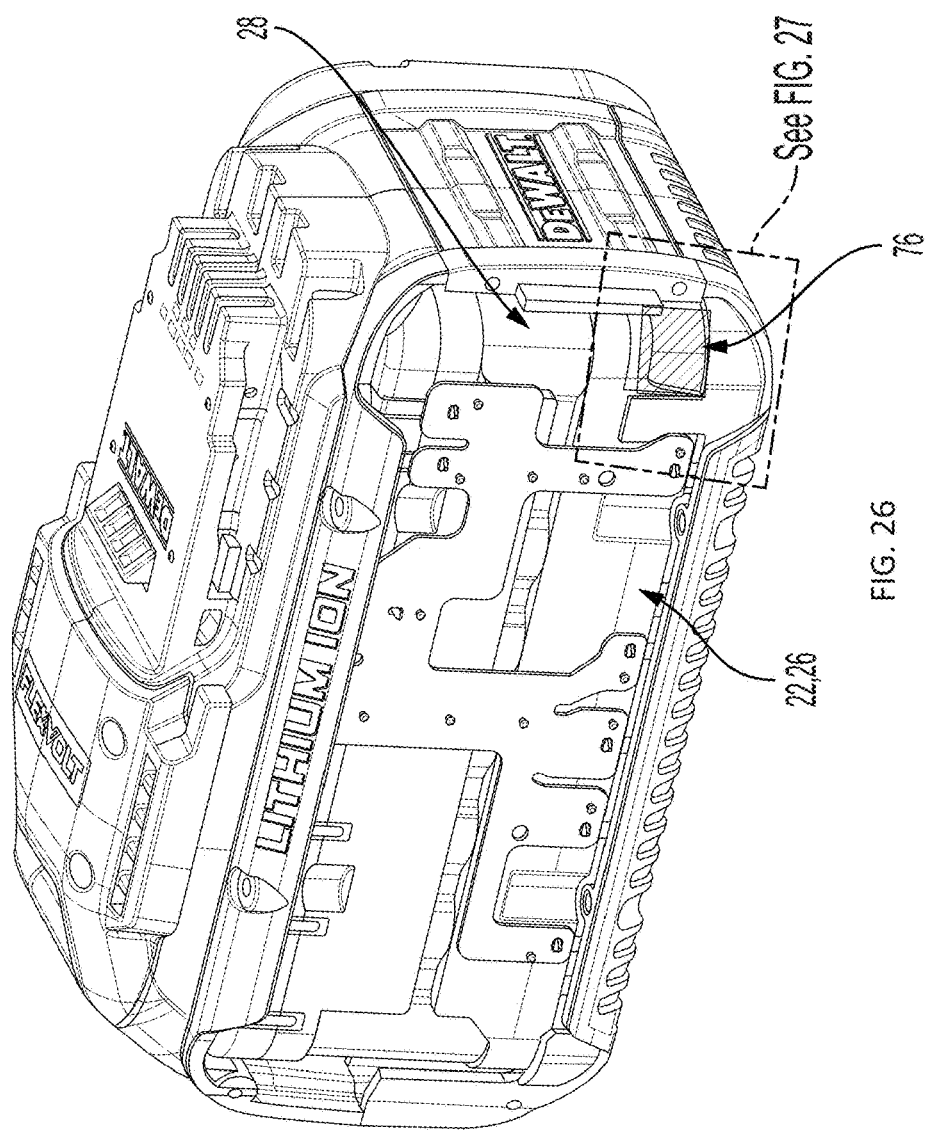

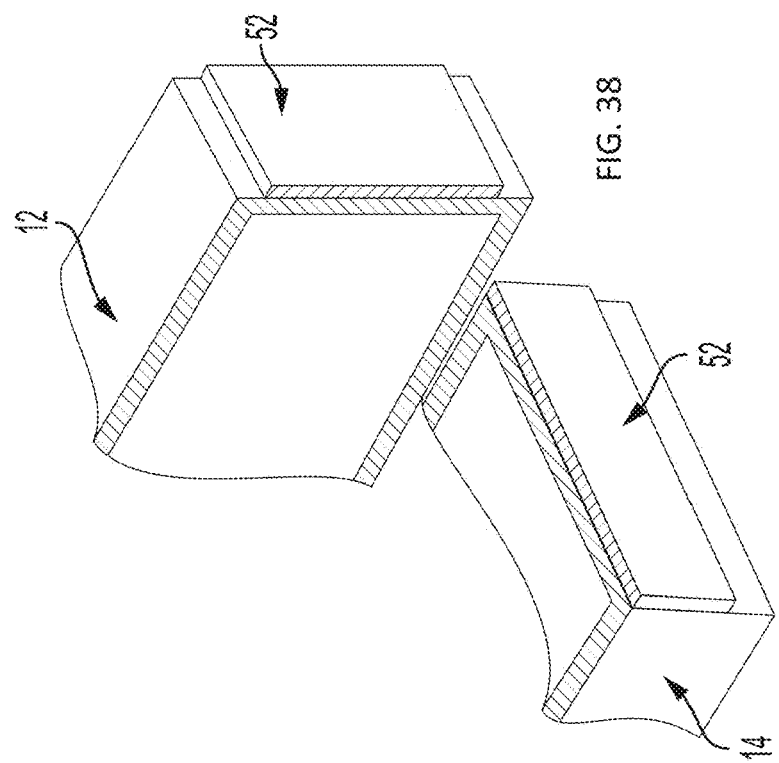
FIG. 38
FIG. 37
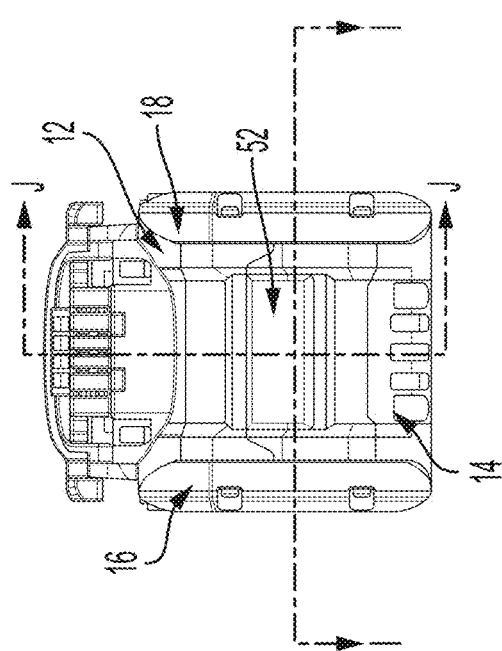
FIG. 35
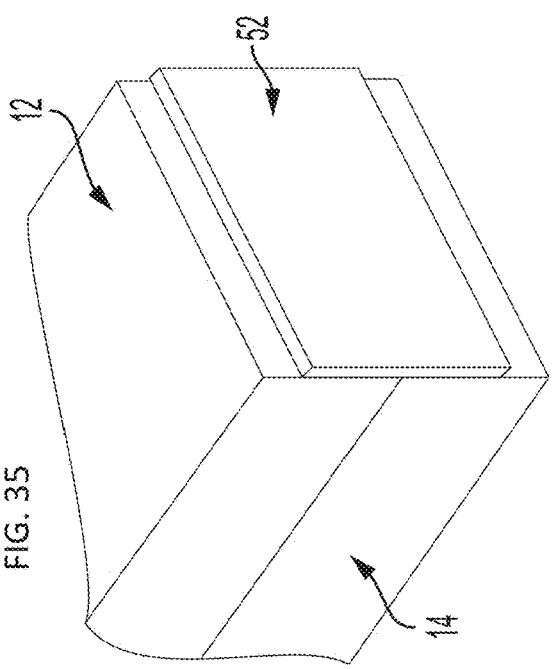
FIG. 36

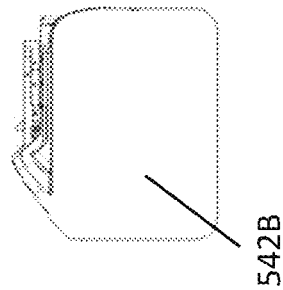
FIG. 45b
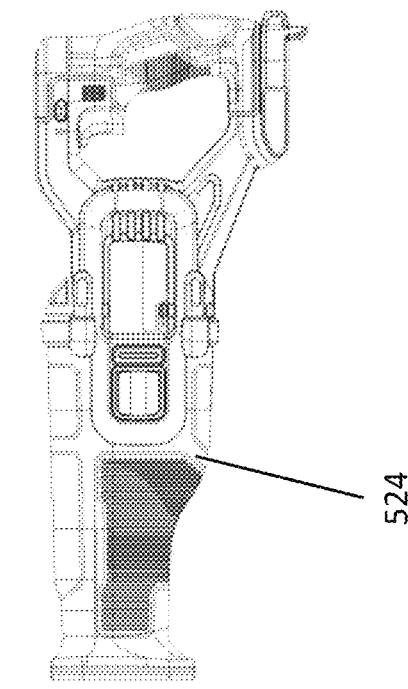
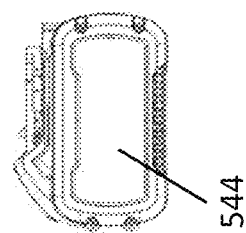
FIG. 46c
FIG. 46b
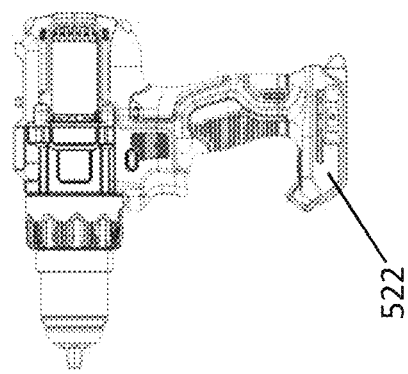
FIG. 45a
FIG. 46a

POWER TOOL BATTERY PACK

TECHNICAL FIELD

This application relates to a power tool battery pack and a method for manufacturing a power tool battery pack. In one implementation, the battery pack includes an adhesive or a glue in a compartment about an end of a battery cell to provide cushion and disperse forces if and when the battery pack is dropped.

BACKGROUND

When battery packs are dropped in a certain manner, it is possible for a battery cell that utilized a "can" format to deform and potential damage the cell.

In certain applications, a battery pack may be used in conjunction with a power tool. Certain power tools, such as grinders, may cause sparks to fly during operation. Due to the relative position of the battery pack to the flying sparks, the sparks may cause the plastic battery pack housing to melt. If the housing were to melt, holes could be created in the housing. Such holes could allow subsequent sparks or other contaminants to enter the housing and damage the internal components of the battery pack.

Battery packs include battery straps that couple the battery cells to a printed circuit board. If too much current flows through the battery strap the battery strap will overheat. In order to enable the battery pack to source as much current and power as possible and yet to prevent too much current from flowing from the battery cell to the printed circuit board it is common for the battery straps to incorporate a fuse address the situation in which too much current flows through the battery strap causing the battery strap to overheat. If the battery strap were to overheat, the nearby battery cells could be damage.

A power tool's performance is based in part on the battery pack that is providing power to the power tool. A power tool can not take full advantage of the resources of a connected battery pack if the battery pack does not include features to identify itself and its characteristics to the power tool. If the power tool cannot identify the characteristics of the battery pack it will be limited to the amount of work it can undertake.

The instant application describes various example battery packs that address the foregoing shortcomings of conventional battery packs.

SUMMARY

An aspect of the present invention includes a battery pack including an internal compartment or cavity defined by internal elements about an end of a battery cell and an adhesive or a glue in the compartment or cavity to absorb and/or disperse the force of an impact on the battery pack housing.

Another aspect of the present invention includes a battery pack including portion of the housing that has a melting temperature higher than the other portions of the housing.

Another aspect of the present invention includes a battery pack including a battery strap that includes a fuse portion of a first material and a remainder of the battery strap of a second material.

Another aspect of the present invention includes a battery pack being capable of operating at multiple output voltages and including a circuit that provides an indication to a coupled power tool that the battery pack is capable of allowing the power tool to operate at alternate/improved conditions. For example, if the battery pack provides the indication to the power tool, the power tool may operate at higher currents than it otherwise would.

Battery Strap with Fuse/Having Two Materials

Another aspect of the present invention includes a battery pack including a housing, a plurality of battery cells within the housing, a printed circuit board within the housing, a plurality of battery straps coupling the plurality of battery cells to the printed circuit board, at least one of the plurality of battery straps including a fuse.

The aforementioned battery pack, wherein the at least one of the plurality of battery straps includes a first portion and a second portion, wherein the first portion includes the fuse.

The aforementioned battery pack, wherein the first portion if a composed of a first material and the second portion is composed of a second material, the second material different than the first material.

The aforementioned battery pack, wherein the first portion is electrically and mechanically coupled to the first portion.

The aforementioned battery pack, wherein the first portion includes a first end and a second end and the second portion includes a first end and a second end, and the first portion first end is coupled to the printed circuit board, the second portion first end is coupled to at least one of the plurality of battery cells and the first portion second end is coupled to the second portion second end.

The aforementioned battery pack, wherein the first material is brass.

The aforementioned battery pack, wherein the second material is phosphor bronze.

Shield

Another aspect of the present invention includes a battery pack, including a housing composed of a first material and a second material, the second material forming a shield portion of the housing impacted by sparks during operation of a connected power tool.

The aforementioned battery pack, wherein the first material has a first melting temperature and the second material has a second melting temperature that is higher than the first melting temperature of the first material.

The aforementioned battery pack, wherein the first material is Polycarbonate Acrylonitrile Butadiene and the second material is glass filled nylon.

The aforementioned battery pack, wherein the housing includes an upper portion and a lower portion and the shield portion is positioned between the upper portion and the lower portion.

The aforementioned battery pack, wherein the shield portion is a discrete element and is affixed to the housing.

The aforementioned battery pack, wherein the second material is a metal material.

Another aspect of the present invention includes a battery pack, including a housing, the housing including an interface for coupling to a power tool, a section of the housing impacted by sparks during operation of the power tool and a section of the housing not impacted by sparks during operation of the power tool, the impacted section composed of a material and the not impacted section composed of a material different than the material of the impacted section.

The aforementioned battery pack, wherein the material of the impacted section has a melting temperature higher than the material of the not impacted section.

The aforementioned battery pack, wherein the impacted section is composed of a first material and a second material.

The aforementioned battery pack, wherein the first material is a plastic material and the second material is a metal material.

The aforementioned battery pack, wherein the impacted section is coupled to the housing.

The aforementioned battery pack, wherein the plastic material includes a pocket and wherein the metal material is positioned in the pocket.

The aforementioned battery pack, wherein the plastic material is formed about the metal material.

The aforementioned battery pack, wherein the impacted section is the plastic material and the metal material are coupled to the housing.

Pack Deformation Prevention

Another aspect of the present invention includes a battery pack, including a housing having a first side portion having an interior surface, a bottom portion having an interior surface, wherein a first portion of the interior surface of the first side portion abuts at least a first portion of the interior surface of the bottom portion, a plurality of battery cells, a battery cell holder, wherein the battery cell holder receives and holds the plurality of battery cells in a fixed relation to each other, and the battery cell holder and the plurality of battery cells are housed within the housing, a cavity formed by a second portion of the interior surface of the first side portion, a second portion of the interior surface of the bottom portion, a portion of the cell holder and a portion of at least one of the plurality of battery cells, and an adhesive formed in the cavity.

The aforementioned battery pack, wherein the first side portion includes an injection port extending from an exterior surface of the first side portion to the cavity.

The aforementioned battery pack, wherein the adhesive is injected into the cavity through the injection port.

The aforementioned battery pack, further comprising a rib on the interior surface of the first side portion extending from the interior surface of the first side portion toward the cell holder.

The aforementioned battery pack, further comprising a rib on the interior surface of the bottom portion extending from the interior surface of the bottom portion toward the cell holder.

The aforementioned battery pack, wherein the battery cell holder includes a wall generally perpendicular to the first side portion forming, in part, the cavity.

The aforementioned battery pack, wherein the adhesive encases at least a portion of the at least one of the plurality of battery cells.

Implementations of this aspect may include one or more of the following features.

Advantages may include one or more of the following.

These and other advantages and features will be apparent from the description and the drawings.

BRIEF DESCRIPTION OF THE DRAWINGS

FIG. 15 is a left, front isometric view of the battery pack of FIG. 13.

FIG. 16 is a detail view of the battery pack of FIG. 15.

FIG. 19 is another section view of the battery pack of FIG. 9 along lines F-F.

FIG. 20 is a detail view of the battery pack of FIG. 19.

FIG. 23 is a detail view of the battery pack of FIG. 22.

FIG. 26 is a view of the battery pack of FIG. 15 including an adhesive.

FIG. 27 is a view of the battery pack of FIG. 16 including an adhesive.

FIG. 35 is front elevation view of another example battery pack.

FIG. 36 is a simplified partial left, front isometric view of the battery pack of FIG. 35.

FIG. 37 is a simplified partial left, front isometric, section view of the battery pack of FIG. 35 along lines I-I.

FIG. 38 is a simplified partial left, front isometric view of the battery pack of FIG. 35 along lines J-J.

FIGS. 45a and 45b are illustrations of example power tools of the power tool and battery pack system of FIG. 44.

FIGS. 46a, 46b, and 46c are illustrations of example battery packs of the power tool and battery pack system of FIG. 44.

DETAILED DESCRIPTION

Figure 2:
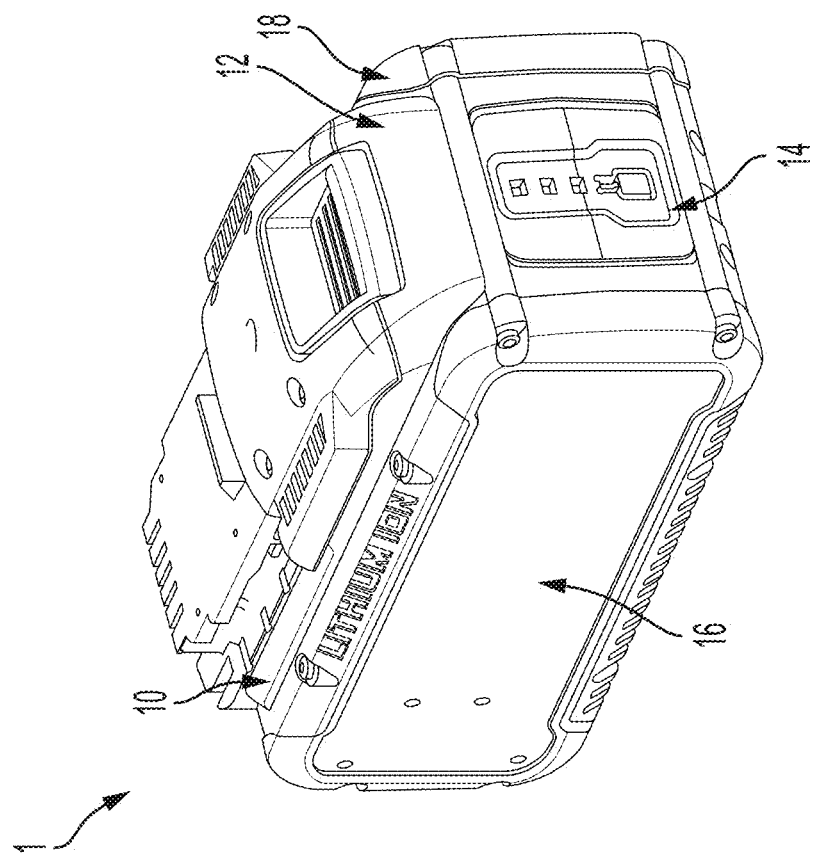
FIG. 2 is a right, rear isometric view of the battery pack of FIG. 1.
Figure 1:
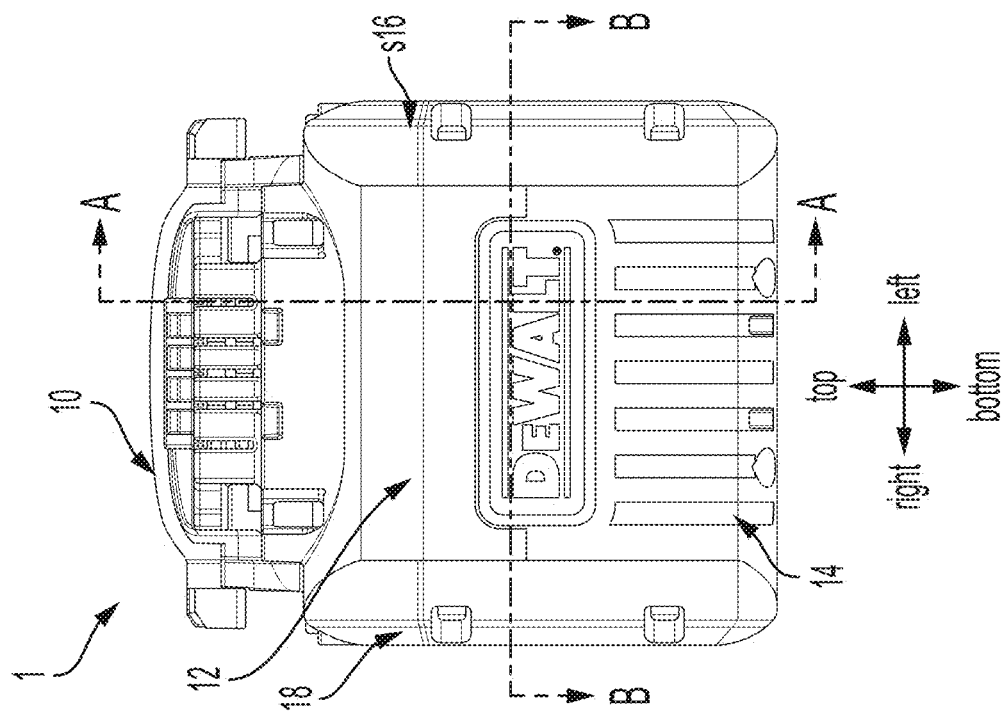
FIG. 1 is front elevation view of an example battery pack.

Referring to FIGS. 1-8, a first example embodiment of a battery pack is illustrated. For purposes of discussion but without limiting the example battery pack, the battery pack includes a front side—illustrated in FIG. 1. The battery pack also includes a left side, a right side, a top side, a bottom side and a rear side—from the perspective of FIG. 1. These sides form a housing. The housing includes an upper portion, a lower portion, a first side cover (left side), and a second side cover (right side). The various portions of the housing may be made of a plastic material, such as Polycarbonate Acrylonitrile Butadiene (PC-ABS) or other similar materials having a softening temperature of about 100° C.

As illustrated in FIGS. 4-8, the battery pack includes a core pack 20 positioned within the housing 10. The core pack 20 includes a cell holder 22. The cell holder 22 includes an upper portion 24 and a lower portion 26. The core pack 20 also includes a plurality of battery cells 28 positioned within the cell holder 22. The core park 20 also includes a terminal block 30. The terminal block 30 includes a housing 32 and a plurality of battery pack terminals 34 positioned within the terminal block housing 32. The core pack 20 also includes a printed circuit board (PCB) 36. The PCB 36 includes a plurality of various components attached thereto, including but not limited to resistors, integrated circuits, connectors, and other components.

The battery pack terminals 34 are electrically coupled to the PCB 36. The core pack 20 also includes a plurality of battery straps 38. The battery straps 38 electrically couple the battery cells 28 to the PCB 36. The battery cells 28 may include a plurality of sets 40 (or blocks) of battery cells 28. (See for example, FIGS. 48-53) Each set 40 of battery cells 28 may include a plurality A of battery cells 28. The plurality A of battery cells 28 may be electrically coupled in series. As such, each set 40 of battery cells 28 may include a most positive terminal/node A+ (or A1+/A2+ or B+ or C+ or B1+/B2+ or C1+/C2+, as the case may be depending upon the circuit configuration) and a most negative terminal/node A− (or A1−/A2− or B− or C− or B1−/B2− or C1−/C2−, as the case may be depending upon the circuit configuration). The battery straps 38 may electrically couple the most positive node or the most negative node of a set 40 of battery cells 28 to the PCB 36 to provide charging current to the battery cells 28 from a battery pack charger (not shown) and/or discharging current from the battery cells 28 to a coupled device 300, for example a power tool including a load 304 such as an electric motor. The battery straps 38 through which the charging and discharging current flows may be referred to as power battery straps.

In order to protect against uncontrolled discharges, the power battery straps 38 may include a fuse 46. The fuse 46 can generate significant heat/high temperatures during relatively high current events. The significant heat/high temperatures can heat surrounding areas, including the battery cells 28. This significant heat/high temperature can potentially damage the battery cells 28. A desirable characteristic of the fuse 46 is to trip or open when necessary to prevent damage to the battery pack 1 while also transmitting as little heat as possible to the surrounding elements.

In the first example battery pack 1, the power battery straps 38 include a first portion 42 and a second portion 44. The first portion 42 may include the fuse 46 and may be made of a first material, such as brass. The second portion 44 may be made of a second material, different than the first material, such as phosphor bronze. The first portion 42 of the power battery strap 38 may be electrically and mechanically coupled to the second portion 44 of the power battery strap 38 by means of a welded joint 48.

Figure 9:
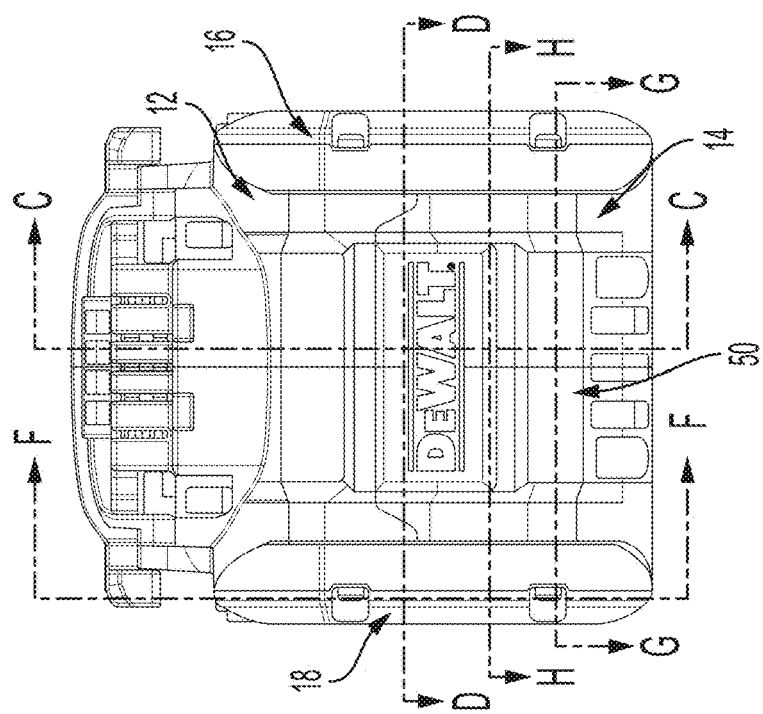
FIG. 9 is a front elevation view of another example battery pack.
Figure 12:
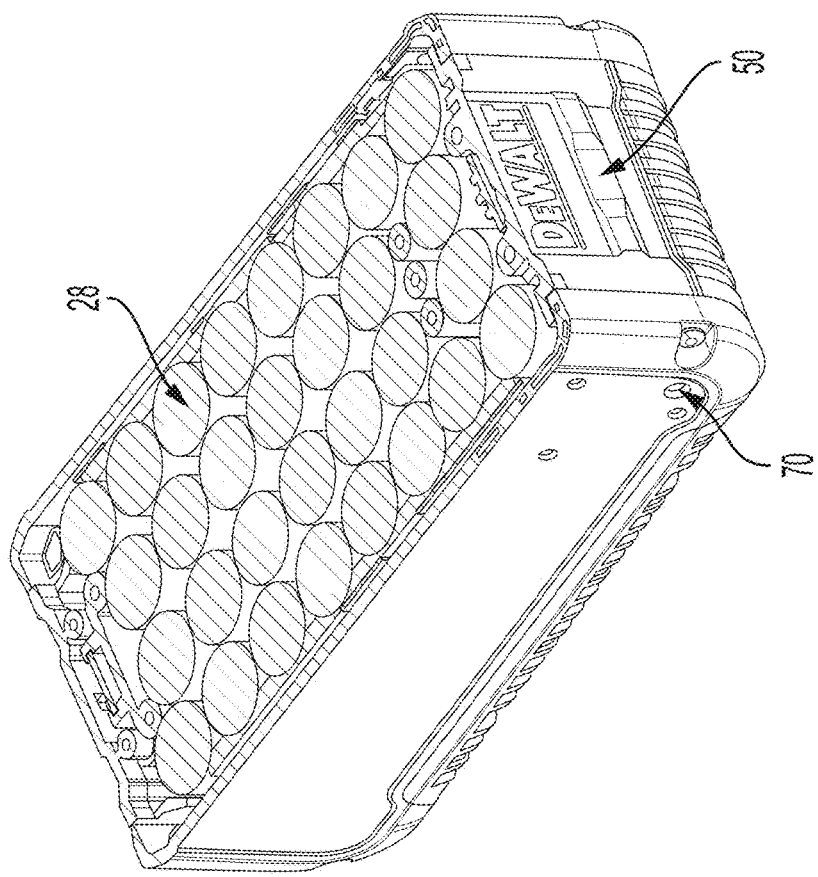
FIG. 12 is another section view of the battery pack of FIG. 9 along lines D-D.
Figure 11:
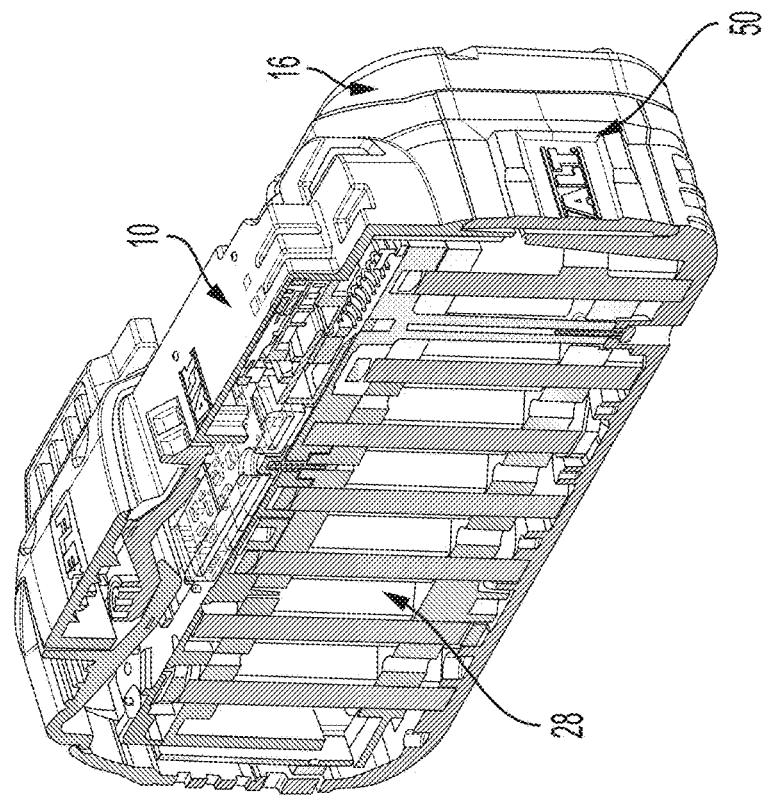
FIG. 11 is a section view of the battery pack of FIG. 9 along lines C-C.
Figure 14:
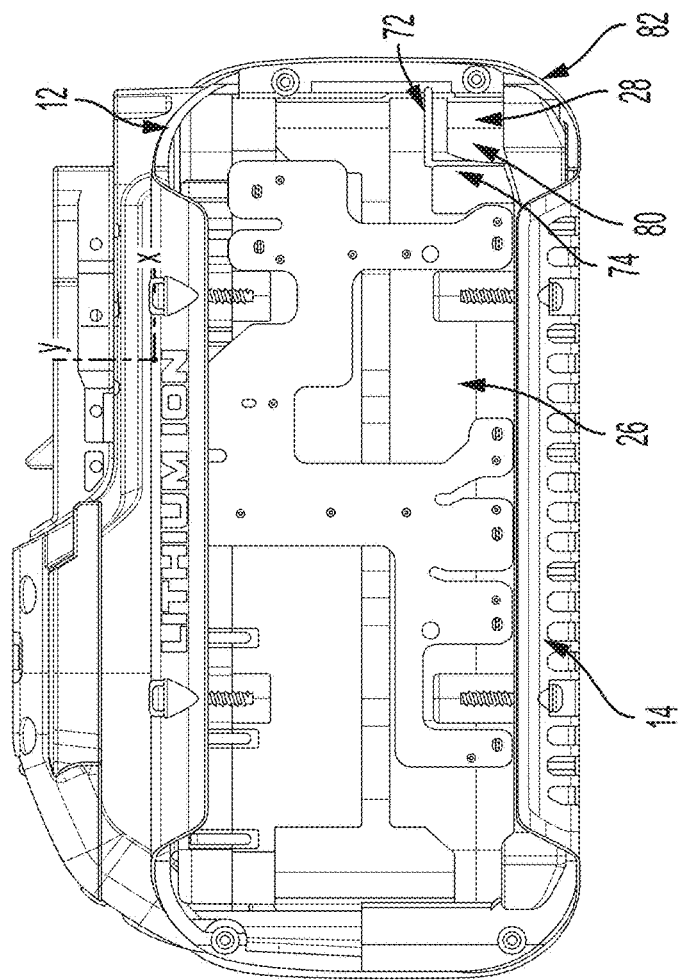
FIG. 14 is a side elevation view of the battery pack of FIG. 13.
Figure 13:
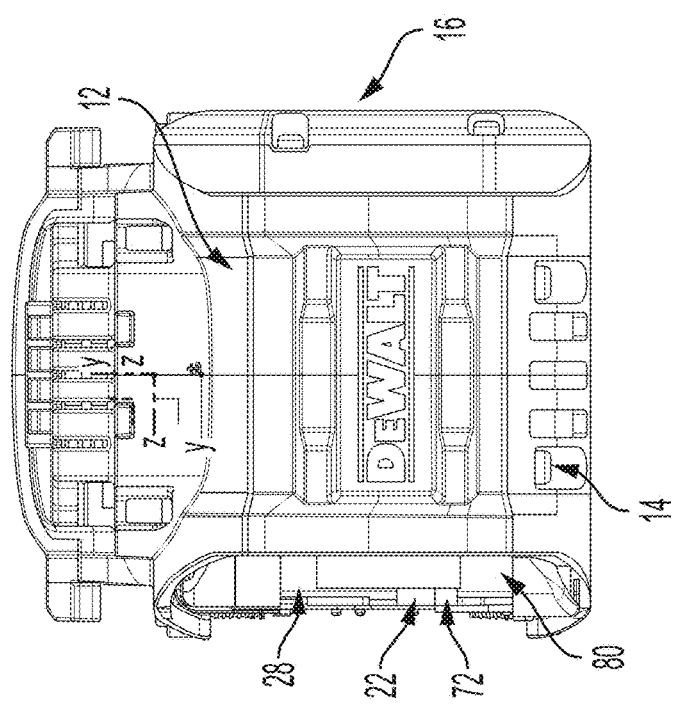
FIG. 13 is front elevation view of the battery pack of FIG. 9 with a side cover removed.
Figure 18:
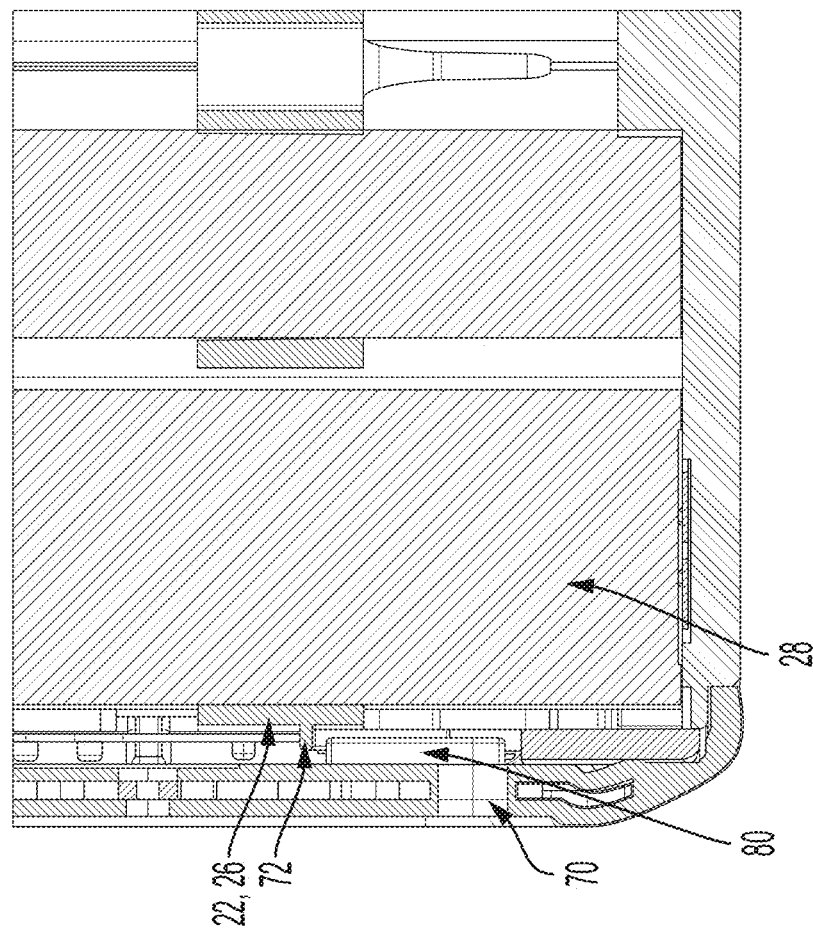
FIG. 18 is a detail view of the battery pack of FIG. 17.
Figure 17:
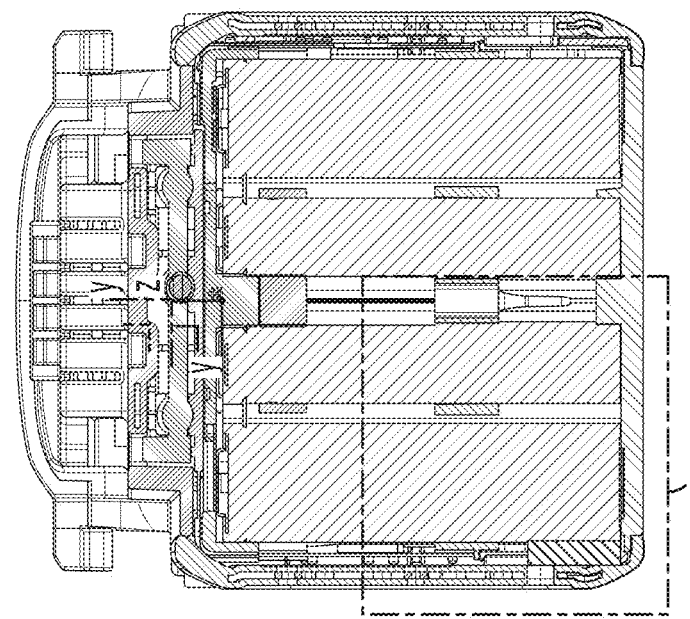
FIG. 17 is a section view of the battery pack of FIG. 9 along lines E-E.
Figure 21:
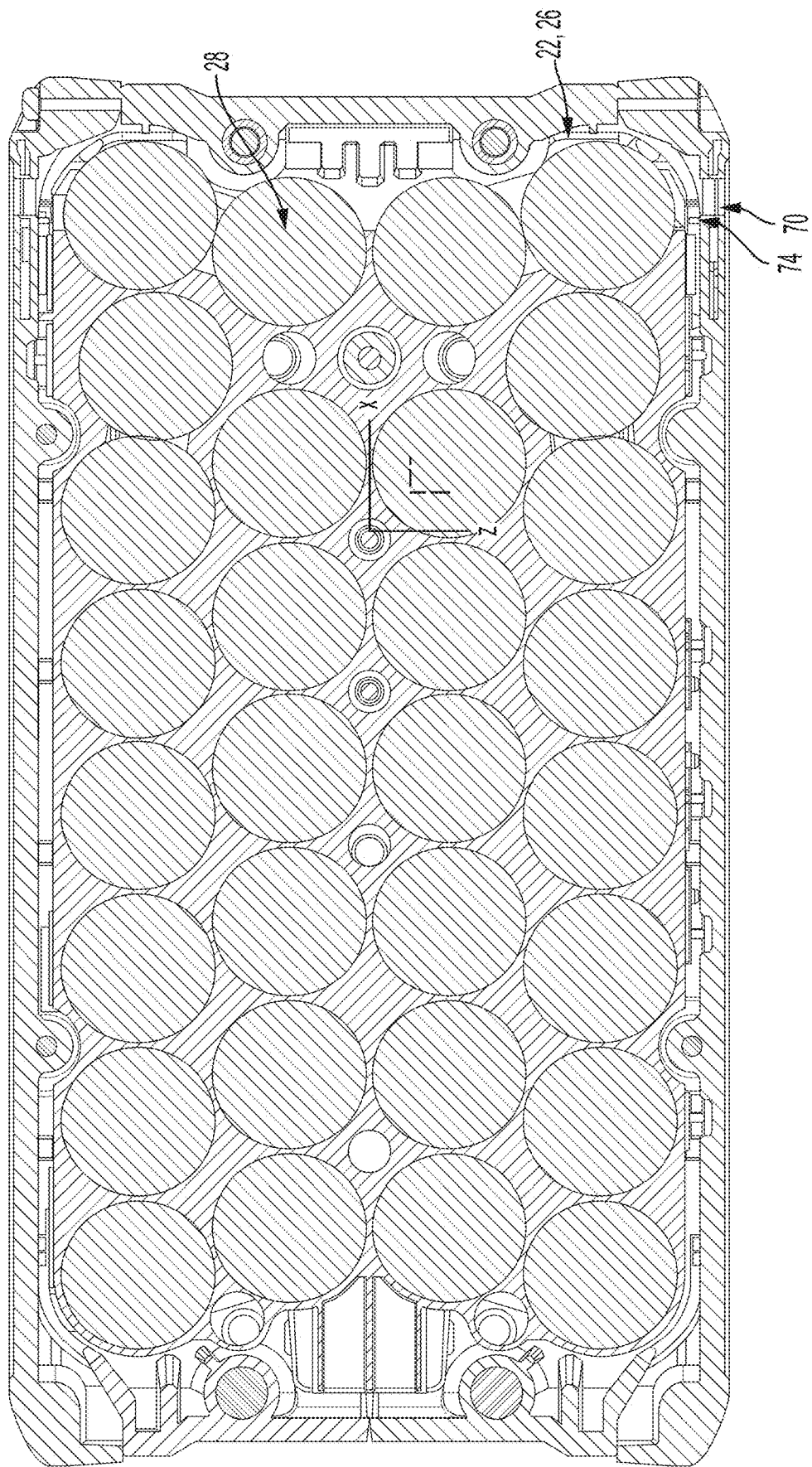
FIG. 21 is another section view of the battery pack of FIG. 9 along lines G-G.
Figure 22:
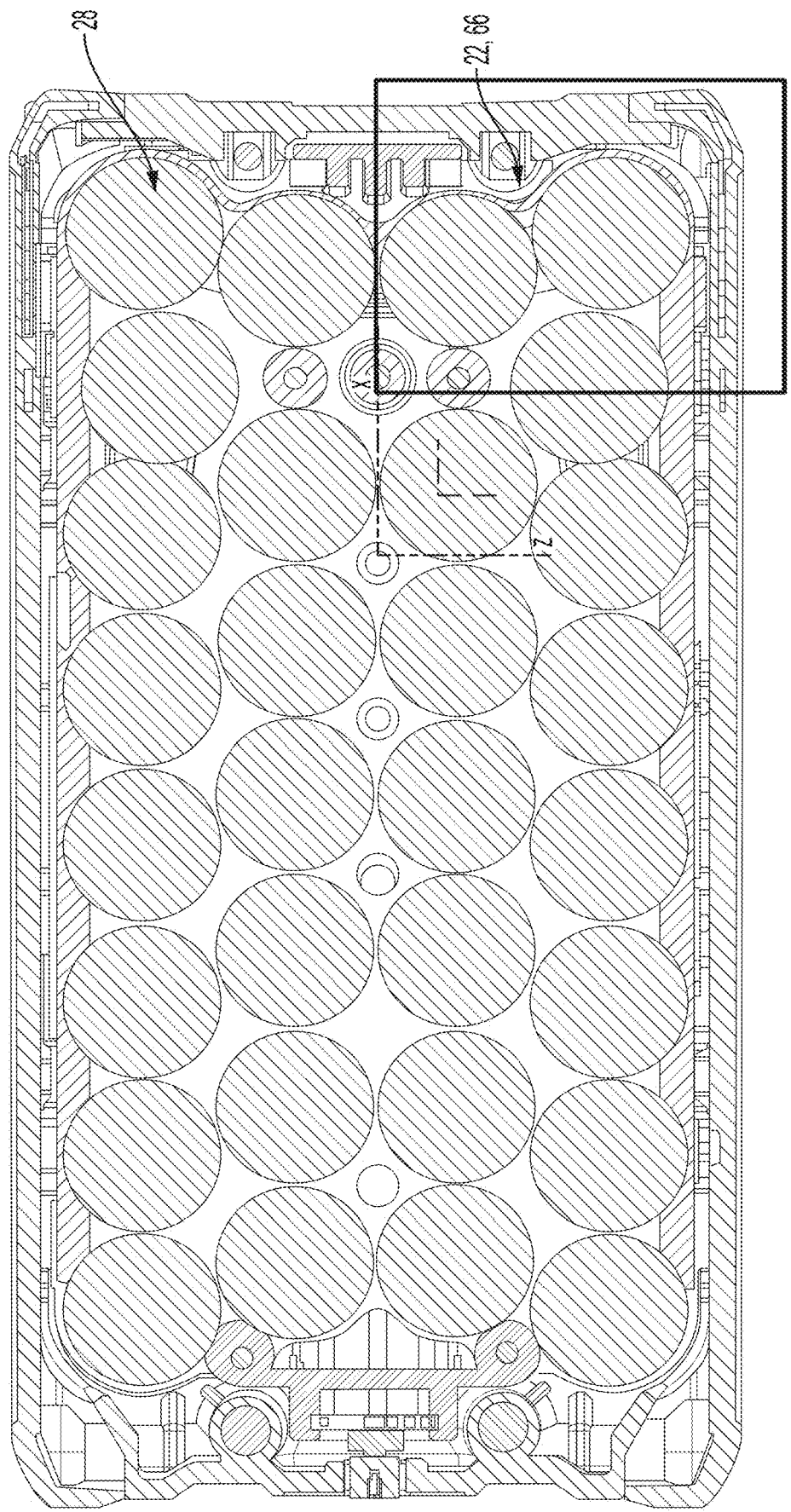
FIG. 22 is another section view of the battery pack of FIG. 10 along lines H-H.
Figure 25:
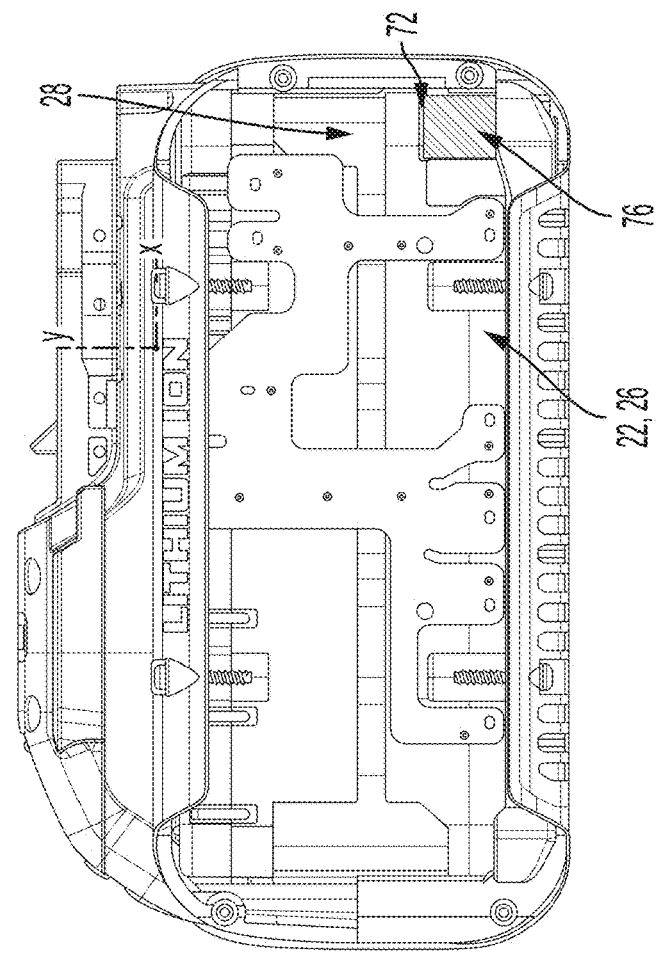
FIG. 25 is a view of the battery pack of FIG. 14 including an adhesive.
Figure 24:
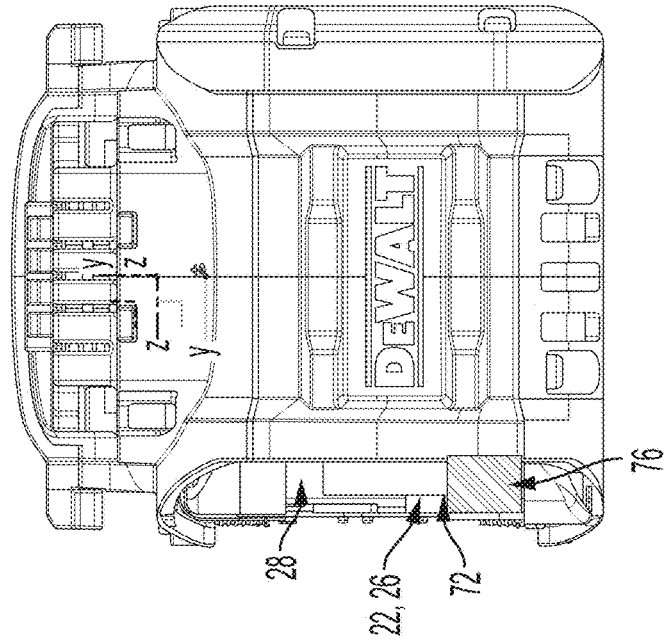
FIG. 24 is a view of the battery pack of FIG. 13 including an adhesive.
Figure 29:
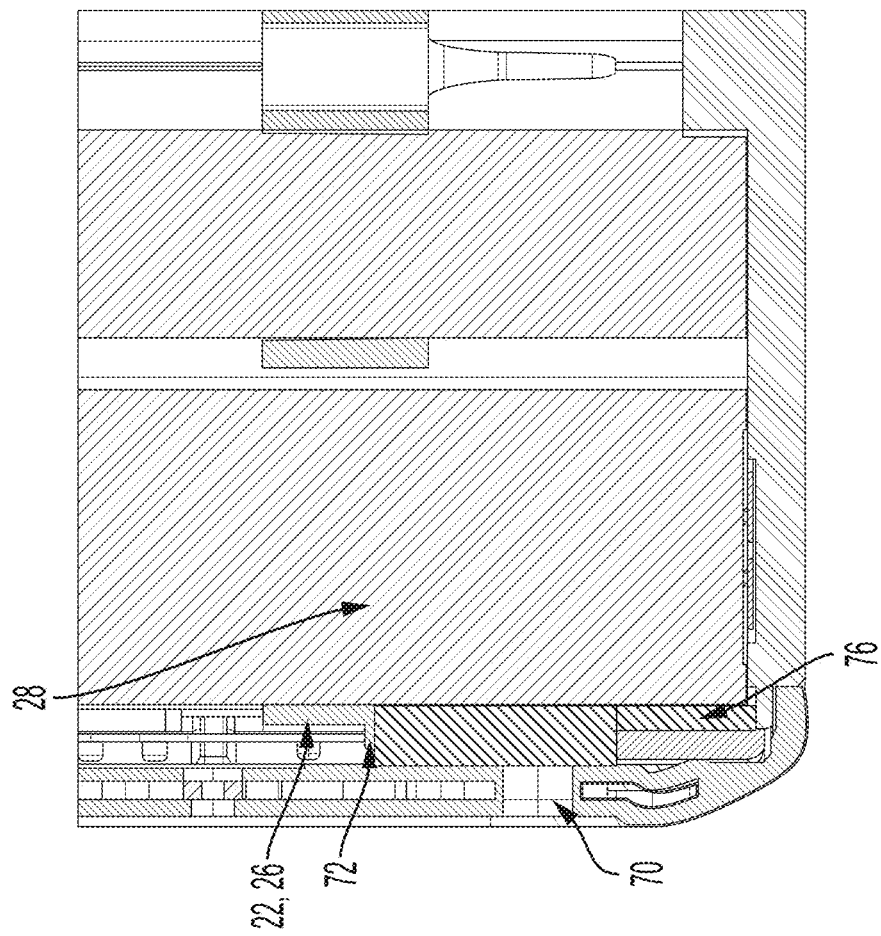
FIG. 29 is a view of the battery pack of FIG. 18 including an adhesive.
Figure 28:
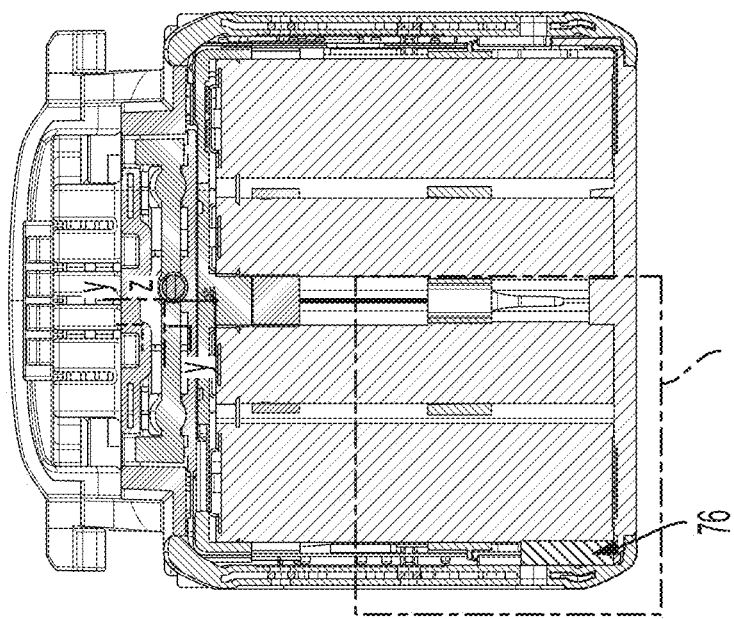
FIG. 28 is a view of the battery pack of FIG. 17 including an adhesive.
Figure 30:
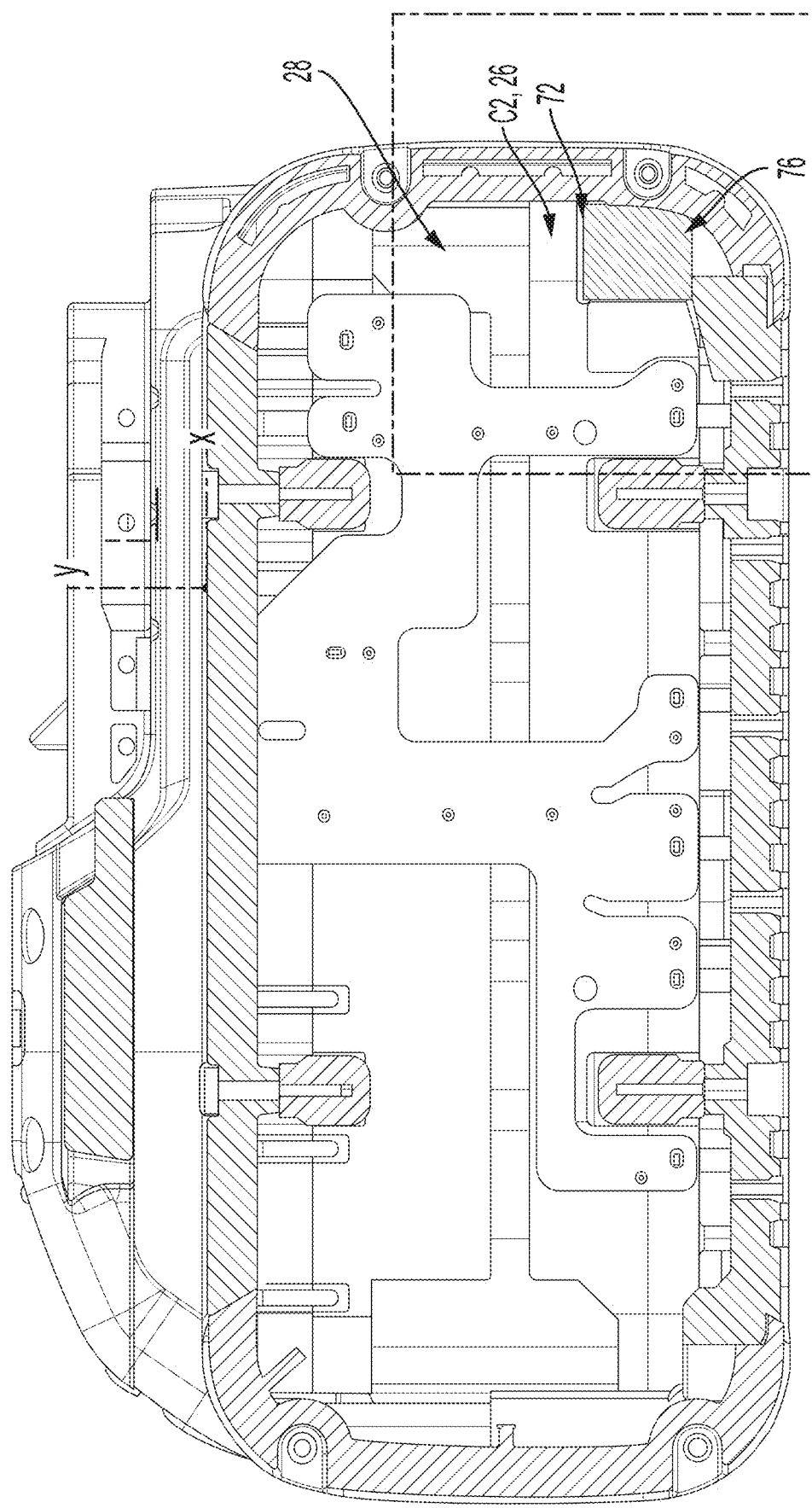
FIG. 30 is a view of the battery pack of FIG. 19 including an adhesive.
Figure 31:
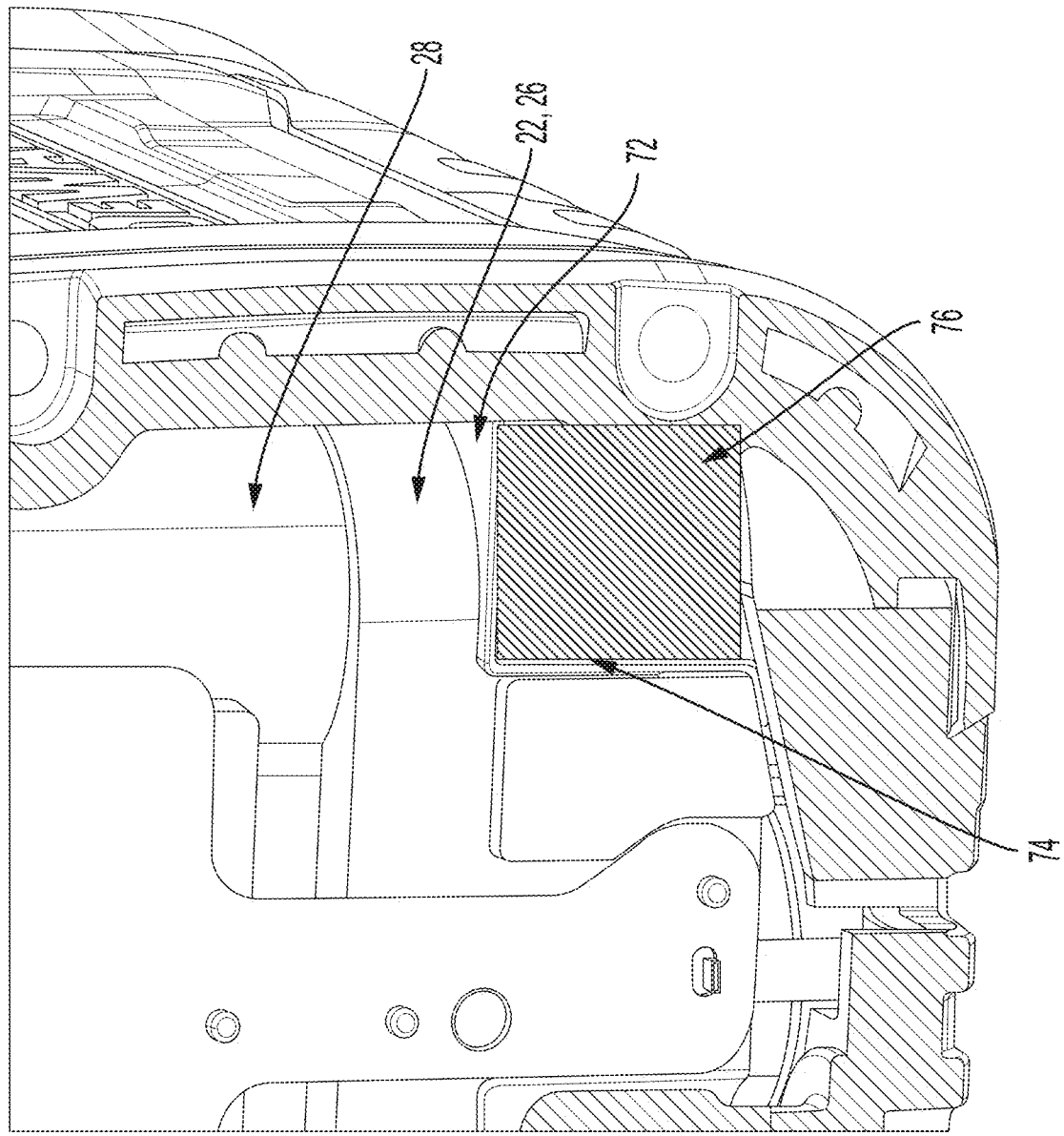
FIG. 31 is a view of the battery pack of FIG. 20 including an adhesive.
Figure 32:
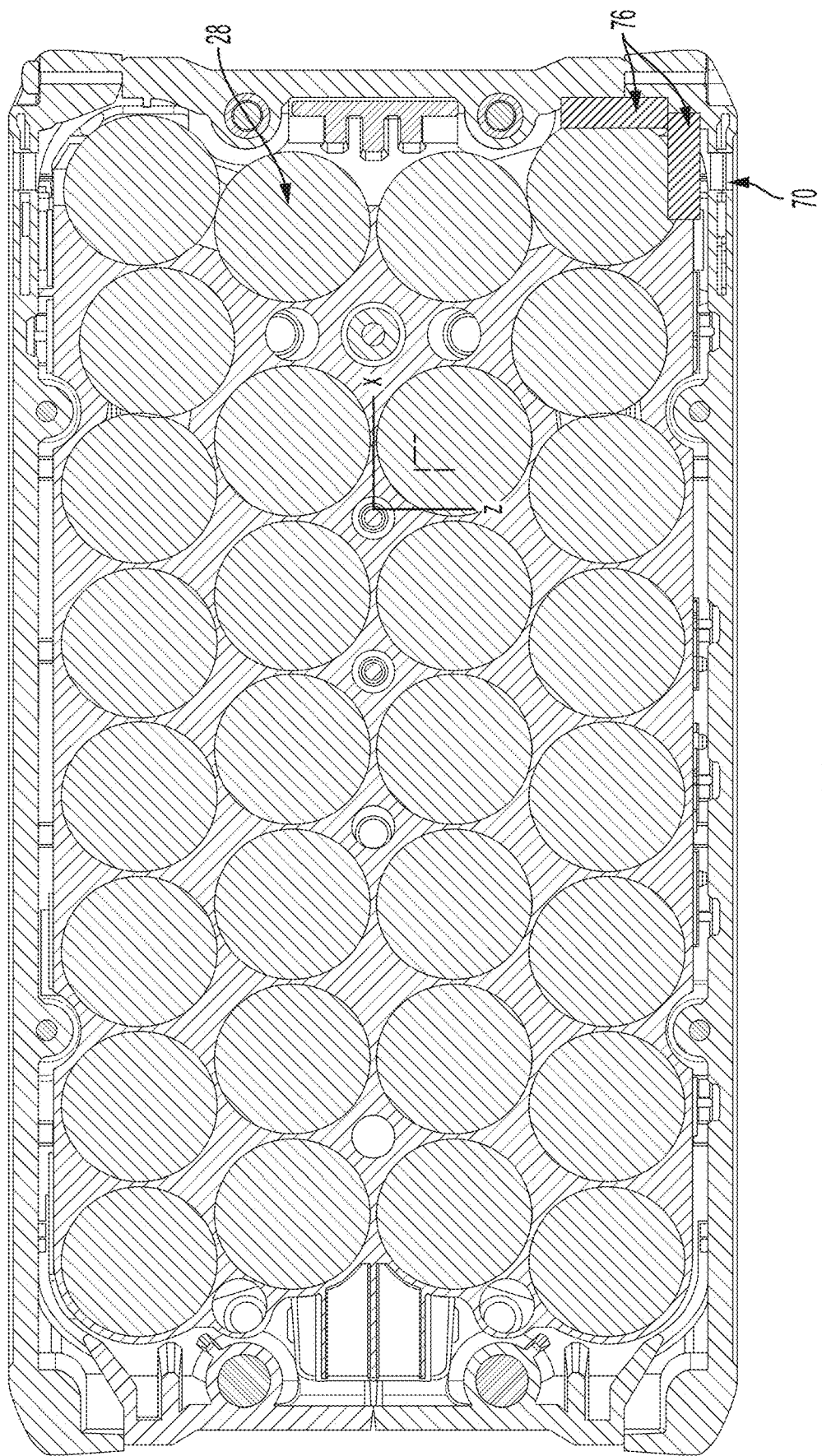
FIG. 32 is a view of the battery pack of FIG. 21 including an adhesive.
Figure 33:
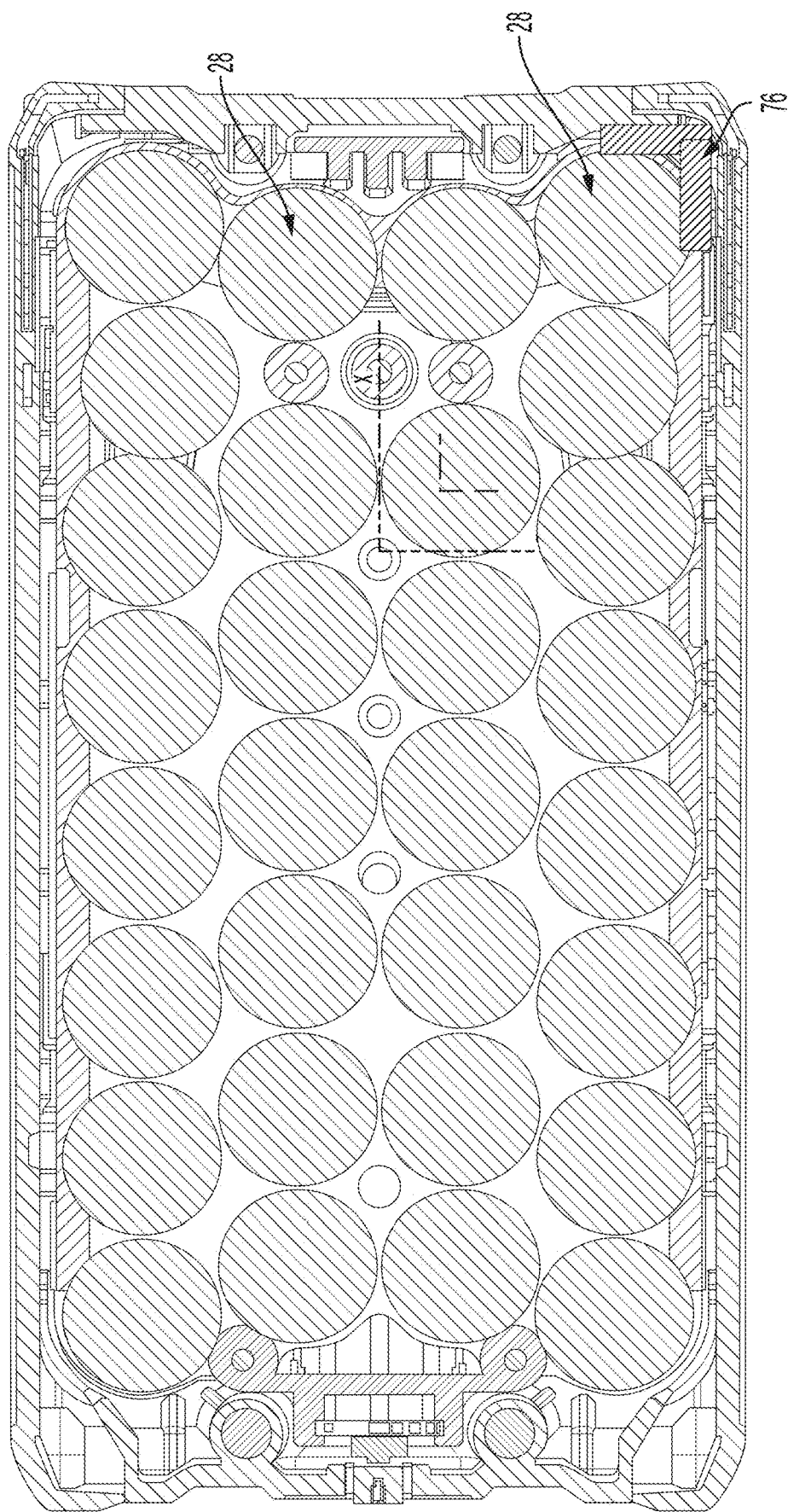
FIG. 33 is a view of the battery pack of FIG. 22 including an adhesive.
Figure 42:
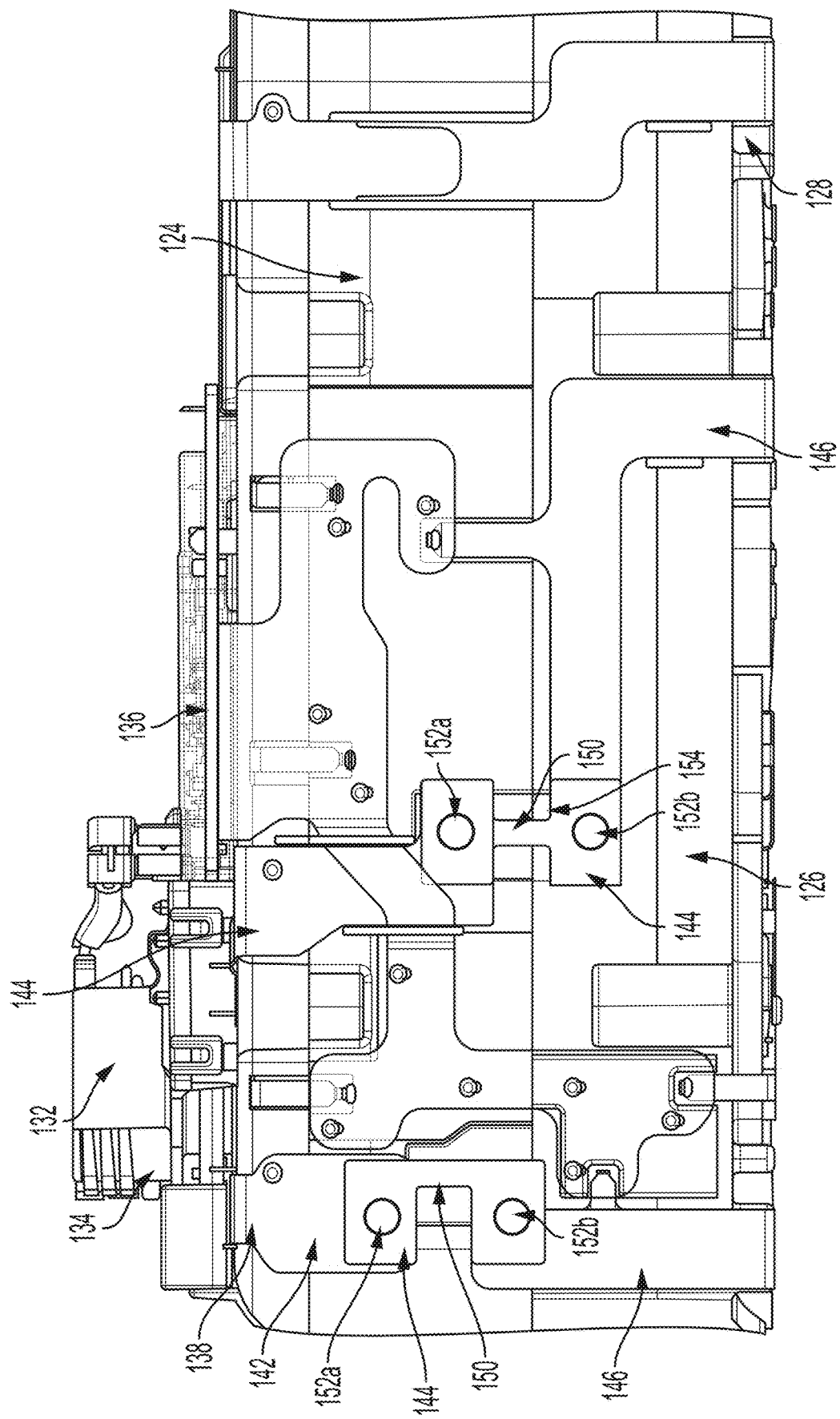
FIG. 42 is a right-side elevation view of the battery pack of FIG. 9 with the outer housing removed.
Figure 43:
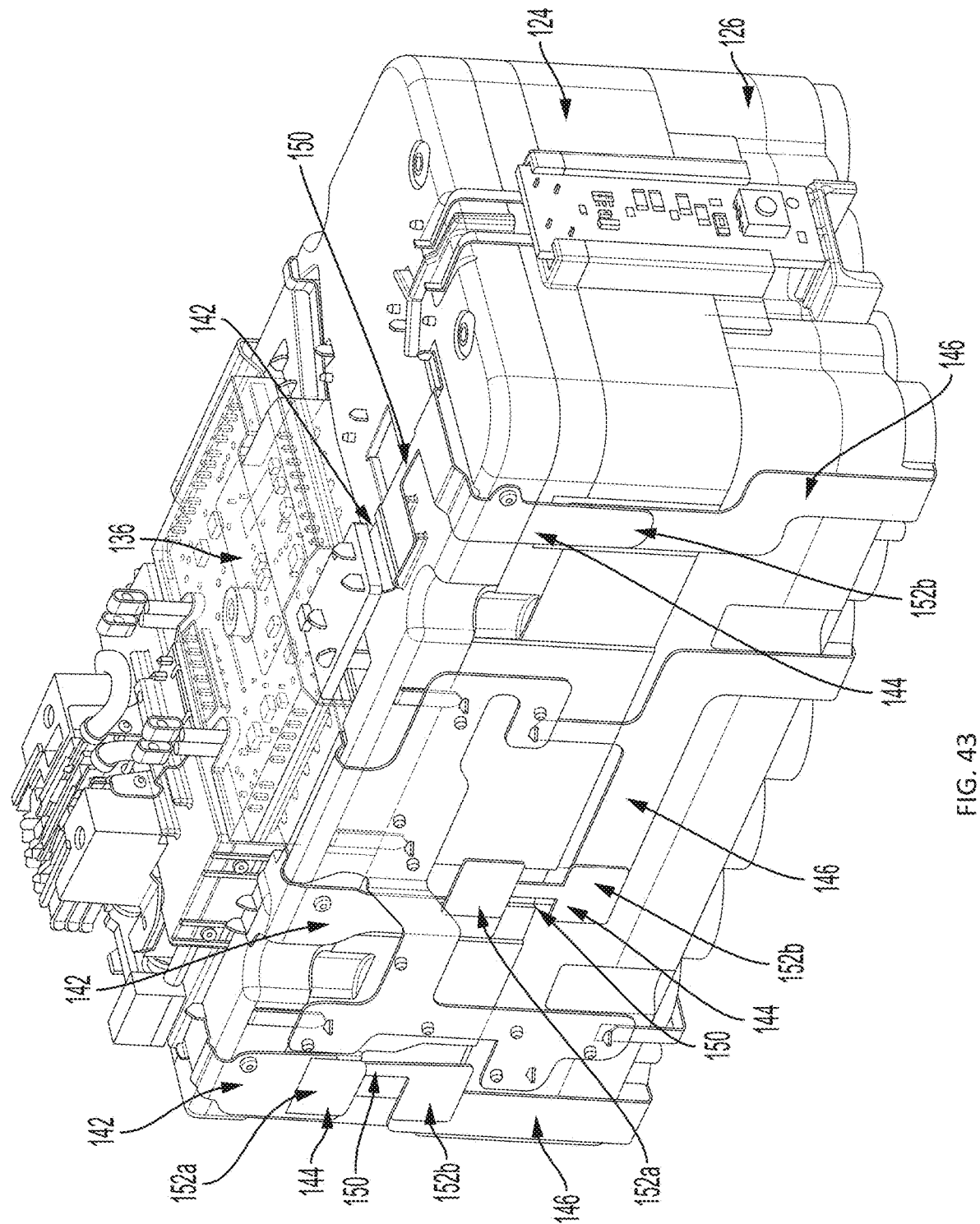
FIG. 43 is a right, rear isometric view of the battery pack of FIG. 42.

FIGS. 42 and 43 illustrate the example battery pack of FIG. 9 without an outer plastic housing. FIGS. 42 and 43 illustrate another example core pack 120. The core 120 pack includes, among other components, a set of battery cells 128, a battery cell holder 122 to maintain a fixed positional relationship between the battery cells 128 of the set of battery cells, a printed circuit board (PCB) 136 upon which are mounted several various components including but not limited to control modules/circuits, switches, resistors, capacitors and connectors, a terminal block 130 including a set of battery pack terminals 134 and terminal holder 132, and a set of battery straps 138 that conduct electricity from the set of battery cells 128 to the PCB 136.

As noted above, a subset of the set of battery straps 138 may conduct charging and discharging current/power to and from the set of battery cells 128. The battery strap 138 may be referred to as power battery strap. In order to protect against uncontrolled discharges through the power battery strap 138, the power battery strap 138 may include a fuse 150. In order to reduce the heat in and around the battery strap fuse 150, the power battery straps 138 may comprise a plurality of sections of made of various materials.

As illustrated in FIGS. 42 and 43, the power battery strap 138 may include a first portion or section 142 made of a first material, a second portion or section 144 made of a second material and a third portion or section 146 made of a third material.

The second portion 144 of the battery strap 138 includes the fuse element 150. The fuse element 150 may include a subsection of narrowed or decreased material, as is well known in the art. In this example embodiment, the second section 144 or fuse section may be made of aluminum. The first section 142 and third section 146 of the power battery strap 138 may be made of phosphor bronze.

This example embodiment, the first portion 142 may be welded to the second portion 144 at a connection point 152*a* and the third portion 146 may be welded to the second portion 144 at a connection point 152*b*. The aluminum fuse element 150 has a much lower melting point than typical fusing materials, such as phosphor bronze or steel. By making the fuse element 150 of aluminum, the desired time to fuse characteristics are at a much lower resistance. Because aluminum has a higher conductivity than phosphor bronze or steel it doesn't get as hot as the phosphor bronze or steel and yet melts at a much lower temperature. In other words, steel has a higher resistance than aluminum and thus straps made of steel get hotter than the straps made of aluminum. As is well known, materials that present lower resistance to current generate less heat for the same amount of current. By making the second portion 144 and fuse element 150 of aluminum, the second portion 144 can be easily welded to the third portion 146 which can be made of a material that is suitable for welding or soldering to a battery cell 128. The third portion 146 may be made of phosphor bronze.

In addition, a ceramic-based adhesive 154 may be applied to the fuse element 150 to reduce heat transfer from the fuse element 1540 to surrounding elements or components. The ceramic adhesive 154 is applied directly to the fuse element 150 and between the fuse element 150 and the cell holder 122, for example, the cell holder lower portion 126. As such, there is no air gap between the fuse element 150 and the ceramic adhesive 154.

The ceramic adhesive 154 may have a thermal conductivity lower than the fuse 150 itself. As such, any heat from the fuse element 150 takes longer to reach the outer surface of the adhesive 154 and heat surrounding elements such as the cell holder 122. It also reduces the effect of radiation heat transfer from the fuse 150 to the surrounding elements or components.

Figure 70:
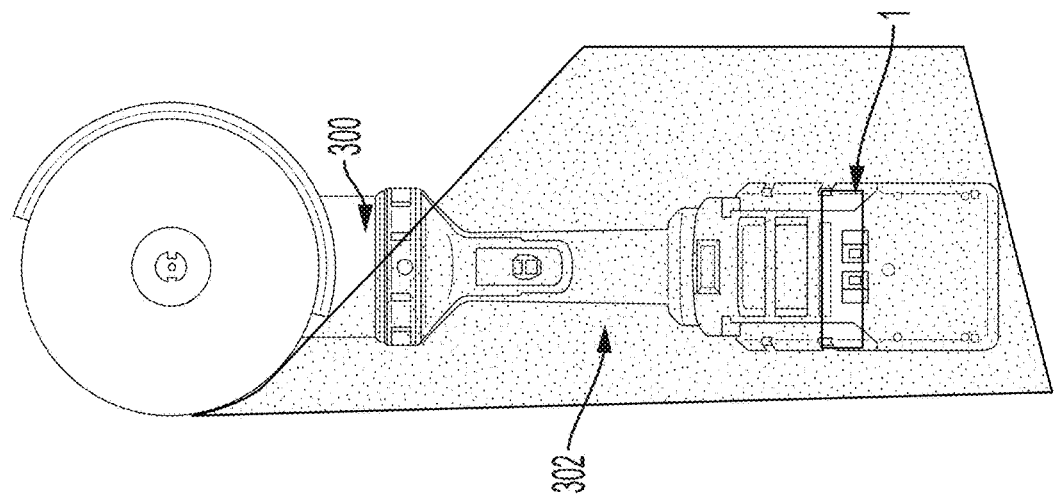
FIG. 70 illustrates a spark/debris field generated by an example battery pack powered power tool.
Figure 69:
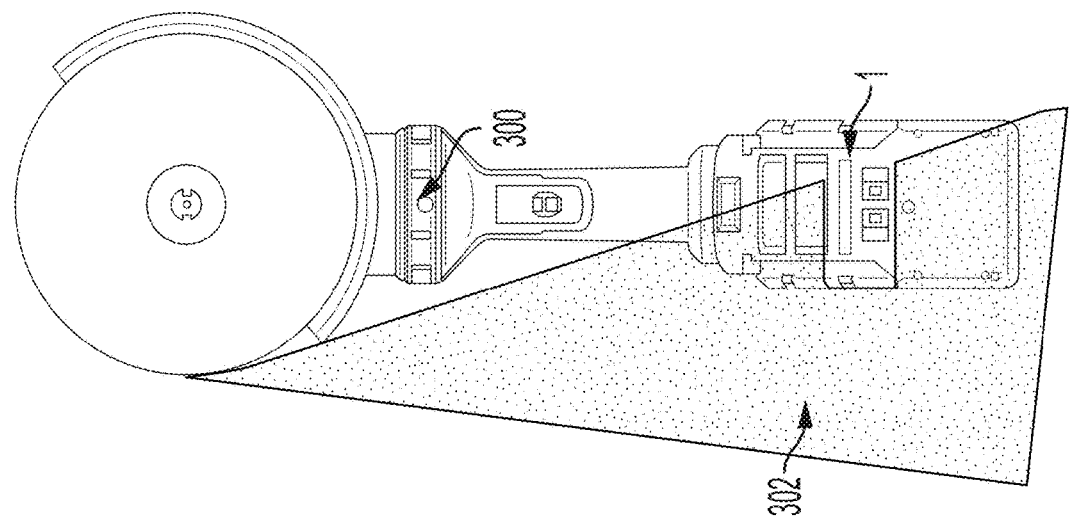
FIG. 69 illustrates a spark/debris field generated by an example battery pack powered power tool.

Referring also to FIGS. 69 and 70, when the first example battery pack is coupled to a power tool 300, for example a grinder, the front of the battery pack 1 is positioned in such a manner that a debris field 302 of sparks and/or metal shavings (illustrated by the dark triangle) generated by the grinder during an application/operation impact the front of the housing 10 of the battery pack 1. These sparks and metal shavings are very hot and may cause melting and/or holes in the material of the housing 10 at the front of the housing 10. If the housing 10 experiences melting, the structural integrity of the housing may be compromised. In addition, once a hole is created in the housing 10, the core pack 20 is susceptible to further sparks and/or other contaminants, such a water or grease. These contaminants can adversely affect the operation of the battery pack.

Referring to FIGS. 9-13, a second example battery pack is illustrated. The second example battery pack is the same as the first example battery pack, except as described below. In order to address any issues related to sparks impacting a portion of the housing during operation of a connected power tool—as illustrated in FIGS. 69 and 70, the second example battery pack includes a shield 50—a section of the housing made of a second material. The second material has a higher melting temperature than the first housing material. The second material has a softening temperature of greater than the first material, for example 150° C. This second material may be, for example, glass-filled nylon or other similar materials. The shield 50 may be formed during a separate molding process and then combined with the upper housing 12 and the lower housing 14 and the side covers 16, 18 or may be formed during the same molding process as the upper and lower housings 12, 14. The shield 50 may be positioned at a front side of the battery pack 1 (the side of the battery pack that is impacted by sparks generated by an attached tool 300 during operation). The shield 50 may be positioned between the upper portion 12 of the housing 10 and the lower portion 14 of the housing 10.

In an alternate example embodiment of a battery pack 1 having a shield, illustrated in FIGS. 35-38, a discrete element 52 made of a metal material, such as, for example, steel, aluminum or stainless steel having a melting temperature greater than 600° C., is formed. The metal material shield 52 should have a melting temperature greater than the melting temperature of the battery pack housing 10, which is composed of plastic, as described above. The discrete element metal shield 52 may be affixed to the battery pack housing 10. Alternatively, the battery pack housing 10 may be molded about the metal shield 52. Alternatively, the battery pack housing 10 and the metal shield 52 may be formed separately and then assembled into a final battery pack housing.

Figure 41:
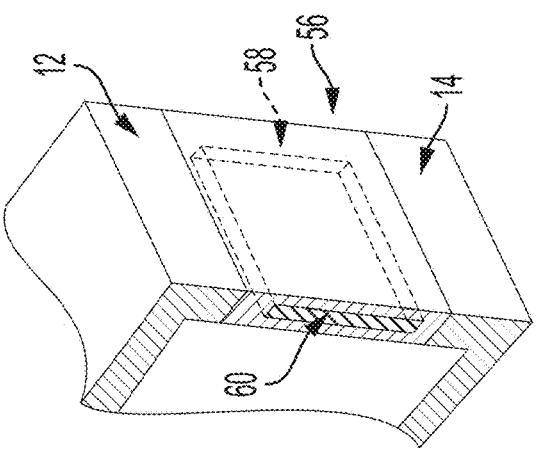
FIG. 41 is another simplified partial left, front isometric, section view of the battery pack of FIG. 39 along lines J-J.
Figure 40:
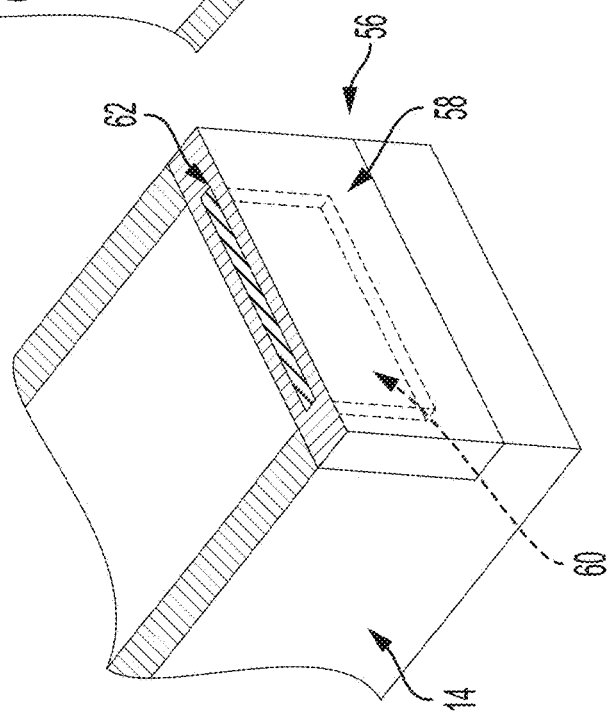
FIG. 40 is a simplified partial left, front isometric, section view of the battery pack of FIG. 39 along lines I-I.
Figure 39:
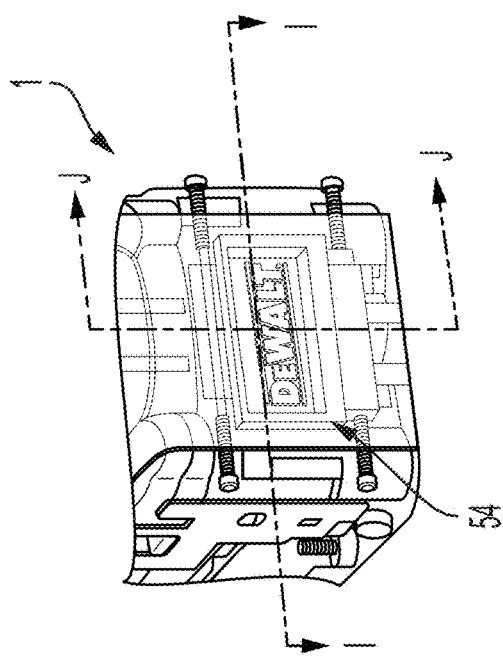
FIG. 39 is a partial left, front isometric view of another example of a battery pack.

In another alternative example embodiment of a battery pack having a shield, illustrated in FIGS. 39-41, the front side of the battery pack housing includes a section/portion 56 comprised of a high melting temperature plastic element 58 and a high melting temperature metal element 60. As shown, the high melting temperature plastic element 58 is coupled to the battery pack housing 10. The high melting temperature plastic element 58 includes a pocket or cavity 62. The high melting temperature metal element 60 is positioned in the pocket 62. The metal element 60 may be formed first. Then the high temperature plastic element 58 may be formed about the metal element 60. The combination high temperature metal element and high temperature plastic element may then be coupled to the other plastic elements of the housing 10, such as the upper portion 12 of the housing 10 and/or the lower portion 14 of the housing 10.

Figure 73:
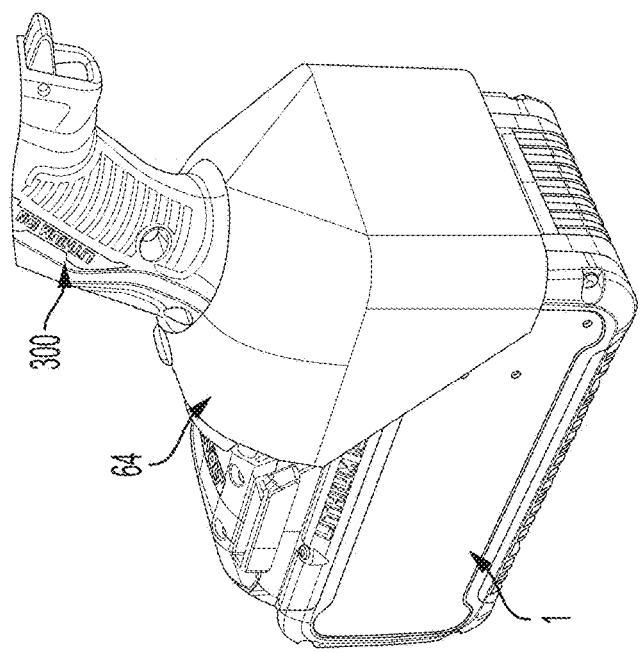
FIG. 73 is front, side isometric view of an example power tool coupled to an example battery pack and an example battery pack guard.
Figure 72:
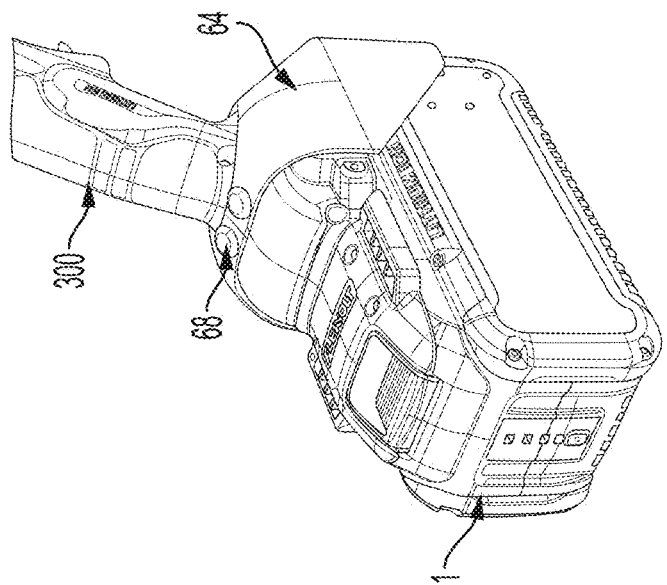
FIG. 72 is a rear, side isometric view of an example power tool coupled to an example battery pack and an example battery pack guard.
Figure 71:
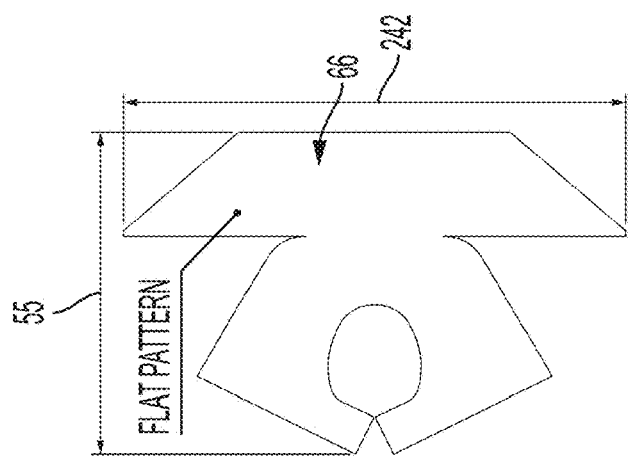
FIG. 71 illustrates a pattern for a battery pack guard.

In another alternative example embodiment of a shield for a battery pack, FIGS. 71-73 illustrate a guard or shield 64 for the battery pack 1. The guard may be attached to the tool or itself by a set of snaps, hooks or loops, for example. The guard 64 may be a replaceable/disposable heat resistant fabric or leather material to keep hot sparks from hitting the battery pack 1. This guard 64 may be a removeable accessory that would be replaced with wear.

The guard 64 may have a flat pattern 66 prior to application to the battery pack 1. The guard 64 may be attached to the battery pack 1 and/or tool 300 by a set of snaps or buttons 68

Figure 4:
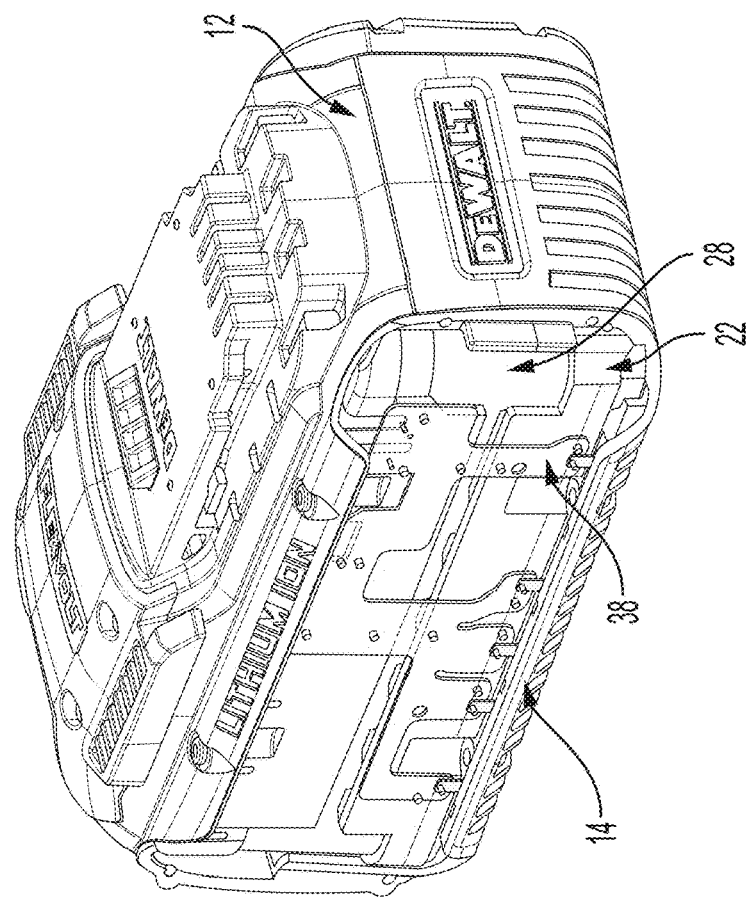
FIG. 4 is the battery pack of FIG. 3 with a side cover removed.
Figure 3:
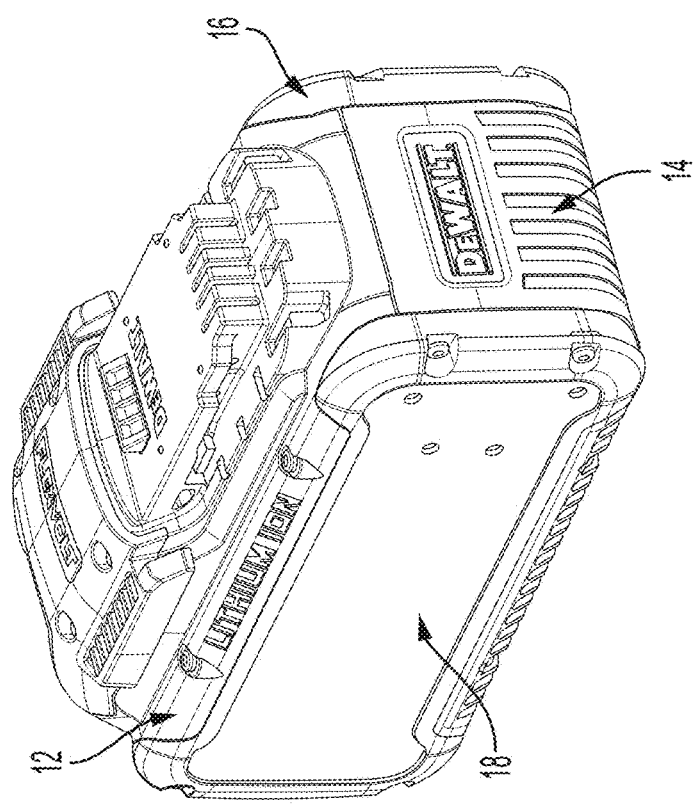
FIG. 3 is a left, front isometric view of the battery pack of FIG. 1.
Figure 6:
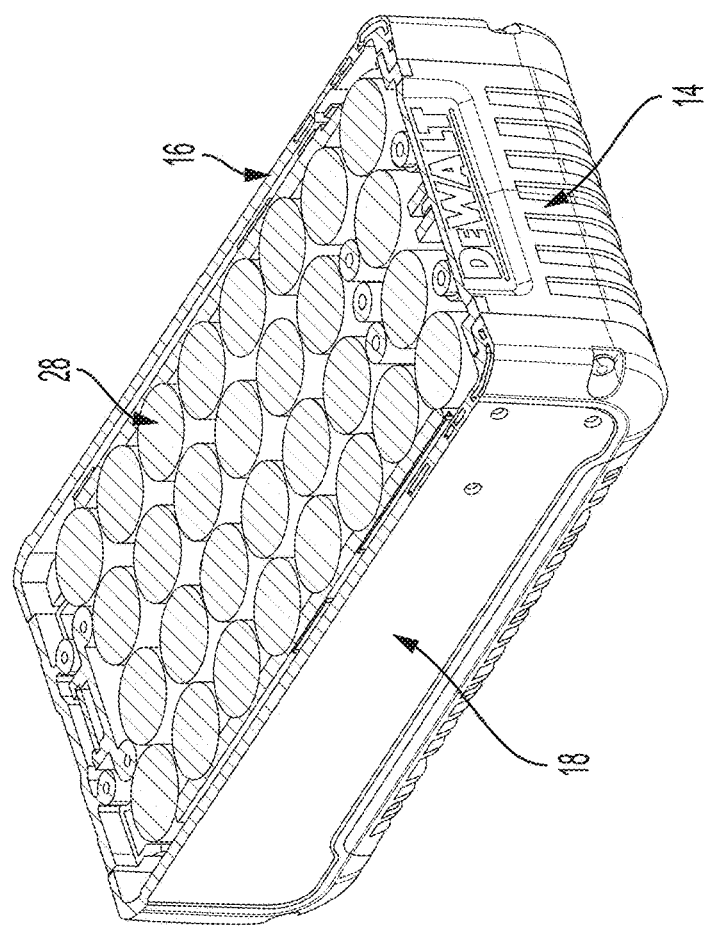
FIG. 6 is a left, front section view of the battery pack of FIG. 1 along lines B-B.
Figure 5:
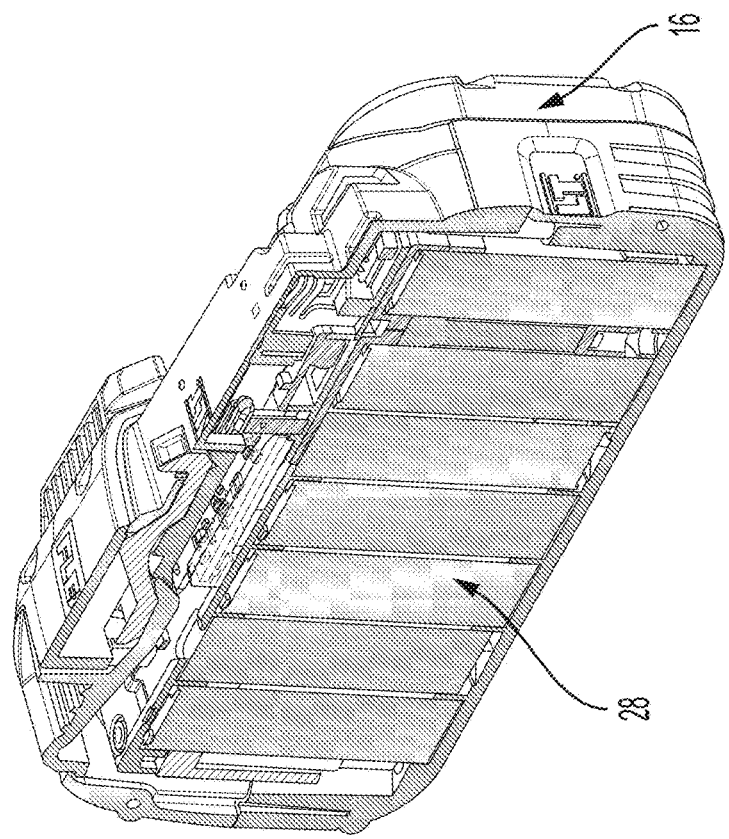
FIG. 5 is a left, front section view of the battery pack of FIG. 1 along lines A-A.
Figure 8:
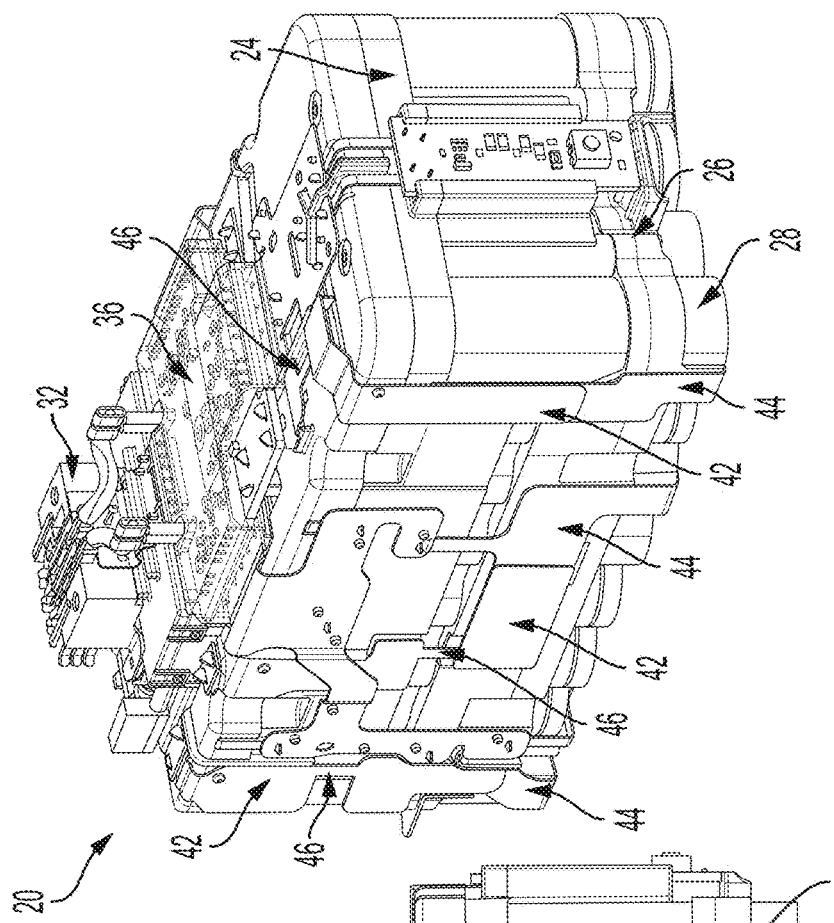
FIG. 8 is a right, rear isometric view of the battery pack of FIG. 7.
Figure 7:
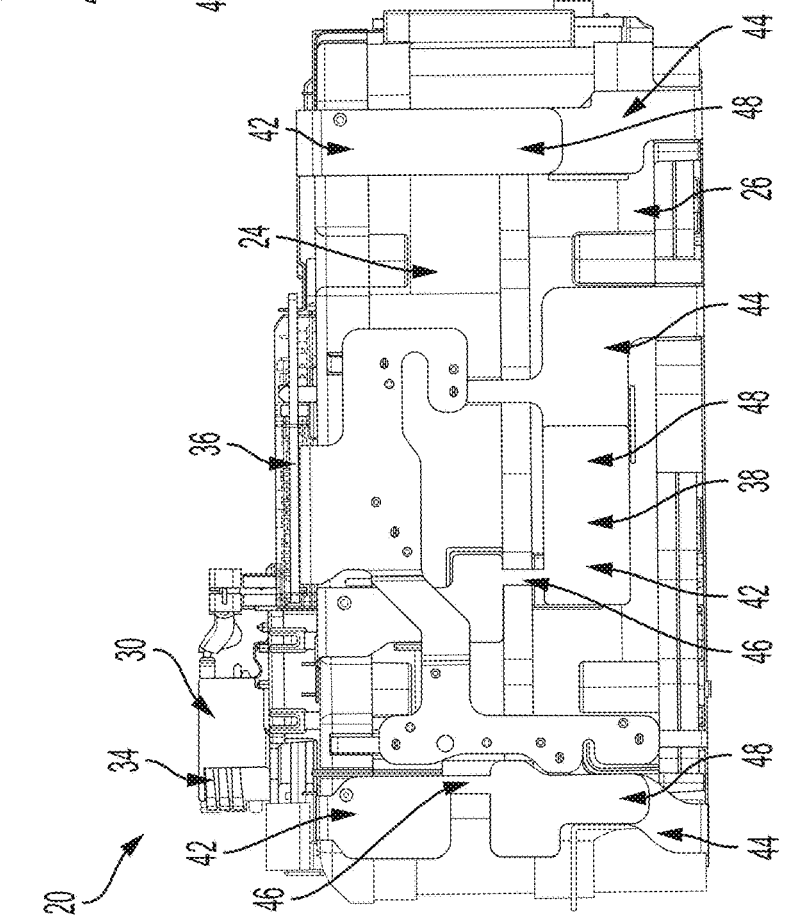
FIG. 7 is a right-side elevation of the battery pack of FIG. 1 with the outer housing removed.
Figure 10:
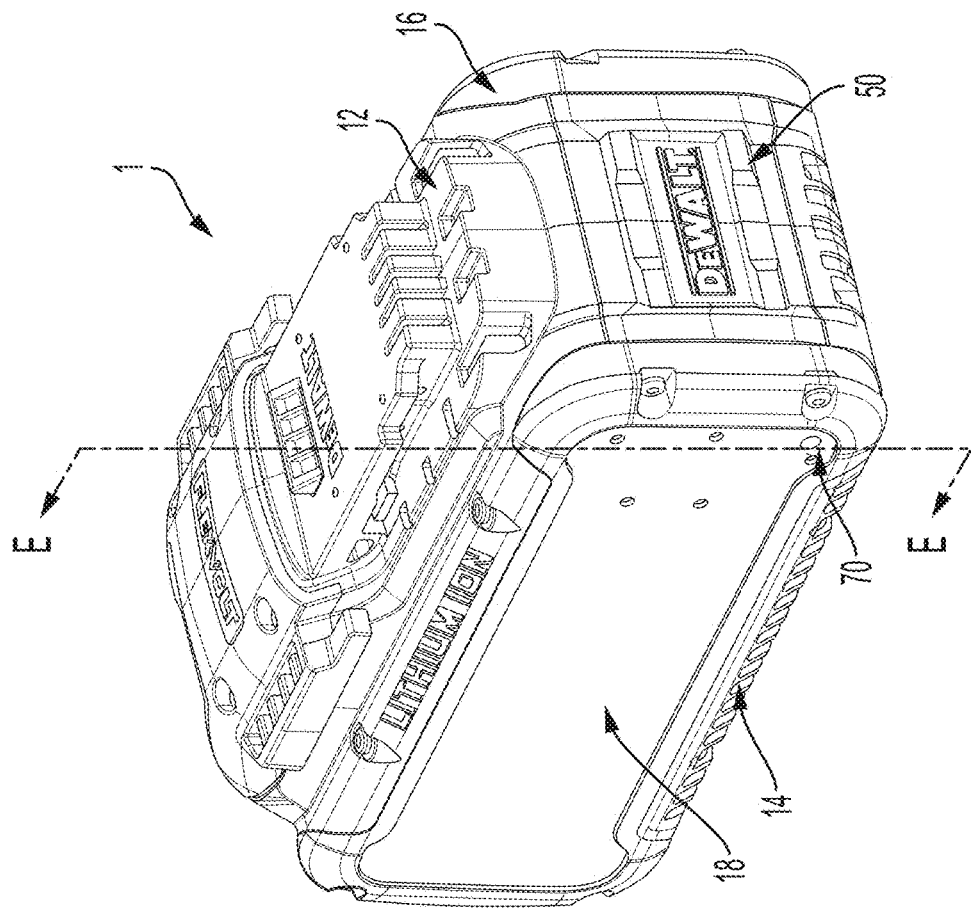
FIG. 10 is a left, front isometric view of the battery pack of FIG. 9.

Referring specifically to FIGS. 3 and 4, the lower housing and the left side cover meet to form an area covering and protecting a battery cell. In order to reduce an amount of material used to form the side cover and lower housing—particularly in a thickness dimension, the wall formed by the side cover and lower housing are relatively thin. As such, if the battery pack is dropped onto a hard surface, the battery cell may be damaged by the force of an impact of the battery pack on the hard surface. This damage could adversely affect the battery cell.

Referring to FIGS. 9-33, the second example embodiment battery pack is illustrated. In order to prevent deformation of the battery cell housing, this embodiment spreads the forces imparted on the pack housing and the battery cell upon impact. It also removes the relative movement between the pack housing and other components inside the pack housing.

As illustrated, the side cover 18 includes an injection port or hole 70 for injecting a fluid material 76 such as an adhesive. The cell holder 22, for example the lower portion 26 of the cell holder 22 is configured to include an upper surface or wall 72. In addition, ribs 74 are formed in the interior surface 78 of the side cover 18 and/or of the lower portion 14 of the pack housing 10 to form surfaces to stop or slow the movement of any injected fluids. The battery cell 28, the cell holder 22 (particularly the lower portion 26 of the cell holder 22), the lower (bottom) portion 14 of the pack housing 10 and the side cover (portion) 18 form a cavity 80.

Once the battery pack 1 is fully assembled, an adhesive or other viscous fluid 76 is injected through the injection port 70 into the cavity 80. The adhesive 76 is positioned between the battery cell 28 and the lower front corner 82 of the pack housing 10. The adhesive 76 encases at least a portion of the battery cell 28. As such, if the battery pack 1 is dropped and lands on the lower front corner 82 of the pack housing 10, forces from the impact are distributed about the battery cell 28. The adhesive 76 may be, for example, a two-part epoxy. When selecting an adhesive, one should consider bond strength, shear strength and durometer.

FIGS. 24-33 illustrate example locations of the adhesive 76 once the adhesive 76 has been injected into the cavity 80.

The flow of the adhesive/glue/other fluid material 76 may be controlled using blocking controls such as ribs 74, additional pieces of plastic, other high viscous materials.

The injection port 70 may be covered by a label or left open.

Figure 34:
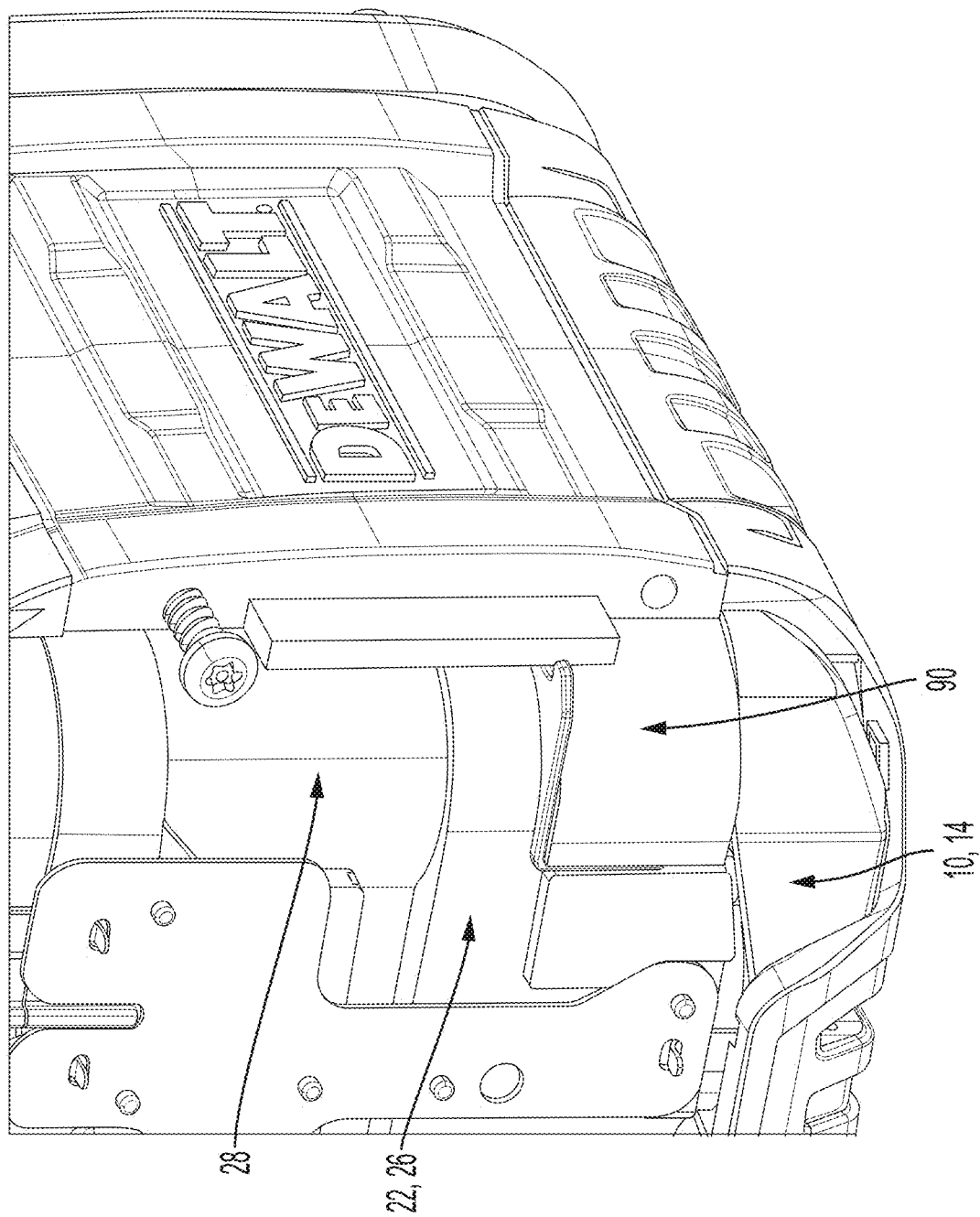
FIG. 34 is a detail view of another example battery pack.

FIG. 34 illustrates an alternate example embodiment of dispersing the impact force. A discrete part 90—cavity filler—is formed separate from the battery pack 1 and placed into the cavity 80 during assembly of the battery pack 1. The cavity filler 90 may be made of a rubber, an epoxy or a plastic. The cavity filler 90 will also distribute any loads from a drop around or about the battery cell 28. The cavity filler 90 may be fixed to the cell holder 22 and/or the battery cell 28 and/or the pack housing 10.

FIGS. 44-68 illustrate an example of a power tool and battery pack system 500. The system 500 may include a set 510 of power tools 520, a set 530 of battery packs 540 and a set 550 of battery pack chargers 560.

Figure 44:
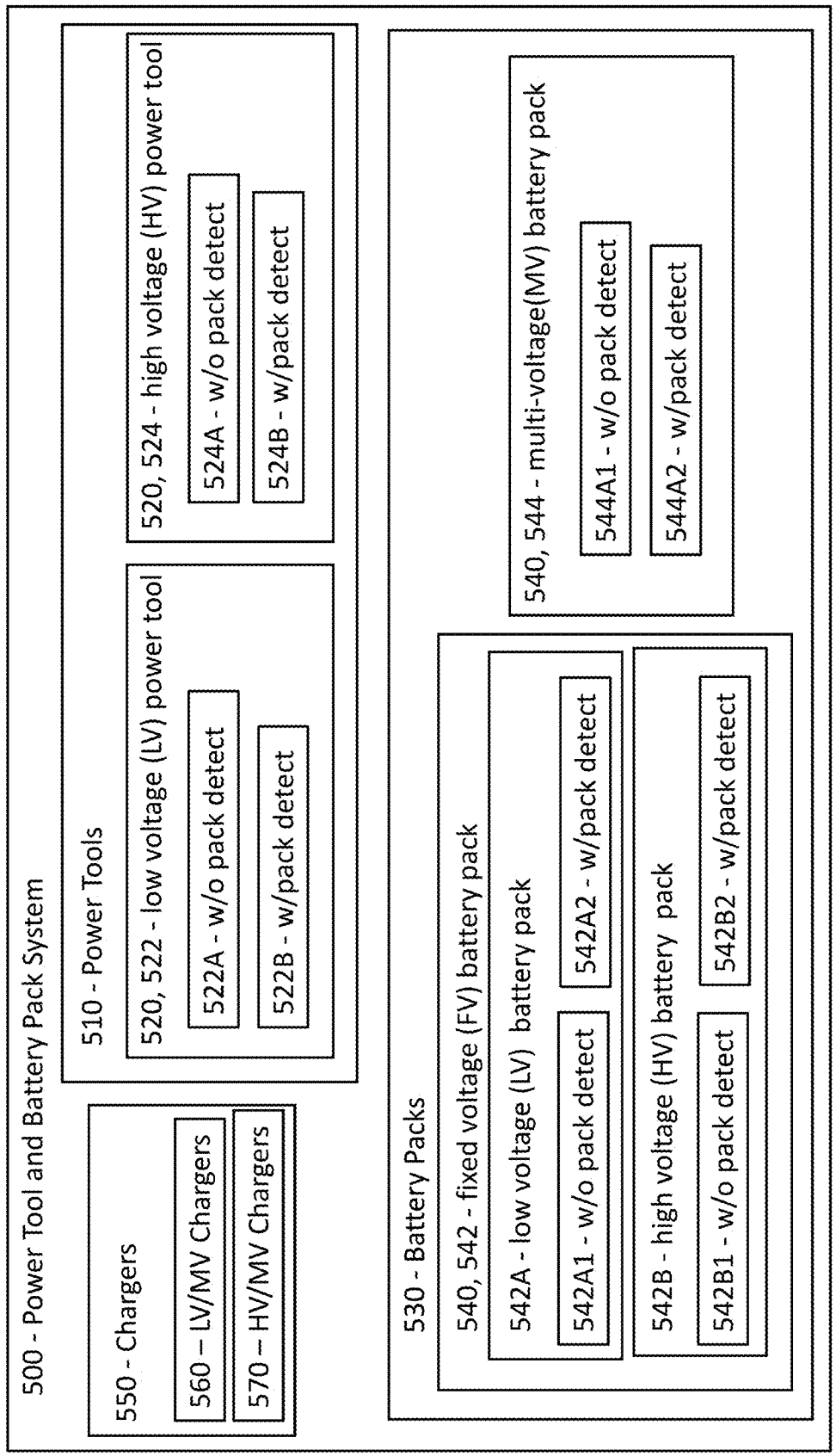
FIG. 44 is a diagram of an example power tool and battery pack system.

As illustrated in FIG. 44, the set 510 of power tools 520 may include, for example, but is not be limited to a subset of low voltage (LV) power tools 522 and a subset of high voltage (HV) power tools 524. The subset of LV power tools 522 may be, for example, power tools having an 18 Volt operating voltage and the subset of HV power tools 524 may be, for example, power tools having a 54 Volt operating voltage. An example of such an LV power tool 522 may be a drill or a circular saw. An example of such an HV power tool 524 may be a circular saw or a reciprocating saw.

The set 530 of battery packs 540 may include, for example, but is not limited to a subset of fixed voltage (sometimes also referred to as single voltage) battery packs 542 and a subset of multi-voltage capable (sometimes simply referred to as multi-voltage) battery packs 544. The subset of fixed voltage (FV) battery packs 542 may include, for example, but is not be limited to a subset of low voltage (LV) battery packs 542A and a subset of high voltage (HV) battery packs 542B. The subset of LV battery packs 542A may be, for example, battery packs having a nominal voltage of 18 V. The subset of HV battery packs 542B may be, for example, battery packs having a nominal voltage of 54 V. The subset of multi-voltage (MV) battery packs 544 may be, for example, battery packs that are able to provide a nominal voltage of 18 V or a nominal voltage of 54 V, depending upon the power tool 520 to which they are coupled.

The set 550 of battery pack chargers may include, for example, but not be limited to a subset of chargers 560 that is able to charge both the LV battery packs and the MV battery packs and a subset of chargers 570 that is able to charge both the HV battery packs and the MV battery packs.

An example of such a power tool and battery pack system is disclosed in U.S. Pat. No. 9,406,915 which is incorporated by reference.

FIG. 45*a* illustrates a representation of an example low voltage power tool 522 in the form of a drill. FIG. 45*b* illustrates a representation of an example high voltage power tool 524 in the form of a reciprocating saw. FIG. 46*a* illustrates a representation of an example fixed, low voltage battery pack 542A. FIG. 46*b* illustrates a representation of an example multi-voltage battery pack 544. FIG. 46*c* illustrates a representation of an example fixed, high voltage battery pack 542B.

Figure 47C:
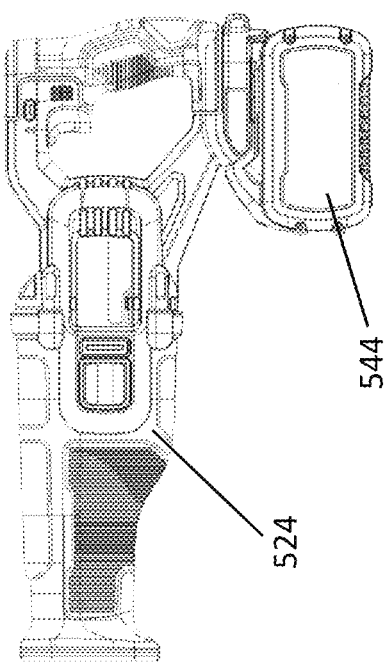
FIGS. 47a, 47b, 47c, and 47d are illustrations of the example power tools and example battery packs of the power tool system of FIG. 44 mated together in various configurations.
Figure 47D:
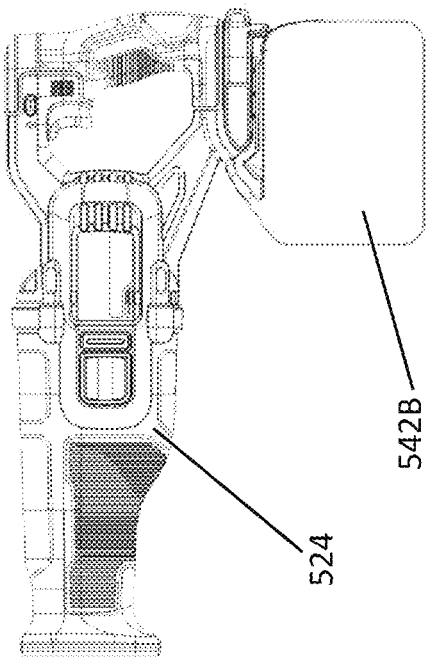
Figure 47A:
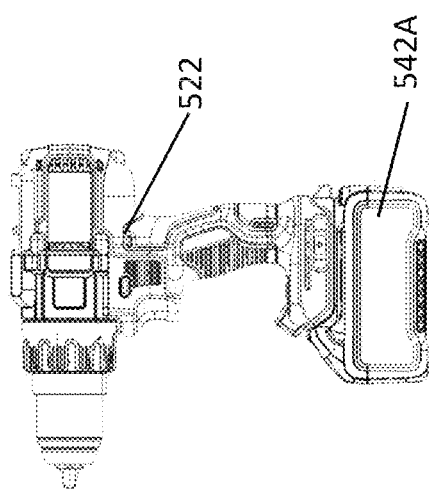
Figure 47B:
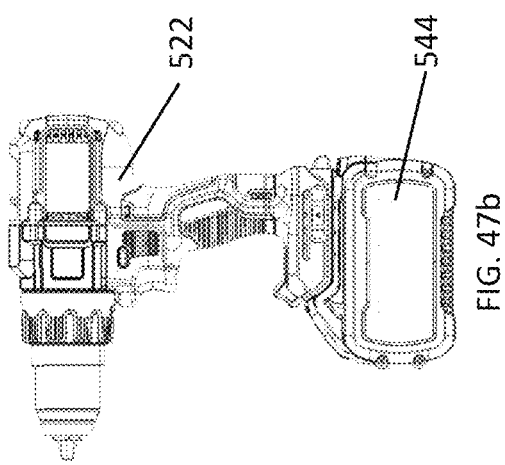

FIG. 47*a* illustrates a representation of the example low voltage power tool 522 of FIG. 45*a* coupled (mated) to the example low voltage battery pack 542A of FIG. 46*a*. FIG. 47*b* illustrates a representation of the example low voltage power tool 522 of FIG. 45*a* coupled (mated) to the example multi-voltage battery pack 544 of FIG. 46*b*. FIG. 47*c* illustrates a representation of the example high voltage power tool 524 of FIG. 45*b* coupled (mated) to the example multi-voltage battery pack 544 of FIG. 46*b*. FIG. 47*d* illustrates a representation of the high voltage power tool 524 of FIG. 45*b* coupled (mated) to the high voltage battery pack 542B of FIG. 46*c*.

FIGS. 47*a*, 47*b*, 47*c*, and 47*d* illustrate that power tools are designed and configured to operate at a particular voltage and mate with battery packs that are designed and configured to provide a nominal voltage corresponding to the operating voltage of the power tool. In other words, a low voltage power tool is designed and configured to operate with a low voltage battery pack, regardless of that low voltage value and a high voltage power tool is designed and configured to operate with a high voltage battery pack, regardless of that high voltage value. Furthermore, in a system that includes a multi-voltage battery pack that is capable of providing both a low voltage and a high voltage, the multi-voltage battery pack able to operate with both the low voltage power tool and the high voltage power tool.

Particularly, the terms "low" and "high" are intended to represent relative values to each other. In other words, "low" is simply intended to mean less than "high" and "high is simply intended to mean greater than "low." For example, a low voltage could be 18 volts and a high voltage could be 54 volts. In such an example, a low voltage power tool is designed and configured to operate at 18 volts and a high voltage power tool is designed and configured to operate at 54 volts and a low voltage battery pack is designed and configured to have a nominal voltage of 18 volts and a high voltage battery pack is designed and configured to have a nominal voltage of 54 volts and a multi-voltage battery pack is designed and configured to have a nominal voltage of 18 volts or 54 volts, depending upon the operating voltage of the power tool to which it is mated.

Figure 48:
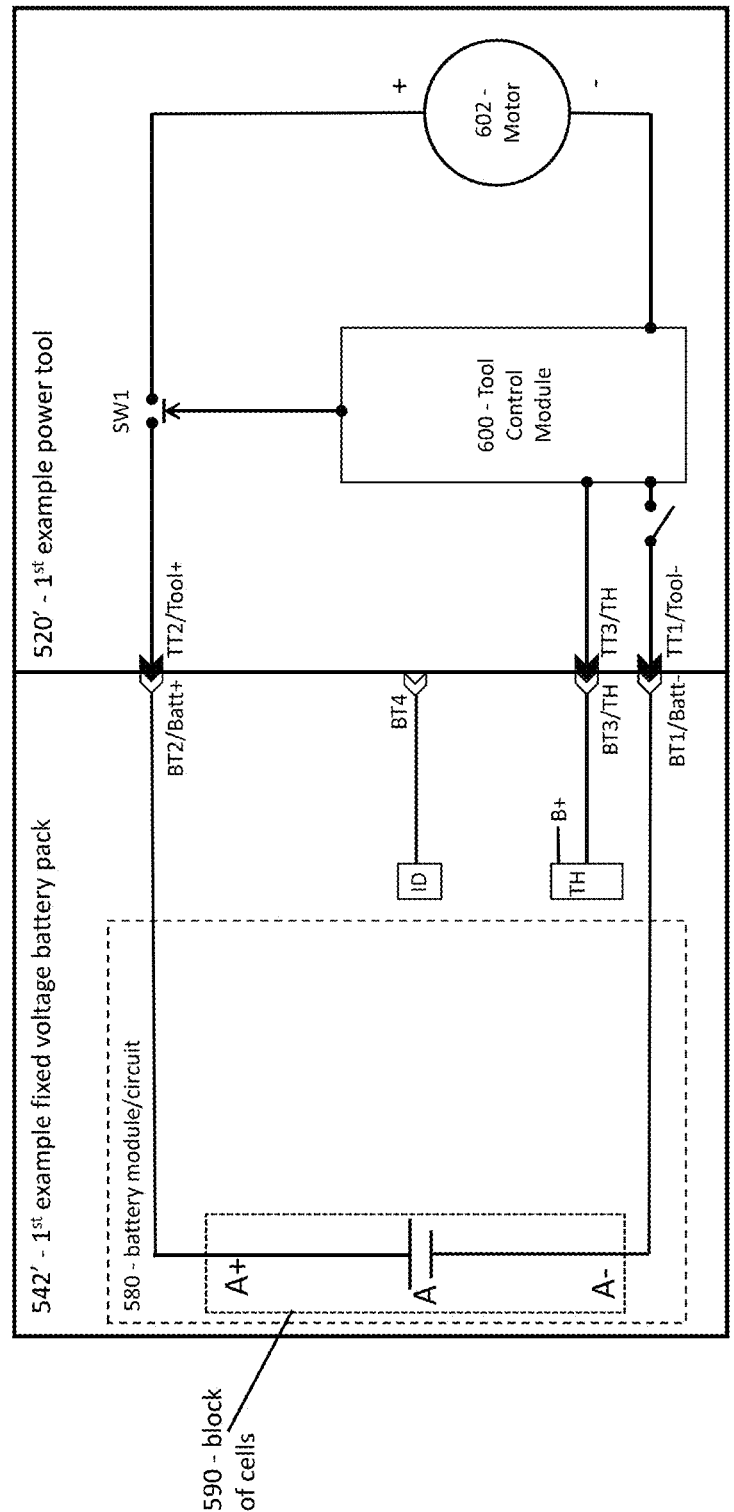
FIG. 48 is a simplified circuit diagram of a first example fixed voltage battery pack mated to a first example power tool.

FIG. 48 illustrates a simplified schematic diagram of a combination of a first example fixed voltage battery pack 542' and a first example power tool 520'. The first example fixed voltage battery pack 542' includes a set of battery pack terminals BT. The set of battery pack terminals BT may include a first subset of battery pack terminals BT1 and BT2 that operate as power terminals Batt− and Batt+, respectively. These battery pack terminals BT1/Batt− and BT2/Batt+ carry the power current from a set (or block) of battery cells (described below) from the battery pack to a coupled power tool or receive power current to the set of battery cells from a battery pack charger. The set of battery pack terminals BT may also include a second subset of battery pack terminals BT3 and BT4 that operate as signal (or data) terminals TH and ID, respectively. The signal terminals BT3 and BT4 carry relatively low current, as compared to the power terminals BT1, BT2. In this example, the battery pack terminal BT3/TH is coupled to a thermistor circuit (described below) and the battery pack terminal BT4/ID is coupled to an identification circuit (described below).

The example battery pack 542' may also include a battery module (also sometimes referred to as a battery circuit) 580. The battery module 580 may include, among other components, a block 590 of battery cells. In this example battery pack 542', the block 590 of battery cells includes a single set (also referred to as a string) of battery cells A. The set of battery cells A may include a plurality of battery cells coupled together in series. The number of battery cells coupled together in series will determine the nominal voltage of the example battery pack 542'. For example, if the battery module 580 includes five battery cells—each battery cell having a nominal voltage of 3.6 volts—coupled together in series, the battery pack 542' will have a nominal voltage of 18 volts. In an alternative example, if the battery module 580 includes fifteen battery cells—each battery cell having a nominal voltage of 3.6 volts—coupled together in series, the battery pack 542' will have a nominal voltage of 54 volts. A battery pack having a single set of battery cells, wherein the battery cells of the set of battery cells are coupled together in series is typically referred to as a 1P (or 1 parallel) battery pack. The number of cells coupled together in series within the set of battery cells typically gives the battery pack a XS designation. For example, if a battery pack includes a single set of battery cells having 5 battery cells coupled in series in the set, the battery pack may be designated as a 5S1P battery pack.

As such, if the example fixed voltage battery pack 542' is an 18 volt (nominal) battery pack then the example power tool 520' is an 18 volt (operating) power tool and if the example fixed voltage battery pack 542' is a 54 volt (nominal) battery pack then the example power tool 520' is a 54 volt (operating) power tool.

The set of battery cells A (part of the battery module) will include a positive terminal or node A+ coupled to the cathode of the most positive battery cell in the set of battery cells A and a negative terminal or node A− coupled to the anode of the most negative battery cell in the set of battery cells A. The positive terminal A+ will be coupled to the positive battery pack terminal BT2/Batt+ and the negative terminal A− will be coupled to the negative battery pack terminal BT1/Batt−.

The battery pack 542' may also include a thermistor module (also sometimes referred to as a thermistor circuit) TH. The thermistor module may have a first terminal coupled to one of the battery pack signal terminals BT3/TH.

The thermistor module may also have a second terminal coupled to a voltage source, for example a positive node of the battery module. The thermistor circuit may include a thermistor to measure the temperature of the battery cells, as is well known in the art. The thermistor may be coupled to the battery pack signal terminal BT3/TH. In the example power tool system, when the battery pack is coupled to a power tool the battery pack signal terminal BT3/TH is coupled to a power tool signal terminal TT3/TH. The power tool signal terminal TT3/TH is coupled to a power tool control module (sometimes referred to as a control circuit) 600. The power tool control module 600 measures the voltage at the signal terminal TT3/TH and/or current flowing from the signal terminal TT3/TH to the control module 600. This measurement indicates a temperature of the battery cells A. If the measurement indicates that the temperature of the battery cells exceeds a temperature threshold the power tool control module 600 will shut down the tool 520' by opening a control switch SW1 to prevent the battery cells from overheating.

Figure 48A:
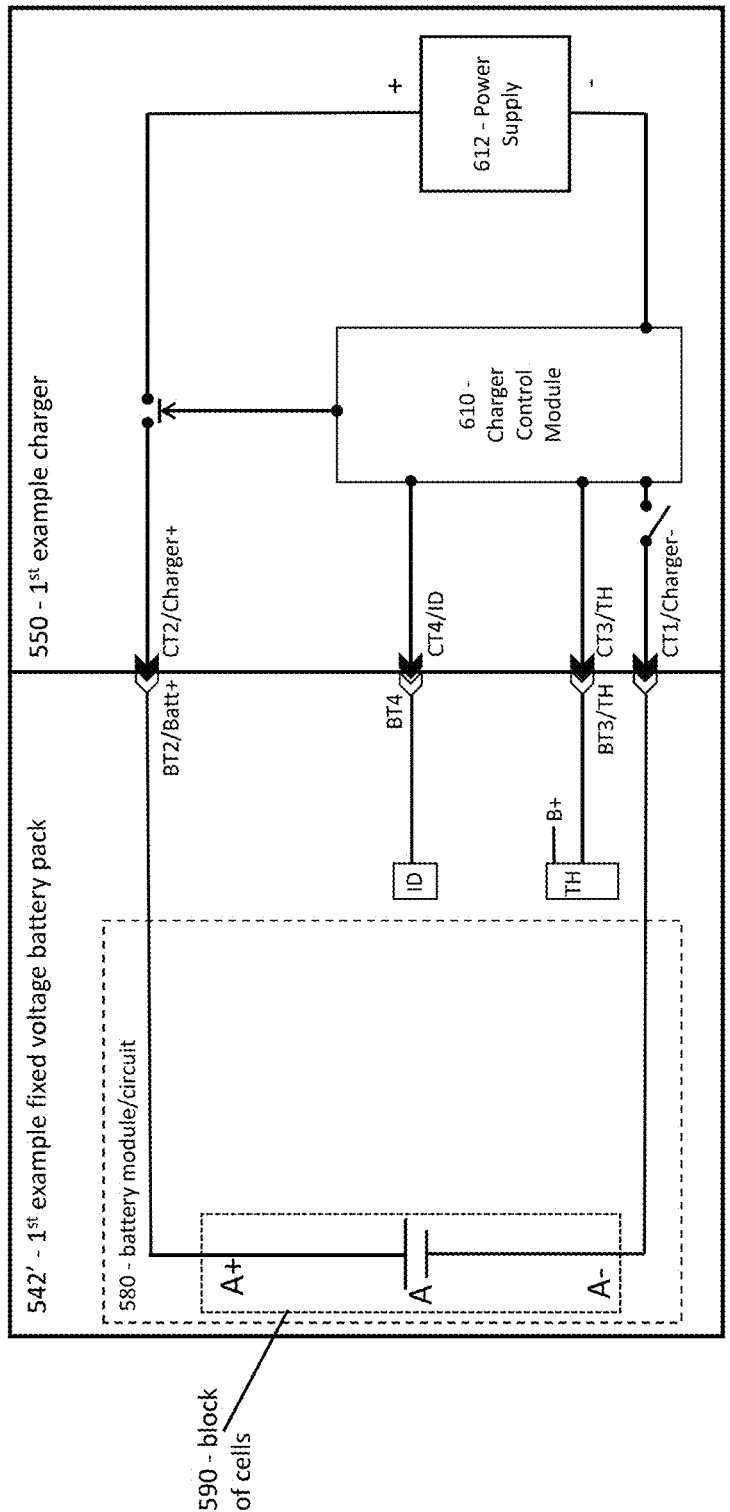
FIG. 48A is a simplified circuit diagram of a first example fixed voltage battery pack mated to a charger.

The battery pack 542' may also include an identification module (also referred to as an identification circuit) ID. The ID module may include a first terminal coupled to a battery pack signal terminal BT4/ID. In the example power system, the battery pack signal terminal BT4/ID does not couple to a signal terminal in the power tool 520' to which it is mated. Typically, when the battery pack 542' is coupled to a battery pack charger 550 (See FIG. 48A), the battery pack signal terminal BT4/ID is coupled to a battery charger terminal CT4/ID. The battery charger terminal CT4/ID is coupled to a battery charger control module (sometimes referred to as a control circuit) 610. The battery charger control module 610 measures the voltage at the battery charger terminal CT4/ID or the current flowing from the battery charger terminal CT4/ID to the battery charger control module 610. These measurements may indicate one or more characteristics, type, and/or parameters of the battery pack, including but not limited to the number of blocks 590 of battery cells and/or the number of strings of battery cells in each block 590 of battery cells and/or the number of battery cells A in each string of battery cells. The battery charger control module 610 uses these measurements to select a charging scheme for the battery pack. The charger 550 may include a power supply 612 to provide charging power to the battery pack.

As illustrated the power tool 520' includes a motor 602—sometimes also referred to as a load—and a tool control module 600—sometimes also referred to as a tool control circuit. The power tool 520', and in particular the motor 602, is configured and designed to operate at the operating voltage of the power tool 520', e.g., 18 volts or 54 volts. The tool control module 600 monitors the operation of the power tool 520' and the battery pack 542'. The tool control module 600 is coupled to the motor 602 and is able to control and alter operation of the motor 602. The motor 602 has an input and an output characteristic which may include many various parameters or factors including but not limited to speed, current, conduction angle, etc. The tool control module 600 may alter the input and output characteristics based on the type, characteristics and/or parameters of the battery pack that is attached to the power tool 520' in order to change the performance of the power tool 520'. This altered characteristic can provide better performance for a user and/or protect the battery pack 542'.

The power tool also includes a set of power tool terminals TT. The set of power tool terminals TT includes a subset of power terminals TT1/Tool− and TT2/Tool+. The power tool power terminals TT1/Tool− and TT2/Tool+ couple to the battery pack power terminals BT1/Batt− and BT2/Batt+, respectively, when the power tool 520' mates with a battery pack 542' and couple to the motor 602 to provide power to the motor 602 to operate the power tool 520'. The set of power tool terminals TT also includes a subset of signal terminals TT3/TH. The power tool signal terminal TT3/TH couples to the battery pack signal terminal BT3/TH when the power tool 520' mates with a battery pack and couples to the tool control module 600 to provide data from the mated battery pack to the power tool control module 600. The information provided from the battery pack to the power tool control module 600 via the BT3/TH-TT3/TH connection may enable the power tool control module 600 to control and adjust the operation of the power tool 520'.

Figure 49:
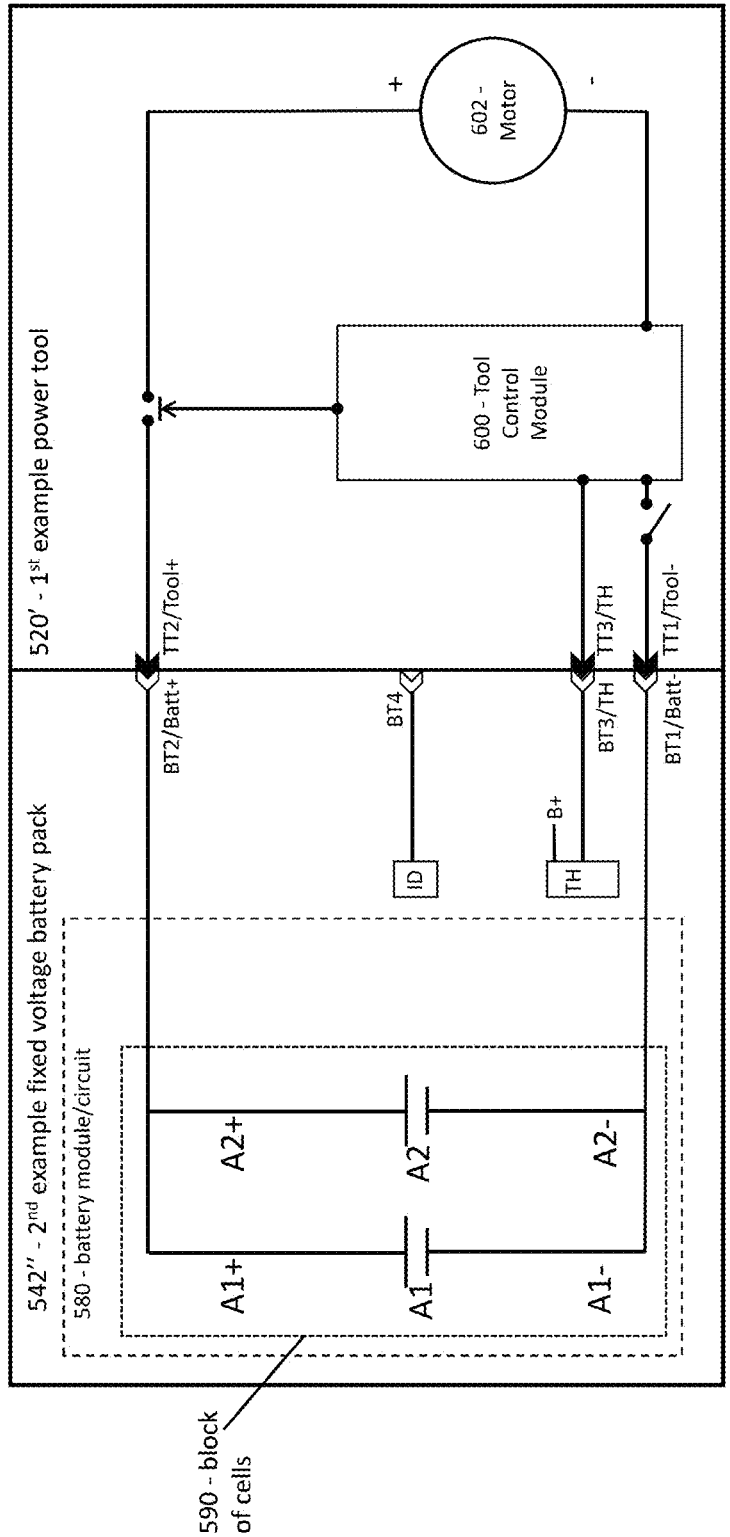
FIG. 49 is a simplified circuit diagram a second example fixed voltage battery pack mated to the first example power tool.

FIG. 49 illustrates a simplified schematic diagram of a combination of a second example fixed voltage battery pack 542" coupled to the first example power tool 520'. Except as described below, the second example battery pack 542" is the same as the first example battery pack 542'. The second example fixed voltage battery pack 542" differs from the first example fixed voltage battery pack 542' in that the block 590 of battery cells of the battery module 580 includes a first set (or string) of battery cells A1 and a second set (or string) of battery cells A2. The first set of battery cells A1 and the second set of battery cells A2 are similar to the set of battery cells A of the first example fixed voltage battery pack 542' of FIG. 48. Specifically, the first and second sets of battery cells A1, A2 will have the same number of battery cells coupled together in series. In other words, if the set of battery cells A1 includes a set of 5 battery cells coupled together in series to form an 18 volt set than the set of battery cells A2 will also include a set of 5 battery cells coupled together in series to form an 18 volt set. As with the first set of battery cells A, the first and second sets of battery cells A1, A2 will have a positive node A1+, A2+, respectively and a negative node A1−, A2−, respectively. In this example battery pack the positive node A1+ of the first set of battery cells A1 and the positive node A2+ of the second set of battery cells A2 are coupled together and are also coupled to the positive battery pack terminal BT2/Batt+ and the negative node A1− of the first set of battery cells A1 and the negative node A2− of the second set of battery cells A2 are coupled together and are also coupled to the negative battery pack terminal BT1/Batt−. As is well known in the art, by having two strings of battery cells coupled together in parallel, the capacity—Ampere-Hours (AHr)—of the battery pack is doubled. Based on the designation nomenclature noted above, assuming each string includes 5 battery cells coupled in series, this example battery pack would be designated as a 5S2P battery pack.

Figure 50:
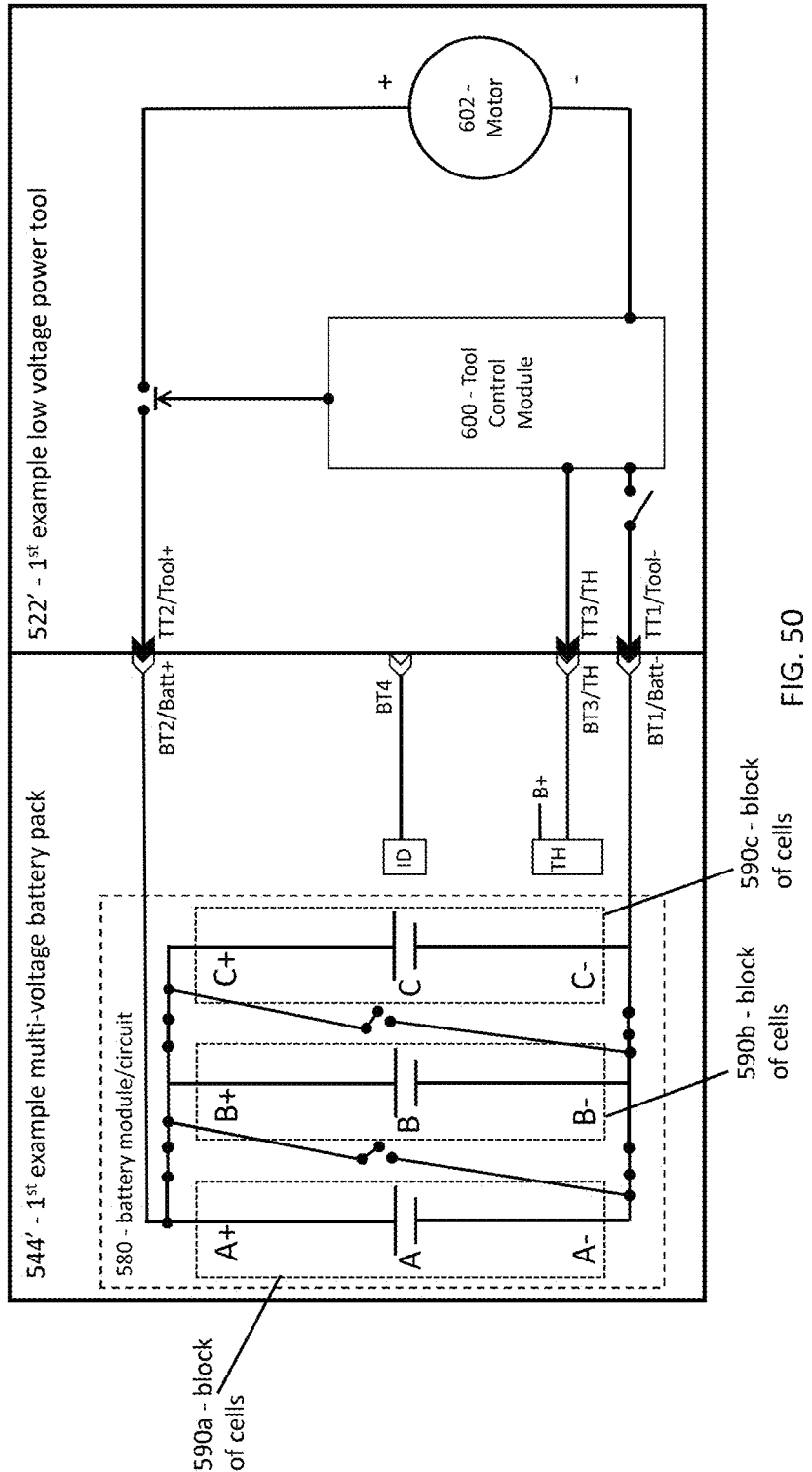
FIG. 50 is a simplified circuit diagram of a first example multi-voltage battery pack mated to a first example low voltage power tool.

FIG. 50 illustrates a simplified schematic diagram of a combination of a first example multi-voltage battery pack 544' coupled to a first example low voltage power tool 522'. The first example multi-voltage voltage battery pack 544' differs from the first example fixed voltage battery pack 542' in that the battery module 580 of the first example multi-voltage battery pack 544' includes three blocks 590a, 590b, 590c of battery cells—each block 590 of battery cells including a single string of battery cells A, B, C—and circuitry—in the form of a switching network—that is designed and configured to connect the blocks 590a, 590b, 590c of battery cells in a parallel configuration as the battery pack 544' is coupled to a low voltage power tool 522'.

The first example low voltage power tool 522' is an example of the example power tool 520' noted above in FIGS. 48 and 49 and illustrated in FIGS. 45a and 47a. The first example low voltage power tool 522' is designed and configured to operate at a relatively low voltage, for example 18 V. As illustrated in FIG. 50, when the example low voltage power tool 522' is coupled to the example multi-voltage battery pack 544' the switching network is configured to couple the blocks 590*a*, 590*b*, 590*c* of battery cells together in a parallel configuration. As such, the example multi-voltage battery pack 544' is in a low voltage configuration and is configured to have a "low" nominal voltage, for example 18 V, that matches the operating voltage of the connected "low" operating voltage power tool 522'. In alternate embodiments, the multi-voltage battery pack may include (a) only two blocks 590 of battery cells or (b) more than three blocks 590 of battery cells, that may be coupled together in parallel by the switching network.

Figure 51:
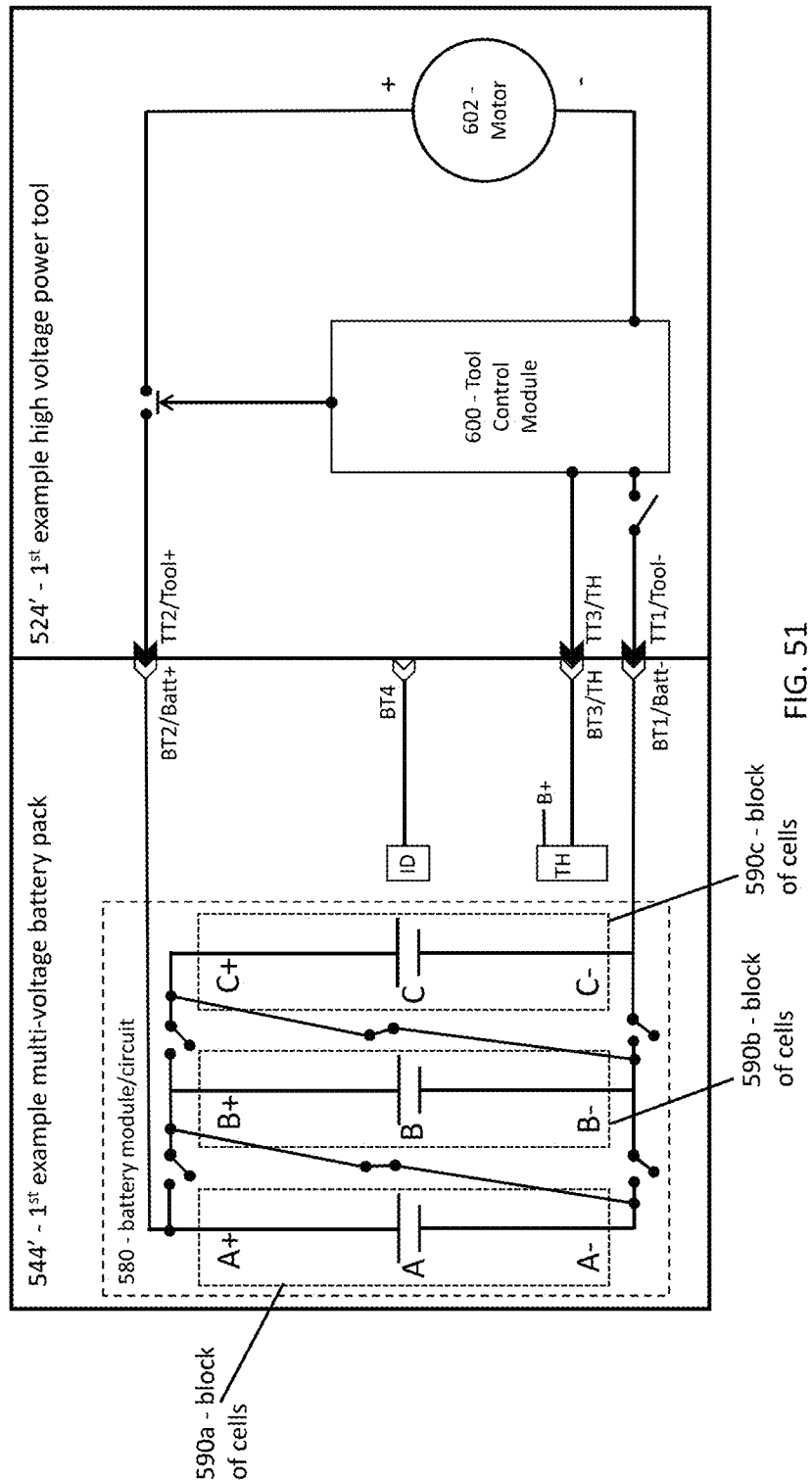
FIG. 51 is a simplified circuit diagram of the first example multi-voltage battery pack mated to a first example high voltage power tool.

FIG. 51 illustrates a simplified schematic diagram of a combination of the first example multi-voltage battery pack 544' coupled to a first example high voltage power tool 524'. The first example multi-voltage voltage battery pack 544' also differs from the first example fixed voltage battery pack 542' in that the battery module 580 includes three blocks 590*a*, 590*b*, 590*c* of battery cells—each block 590 of battery cells including a single string of battery cells A, B, C—and circuitry—in the form of a switching network—that is designed and configured to connect the blocks 590 of battery cells in a series configuration as the battery pack 544' is coupled to a high voltage power tool 524'.

The first example high voltage power tool 524' is an example of the example power tool 520' noted above in FIGS. 48 and 49 and illustrated in FIGS. 45*b* and 47*c*. The first example high voltage power tool 524' is designed and configured to operate at a relatively high voltage, for example 54 V. As illustrated in FIG. 51, when the example high voltage power tool 524' is coupled to the example multi-voltage battery pack 544' the switching network is configured to couple the first, second and third blocks 590*a*, 590*b*, 590*c* of battery cells together in a series configuration. As such, the example multi-voltage battery pack 544' is in a high voltage configuration and is configured to have a "high" nominal voltage, for example 54 V, that matches the operating voltage of the connected "high" operating voltage power tool 524'. In alternate embodiments, the multi-voltage battery pack 544' may include (a) only two blocks 590 of battery cells or (b) more than three blocks 590 of battery cells, that may be coupled together in series by the switching network.

An example of multi-voltage battery pack is disclosed and described in U.S. Pat. No. 10,056,582, which is incorporated herein by reference. Based on the designation nomenclature noted above, assuming each string includes 5 battery cells coupled in series, this example battery pack may be designated as a 5S3P (when the battery pack is in the low voltage configuration/parallel configuration) and as a 15S1P (when the battery pack is in the high voltage configuration/series configuration).

Figure 52:
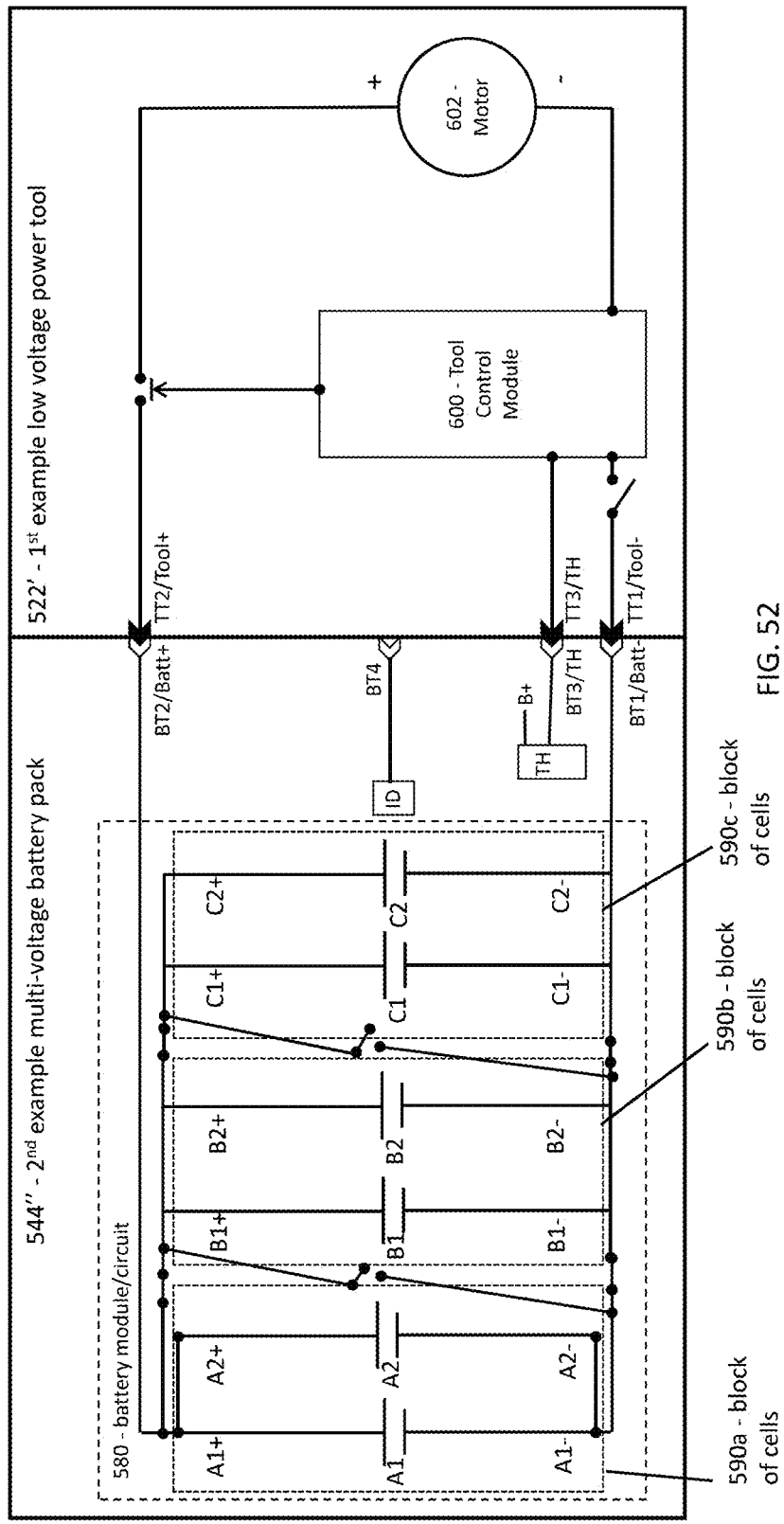
FIG. 52 is a simplified circuit diagram of a second example multi-voltage battery pack mated to the first example low voltage power tool.

FIG. 52 illustrates a simplified schematic diagram of a combination of a second example multi-voltage battery pack 544" coupled to the first example low voltage power tool 522'.

The second example multi-voltage battery pack 544" differs from the first example multi-voltage battery pack 544' in that the battery module 580 includes a first block 590*a* of battery cells including a first set (or string) of battery cells A1 coupled in parallel to a second set (or string) of battery cells A2, a second block 590*b* of battery cells including a first set of battery cells B1 coupled in parallel to a second set of battery cells B2, and a third block 590*c* of battery cells including a first set of battery cells C1 coupled in parallel to a second set of battery cells C2. The blocks 590*a*, 590*b*, 590*c* of the second example multi-voltage battery pack 544" are similar to the block 590 of battery cells of the second example fixed voltage battery pack 542" in that the first and second sets of battery cells A1, A2; B1, B2; C1, C2 of the blocks 590*a*, 590*b*, 590*c*, respectively, of the second example multi-voltage battery pack 544" are similar to the first and second sets of battery cells A1, A2 of the block 590 of battery cells of the second example fixed voltage battery 542" pack of FIG. 49. Specifically, the first and second sets of battery cells A1, A2; B1, B2; C1, C2 will each have the same number of battery cells coupled together in series.

As illustrated in FIG. 52, when the example low voltage power tool 522' is coupled to the example multi-voltage battery pack 544" the switching network is configured to couple the first, second and third blocks 590*a*, 590*b*, 590*c* of battery cells together in a parallel configuration. As such, the example multi-voltage battery pack 544" is in a low voltage configuration and is configured to have a "low" nominal voltage, for example 18 V, that matches the operating voltage of the connected "low" operating voltage power tool 522'. In alternate embodiments, the multi-voltage battery pack 544" may include (a) only two blocks 590 of battery cells or (b) more than three blocks 590 of battery cells, that may be coupled together in parallel by the switching network.

Figure 53:
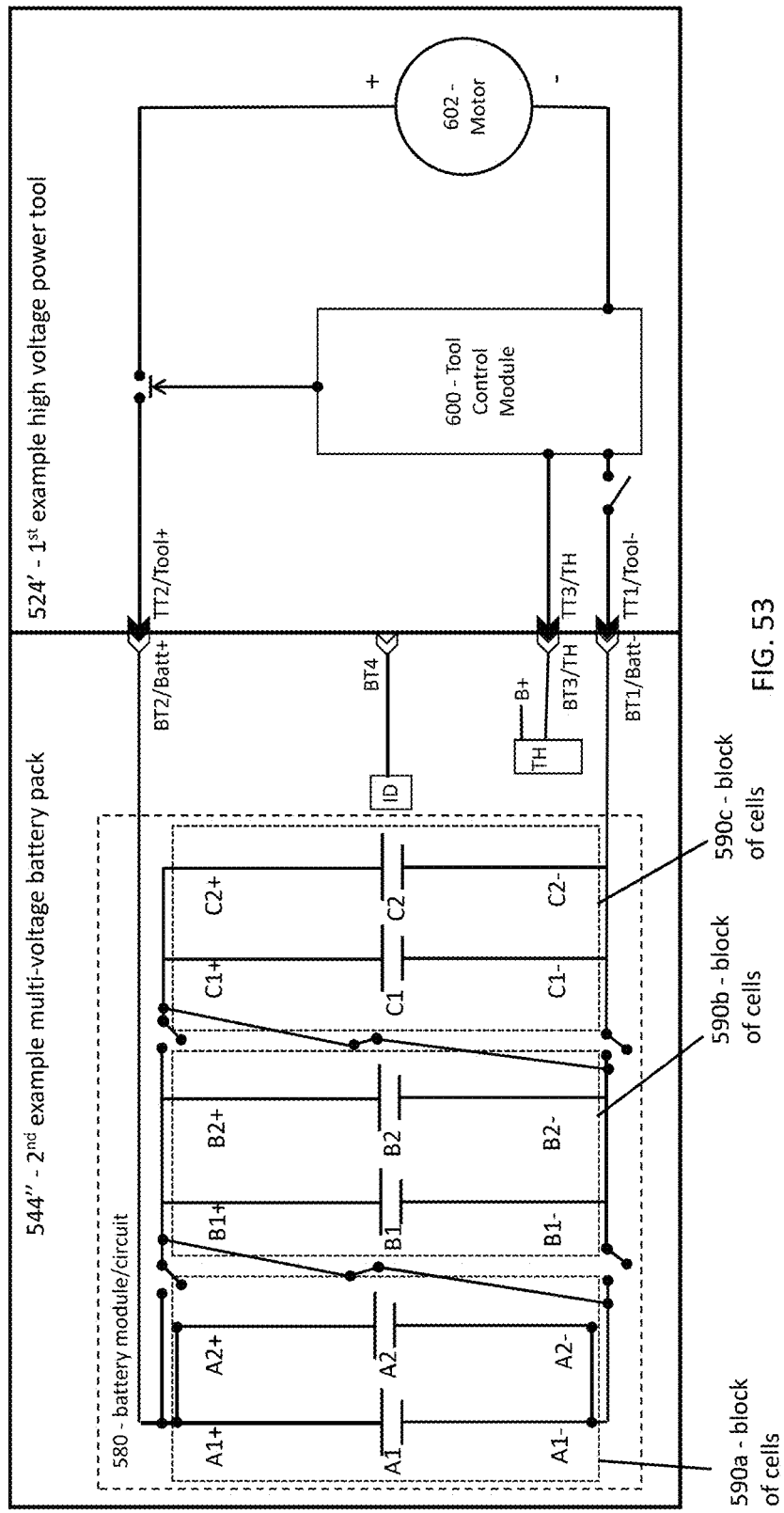
FIG. 53 is a simplified circuit diagram of the second example multi-voltage battery pack mated to the first example high voltage power tool.

FIG. 53 illustrates a simplified schematic diagram of a combination of the second example multi-voltage battery pack 544" coupled to the first example high voltage power tool 524'.

As illustrated in FIG. 53, when the example high voltage power tool 524' is coupled to the example multi-voltage battery pack 544" the switching network is configured to couple the blocks 590*a*, 590*b*, 590*c* of battery cells together in a series configuration. As such, the example multi-voltage battery pack 544" is in a high voltage configuration and is configured to have a "high" nominal voltage, for example 54 V, that matches the operating voltage of the connected "high" operating voltage power tool 524'. In alternate embodiments, the multi-voltage battery pack 544" may include (a) only two blocks of battery cells or (b) more than three blocks of battery cells, that may be coupled together in series by the switching network.

A string of battery cells—battery cells sometimes simply referred to hereinafter as cells—is a set of cells connected in series. For example, FIG. 48 illustrates a string or set of cells A. The set of cells may include two or more cells connected in series. In another example, FIG. 49 illustrates two strings or sets of cells A1 and A2 connected in parallel. In another example, FIG. 50 illustrates three strings or sets of cells A, B, and C connected in parallel. FIGS. 48 and 49 illustrate example configurations including a block or blocks of cells. One way to describe these cell configurations—and by extension a battery pack including these cell configurations—is by the number of cells in the set of cells connected in series (x), the number of sets of cells connected in parallel (y), and the number of blocks of cells (z). In other words, in fixed voltage battery packs, the cells—or the packs themselves—can be referred to as xSxzP where S stands for cells in series in the set of cells and P stands for sets of cells in parallel.

As such, the cells of FIG. 48 may be described as xS1P and the cells of FIG. 49 may be described as xS2P. The x will be replaced by the number of cells in a set. For example, if the set A of FIG. 48 includes 5 cells connected in series, the cell configuration may be referred to as 5S1P. And, with regard to FIG. 49, if the set A1 includes 5 cells connected in series and the set A2 includes 5 cells connected in series, the cell configuration may be referred to as 5S2P.

FIGS. 48 and 49 illustrate fixed voltage battery packs that are only capable of producing or providing a single output voltage. There also exist multi-voltage battery packs that are capable of producing or providing two output voltages. In multi-voltage battery packs there is at least a first block of battery cells and a second block of battery cells. It can be said that fixed voltage battery packs include only a single block of cells.

FIGS. 50 and 51 illustrate an example of a set of cells of a multi-voltage battery pack. There is a first block of cells, a second block of cells, and third block of cells. The multi-voltage battery pack is capable of coupling the blocks of cells in series or in parallel. Similar to the fixed voltage battery packs, multi-voltage battery packs can be described using the nomenclature noted above. However, different than fixed voltage battery packs, multi-voltage battery packs, having two different configurations, require a definition for each configuration. When in the low voltage configuration, the definition for the configuration is the same as for fixed voltage battery packs. However, when the multi-voltage battery packs are in the high voltage configuration, the configuration is defined as xzSyP.

FIGS. 50 and 51 illustrate a first block 590a of cells having a single set of cells (A), a second block 590b of cells having a single set of cells (B), and a third block 590c of cells having a single set of cells (C). The first block 590a of cells includes a xS1P configuration, the second block 590b of cells includes an xS1P configuration, and the third block 590c of cells includes an xS1P configuration. As such, as illustrated in FIG. 50, when the first block 590a of cells, the second block 590b of cells, and the third block 590c of cells are coupled together in parallel, the blocks of cells present an xS3P configuration and as illustrated in FIG. 51, when the first block 590a of cells, the second block 590b of cells, and the third block 590c of cells are coupled together in series, the blocks of cells present a 3×S1P configuration. The x will be replaced by the number of cells in a set. As such, if the set A includes 5 cells connected in series, the set B includes 5 cells connected in series, and the set C includes 5 cells connected in series, then, as illustrated in FIG. 50, when the blocks are connected in parallel, the cell configuration may be referred to as 5S3P configuration and as illustrated in FIG. 51, when the blocks of cells are connected in series, the cell configuration may be referred to as 15S1P configuration.

FIGS. 52 and 52 illustrate another example of a set of cells of a multi-voltage battery pack. Similar to the first example multi-voltage battery pack, is a first block 590a of cells, a second block 590b of cells, and third block 590c of cells. The multi-voltage battery pack is capable of coupling the blocks of cells in series or in parallel.

FIGS. 52 and 53 illustrate a first block 590a of cells having a first set of cells (A1) and a second set of cells (A2) coupled in parallel, a second block 590b of cells having a first set of cells (B1) and a second set of cells (B2) coupled in parallel, and a third block 590c of cells having a first set of cells (C1) and a second set of cells (C2) coupled together in parallel. The first block 590a of cells includes an xS2P configuration, the second block 590b of cells includes an xS2P configuration, and the third block 590c of cells includes an xS2P configuration. As such, as illustrated in FIG. 52, when the first block 590a of cells, the second block 590b of cells, and the third block 590c of cells are coupled together in parallel, the blocks of cells present an xS6P configuration and as illustrated in FIG. 53, when the first block 590a of cells, the second block 590b of cells, and the third block 590c of cells are coupled together in series, the blocks of cells present a 3×S2P configuration. The x will be replaced by the number of cells in a set. As such, if the sets A1 and A2 each include 5 cells connected in series, the sets B1 and B2 each include 5 cells connected in series, and the sets C1 and C2 each include 5 cells connected in series, then, as illustrated in FIG. 52, when the blocks 590a, 590b, 590c are connected in parallel, the cell configuration may be referred to as 5S6P configuration and as illustrated in FIG. 53, when the blocks 590a, 590b, 590c of cells are connected in series, the cell configuration may be referred to as 15S2P configuration.

Using pack/tool identification, the power tools that operate with multi-voltage capable battery packs can know if the power tool is using a 1P or 2P battery pack for tool performance.

In multi-voltage battery packs, when the battery pack is in a low voltage mode or configuration (as shown, for example, in FIGS. 50 and 52) there is a first capacitance value at a specified battery pack terminal and when the battery pack is in a high voltage mode or configuration (as shown, for example, in FIGS. 51 and 53) there is a second, different capacitance value at the specified battery pack terminal. The second capacitance value may be higher than the first capacitance value. In the example battery pack, as the battery pack switches from low voltage mode to high voltage mode by coupling with the high voltage power tool, the capacitance value at the specified battery pack terminal changes through a set of switches. The power tools that do not include pack detect circuitry (non-pack detect capable power tools) are not able to monitor/sense the capacitance or capacitance changes at the specified battery pack terminal, e.g., the thermistor battery terminal. The non-pack detect power tools default to the first, lower capacitance as the tool does not look for the capacitance on the specified—thermistor—battery terminal, e.g., BT3/TH. The power tools that do include pack detect circuitry (pack detect capable power tools) are able to monitor/sense the capacitance or capacitance changes at the specified—thermistor—terminal. The pack detect capable power tools are able to adjust the tool performance when higher performance capable battery packs are coupled to the power tool.

A power tool without pack detect circuitry will default to a lower performance level. If the battery pack includes pack detect circuitry, the battery pack will switch the capacitance into the circuit.

The example power tools and battery packs illustrated in FIGS. 45-53 and described above may or may not include pack detect circuitry. In other words, (a) the power tools may or may not include power tool pack detect circuitry, for example as part of the tool control module/circuitry, that may identify a battery pack to the power tool and (b) the battery packs may or may not include battery pack, pack detect circuitry, for example as part of the thermistor module/circuit, that may identify the battery pack to the power tool.

Figure 54:
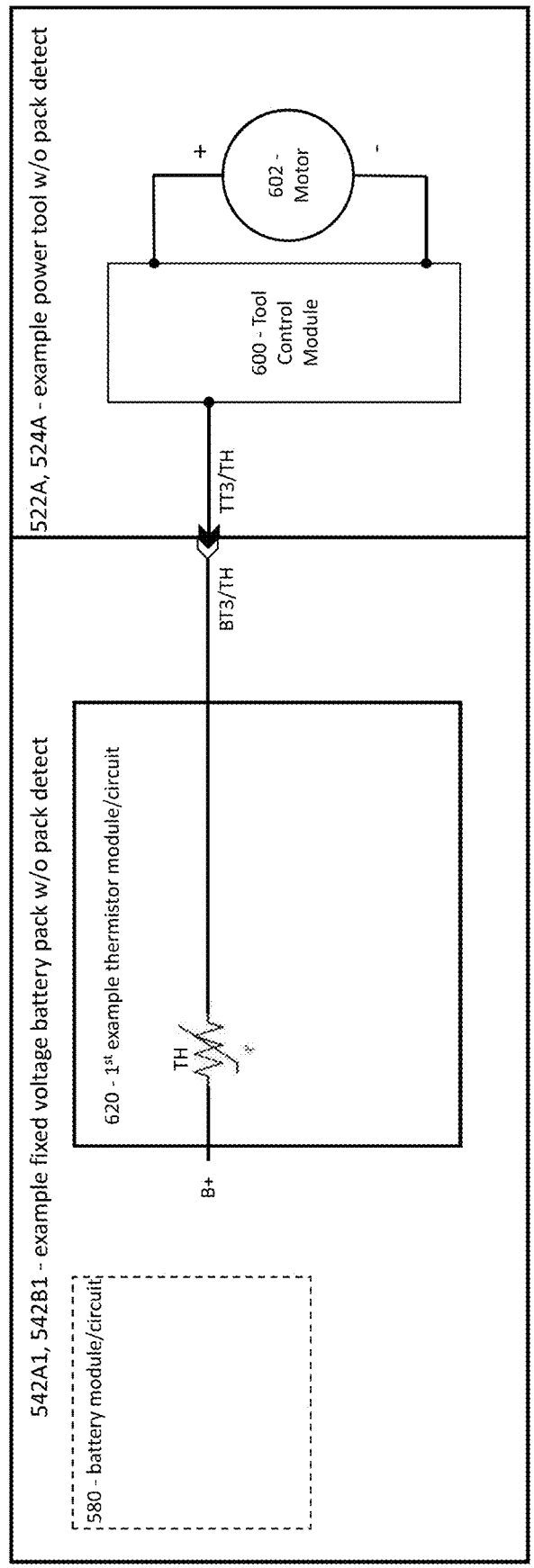
FIG. 54 is a simplified circuit diagram of an example fixed voltage battery pack without pack detection circuitry mated to an example power tool without pack detection circuitry.

Referring to FIG. 54, there is illustrated an example fixed voltage battery pack 542A1 or 542B1, such as the battery pack illustrated in FIG. 46a or 46c, without pack detect circuitry mated to an example power tool 522A or 524A, such as the power tool illustrated in FIG. 45a or 45b, without pack detect circuitry. This example fixed voltage battery pack 542A1, 542B1 includes a first example thermistor module/circuit 620. The first example thermistor module/circuit 620 may include, among other components not illustrated herein for purposes of simplicity, a thermistor (TH). The thermistor may be, for example, a negative temperature coefficient (NTC) thermistor. The thermistor includes a first terminal and a second terminal. The first thermistor terminal may be coupled to a specified battery pack terminal, such as battery pack terminal BT3/TH. The second thermistor terminal may be coupled to a reference voltage, for example, the positive terminal B+ of the B-string of battery cells. The thermistor TH is placed near one or more of the battery cells. As the temperature of the battery cells changes, the resistance of the thermistor changes. As the resistance of the thermistor changes, the voltage on the thermistor battery pack terminal BT3/TH changes. This voltage may be present at the power tool thermistor terminal TT3/TH and monitored, sensed and read by the power tool control module/circuit 600. This example thermistor module/circuit 620 does not include pack detect circuitry.

Figure 55:
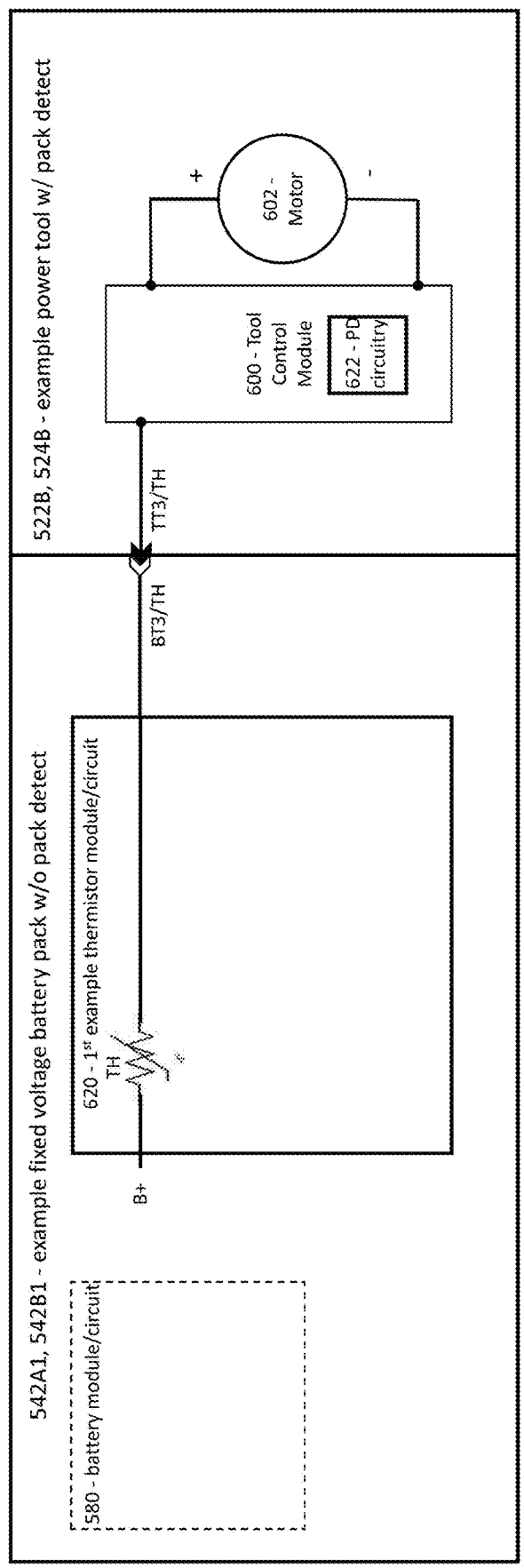
FIG. 55 is a simplified circuit diagram of the example fixed voltage battery pack without pack detection circuitry mated to an example power tool with pack detection circuitry.

Referring to FIG. 55, there is illustrated an example fixed voltage battery pack 542A1, 542B1, such as the battery pack illustrated in FIG. 46a or 46c, without pack detect circuitry mated to an example power tool 522B, 524B, such as the power tool illustrated in FIG. 45a or 45b, with pack detect circuitry. The illustrated example power tool does include pack detect circuitry 622. The pack detect circuitry 622 may be included as part of the tool control module/circuit 600. The power tool pack detect circuitry 602 may include circuitry that monitors the power tool thermistor terminal TT3/TH to determine a capacitance at the power tool thermistor terminals TT3/TH. While the example power tool 522B, 524B does include the pack detect circuitry 622, as the battery pack 542A1, 542B1 does not include pack detect circuitry, the power tool 522B, 524B is unable to detect characteristics about the battery pack 542A1, 542B1 to enable the power tool 522B, 542B to alter its motor output control schemes. As such, the example power tool 522B, 524B will operate under a default motor output control scheme that is compatible with the lowest performing battery pack that is able to couple to the power tool 522B, 542B.

Figure 56:
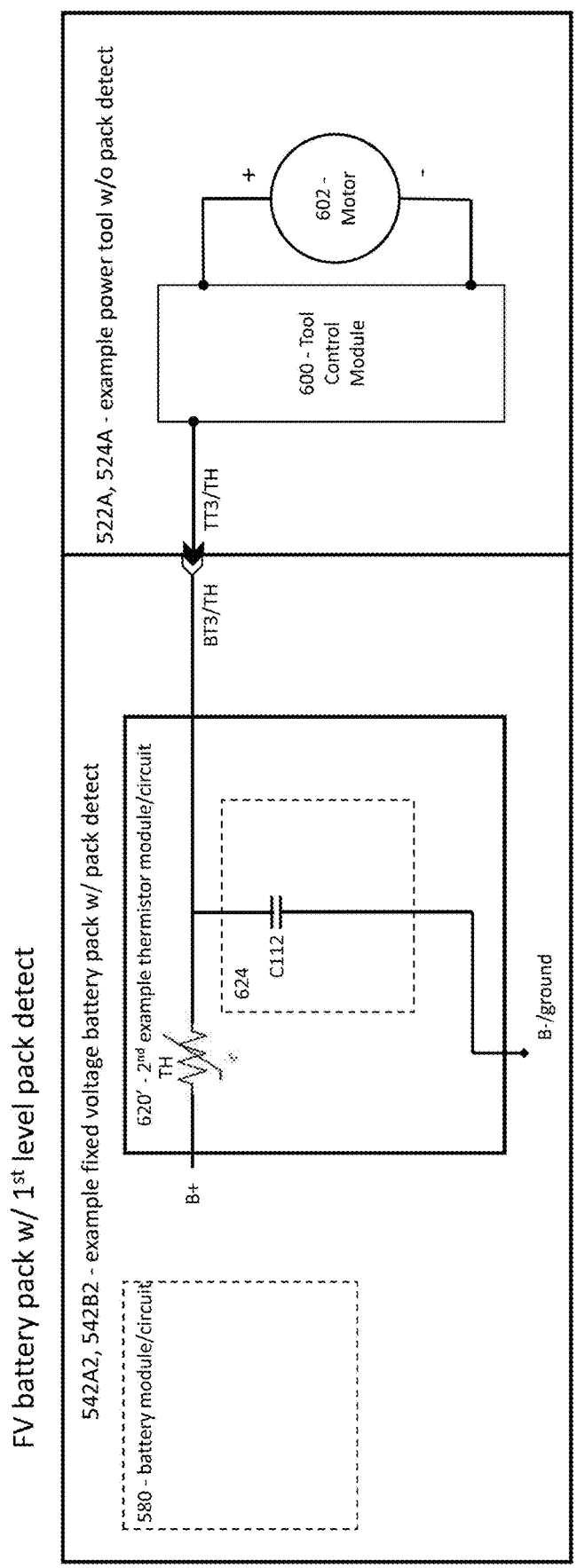
FIG. 56 is a simplified circuit diagram of the example fixed voltage battery pack with a first level of pack detection circuitry mated to an example power tool without pack detection circuitry.

Referring to FIG. 56, there is illustrated an example fixed voltage battery pack 542A2, 542B2, such as the battery pack illustrated in FIG. 46a or 46c, including pack detect circuitry. The fixed voltage battery pack 542A2, 542B2 may be mated to an example power tool 522A, 524A, such as the power tool illustrated in FIG. 45a or 45b, without pack detect circuitry. The example fixed voltage battery pack 542A2, 542B2 may include a second example thermistor module/circuit 620'. The second example thermistor module/circuit 620' may include a thermistor, as described above. The second example thermistor module/circuit 620' may include a first example pack detect circuitry 624. The first example pack detect circuitry 624 may be referred to as a first level pack detect circuitry. The first level pack detect circuitry 624 may include a capacitor C112. The capacitor C112 may include a first terminal and a second terminal. The first capacitor terminal is coupled to the battery pack thermistor terminal BT3/TH and the second capacitor terminal is coupled to a ground reference, for example, the B− node of the B string of battery cells. The capacitor C112 will present a capacitance value, depending upon its capacitance, at the battery pack thermistor terminal BT3/TH. The capacitance value of the capacitor C112 will be representative of the battery pack characteristic or profile. For example, a capacitor having a first capacitance value might indicate that the battery pack is a 1P battery pack and a capacitor having a second capacitance value might indicate that the battery pack is a 2P battery pack. As the example power tool 522A, 524A does not include pack detect circuitry, the example power tool will operate under a default motor output control scheme that is compatible with the lowest performing battery pack that is able to couple to the power tool.

Capacitor C112 may have an example capacitance value of 47 nF for a 1P battery pack and an example capacitance value of 67 nF for a 2P battery pack.

Figure 57:
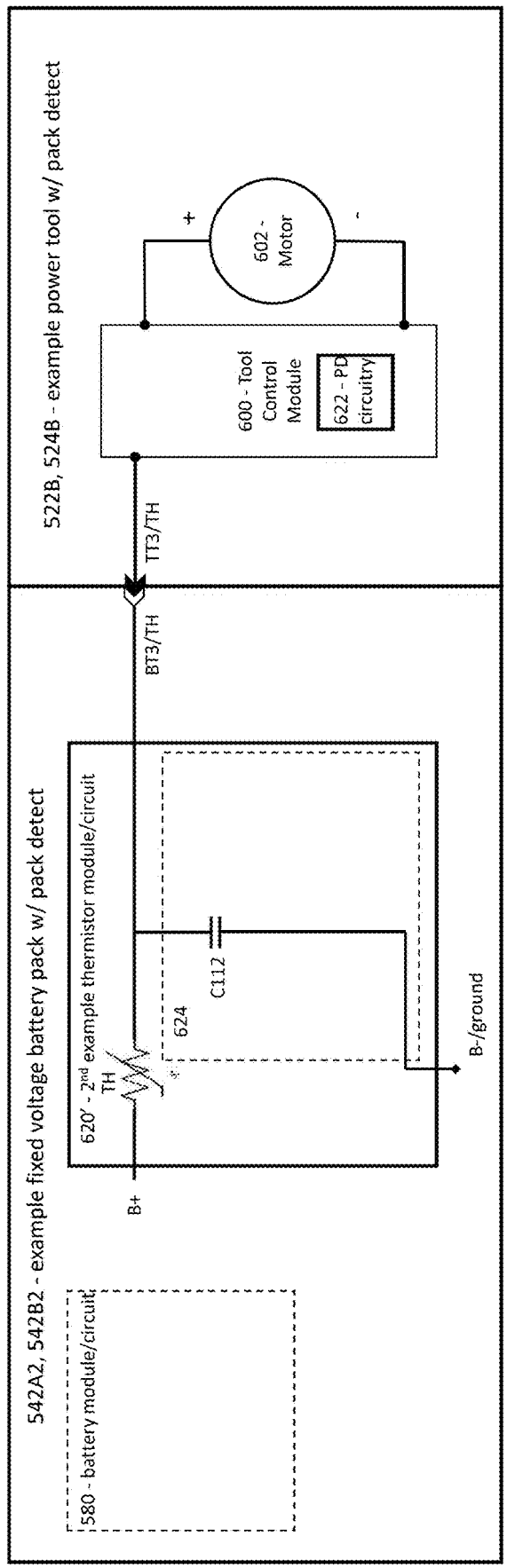
FIG. 57 is a simplified circuit diagram of the example fixed voltage battery pack with a first level of pack detection circuitry mated to an example power tool with pack detection circuitry.

Referring to FIG. 57, there is illustrated an example fixed voltage battery pack 542A2, 542B2, such as the battery pack illustrated in FIG. 46a or 46c, with a first level pack detect circuitry 624 mated to an example power tool 522B, 524B, such as the power tool illustrated in FIG. 45a or 45b, with pack detect circuitry 622. The example multi-voltage battery pack 542A2, 542B2 may include the second example thermistor module/circuit 620'. The second example thermistor module/circuit 620' is as described above. As the example power tool 522B, 52B includes the pack detect circuitry 622 and the battery pack 542A2, 542B2 includes the first level pack detect circuitry 624, the power tool 522B, 524B is able to detect characteristics about the battery pack 542A2, 542B2 to enable the example power tool 522B, 524B to alter its motor output control schemes. As such, the example power tool 522B, 524B will alter or select a motor output control scheme that performs best with the attached battery pack 542A2, 542B2, as indicated by the capacitance sensed at the power tool thermistor terminal TT3/TH.

Figure 58:
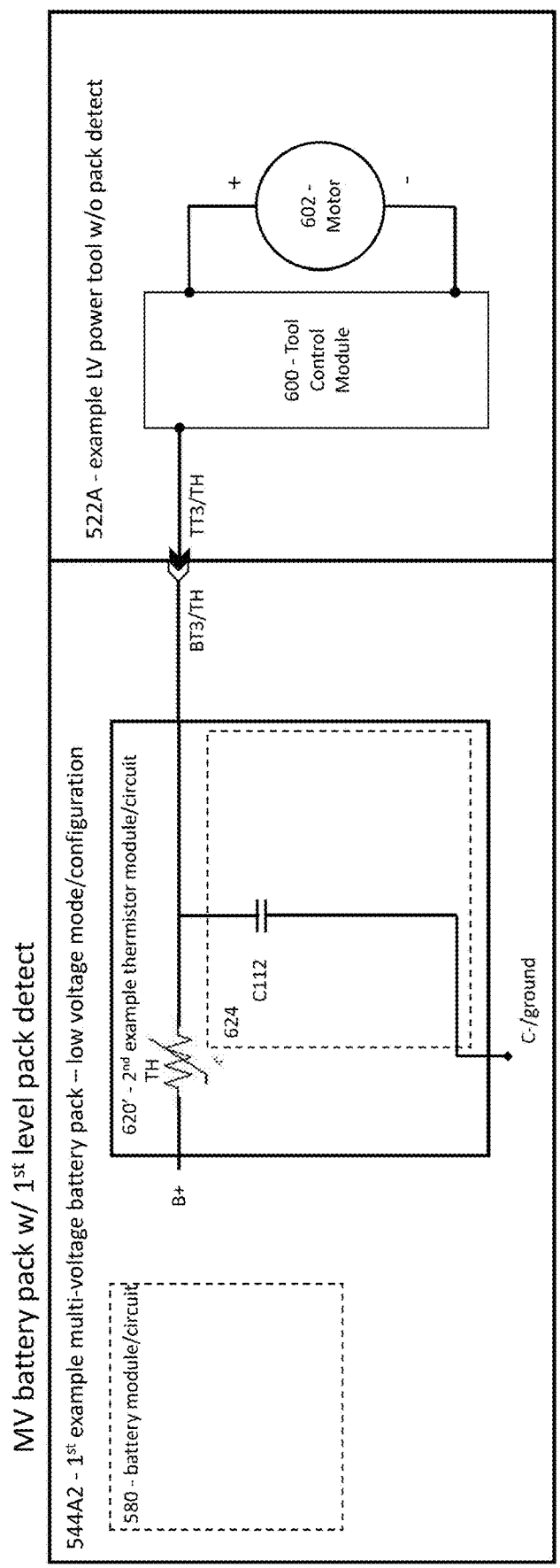
FIG. 58 is a simplified circuit diagram of an example multi-voltage battery pack with a first level of pack detection circuitry mated to an example low voltage power tool without pack detection circuitry.

Referring to FIG. 58, there is illustrated an example multi-voltage battery pack 544A2, such as the battery pack illustrated in FIG. 46b, with a first level pack detect circuitry 624 mated to an example low voltage power tool 522A, such as the power tool illustrated in FIG. 45a, without pack detect circuitry. This combination of example battery pack 544A2 and power tool 552A operates the same as the combination of example battery pack 542A2, 542B2 and power tool 522A, 524A illustrated in FIG. 56, with respect to altering the motor output control scheme.

Figure 59:
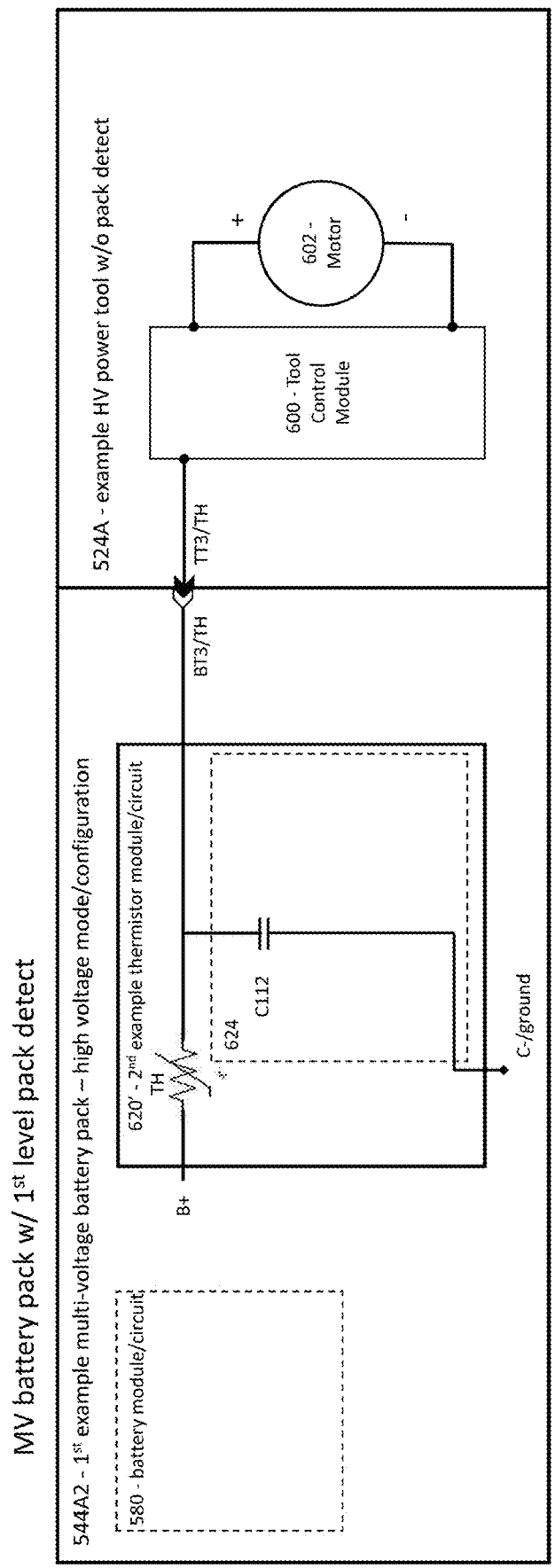
FIG. 59 is a simplified circuit diagram of an example multi-voltage battery pack with a first level of pack detection circuitry mated to an example high voltage power tool without pack detection circuitry.

Referring to FIG. 59, there is illustrated an example multi-voltage battery pack 544A2, such as the battery pack illustrated in FIG. 46b, with a first level pack detect circuitry 624 mated to an example high voltage power tool 524A, such as the power tool illustrated in FIG. 45b, without pack detect circuitry. This combination of example battery pack 544A2 and power tool 524A operates the same as the combination of example battery pack 542A2, 542B2 and power tool 522A, 524A illustrated in FIG. 56, with respect to altering the motor output control scheme.

Figure 60:
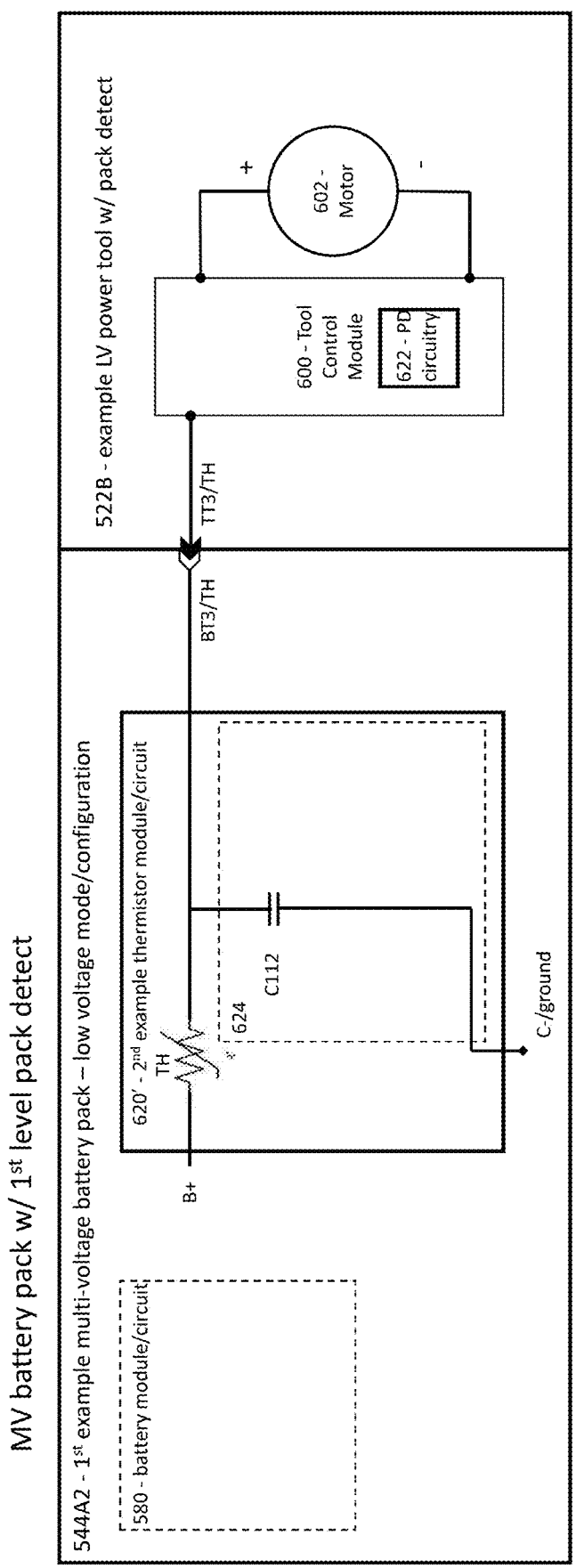
FIG. 60 is a simplified circuit diagram of an example multi-voltage battery pack with a first level of pack detection circuitry mated to an example low voltage power tool with pack detection circuitry.

Referring to FIG. 60, there is illustrated an example multi-voltage battery pack 544A2, such as the battery pack illustrated in FIG. 46b, with a first level pack detect circuitry 624 mated to an example low voltage power tool 522B, such as the power tool illustrated in FIG. 45a, with pack detect circuitry 622. This combination of example battery pack 544A2 and power tool 522B operates the same as the combination of example battery pack 542A2, 542B2 and power tool 522B, 524B illustrated in FIG. 57, with respect to altering the motor output control scheme.

Figure 61:
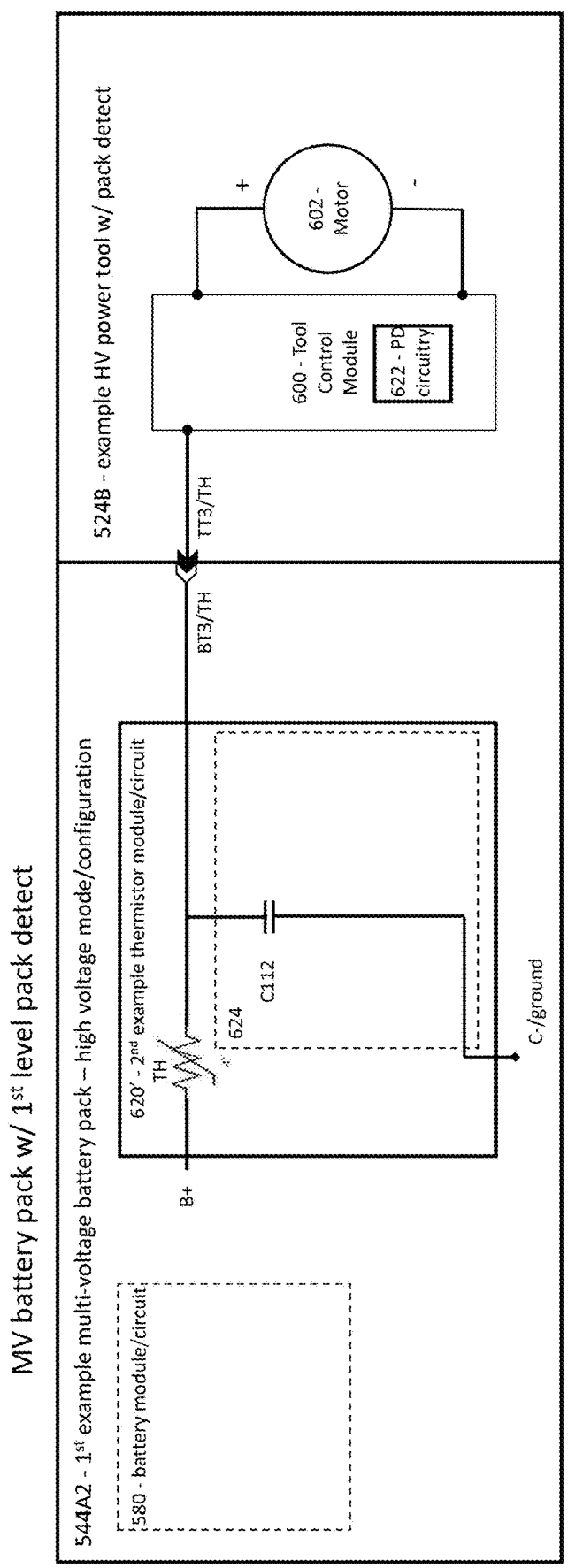
FIG. 61 is a simplified circuit diagram of an example multi-voltage battery pack with a first level of pack detection circuitry mated to an example high voltage power tool with pack detection circuitry.

Referring to FIG. 61, there is illustrated an example multi-voltage battery pack 544A2, such as the battery pack illustrated in FIG. 46b, with a first level pack detect circuitry 620' mated to an example high voltage power tool 524B, such as the power tool illustrated in FIG. 45b, with pack detect circuitry 622. This combination of example battery pack 544A2 and power tool 524B operates the same as the combination of example battery pack 542A2, 542B2 and power tool 522B, 524B illustrated in FIG. 57, with respect to altering the motor output control scheme.

Figure 62:
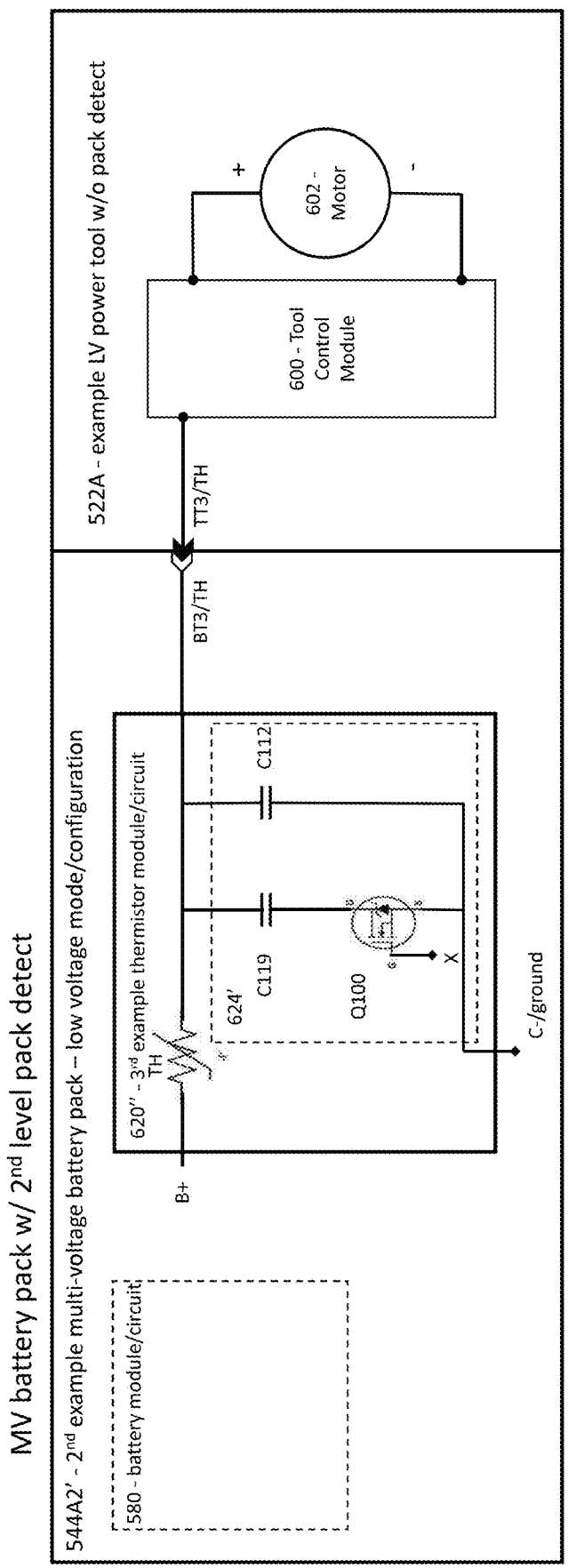
FIG. 62 is a simplified circuit diagram of an example multi-voltage battery pack with a second level of pack detection circuitry mated to an example low voltage power tool without pack detection circuitry.

Referring to FIG. 62, there is illustrated an example multi-voltage battery pack 544A2', such as the battery pack illustrated in FIG. 46b, with an example second level pack detect circuitry 624' mated to an example low voltage power tool 522A, such as the power tool illustrated in FIG. 45a, without pack detect circuitry. As illustrated in FIG. 62, because the example power tool 522A is a low voltage (e.g., 20 volt) power tool when the power tool 522A is mated to the example multi-voltage battery pack 544A2', the example multi-voltage battery pack 544A2' is in low voltage (e.g., 20 V) mode. When in low voltage mode, the voltage X is of a value such that Q100 is open. Therefore, only C112 is in the circuit between terminal BT3/TH and C−/ground. Because the power tool 522A does not have pack detection/sensing capability, the tool control module/circuit cannot (does not) monitor/sense the capacitance on the TT3/TH terminal. Therefore, the tool 522A cannot (does not) determine whether or not the battery pack 544A2' is capable of supplying the output (power, voltage, current) to enable the motor 602 to operate under alternate output characteristics/schemes. As such, the power tool 522A' operates under a standard, default output scheme for the least capable multi-voltage battery packs.

Referring to FIG. 62, the example thermistor module 620" may include, among other components, a thermistor (TH) having a first terminal coupled to a battery pack terminal, for example the battery pack thermistor terminal (BT3/TH) and a second terminal coupled to a node of one of the strings or blocks of battery cells. In this example, the second terminal of the thermistor is coupled to the B+ node of the battery cells. The thermistor module also includes pack detect circuitry 624'. The pack detect circuitry may include a first capacitor (C112). The first capacitor C112 has a first terminal coupled to the battery pack thermistor terminal (BT3/TH) and a second terminal coupled to ground or a relative ground, for example, the C-node of the battery cells. The pack detect circuitry 624' may also include a second capacitor (C119) and a first switch (Q100). The first switch (Q100) may be a transistor, such as for example, a field effect transistor (FET). The second capacitor (C119) has a first terminal coupled to the battery pack thermistor terminal (BT3/TH) and a second terminal coupled to a drain terminal (D) of the transistor (Q100). In addition to the drain of the transistor (Q100) being coupled to the second terminal of the second capacitor (C119), the transistor (Q100) includes a source terminal coupled to the ground (C−). The transistor (Q100) also includes a gate terminal coupled to a node capable of changing values depending upon a type of power tool coupled to the battery pack, as will be explained in more detail below.

With regard to FIG. 62, when the example battery pack 544A2' couples to a low voltage power tool 522A, the blocks 590 of battery cells are coupled together in parallel—referred to as a low voltage configuration or mode. In the low voltage configuration, in a battery pack 544A2' having the example thermistor module 620", the value X at the gate of switch (transistor) Q100 is set to a value such that the switch Q100 is open. When the switch Q100 is open only capacitor C112 is in the circuit between the BT3/TH terminal and ground or a relative ground (C−). The capacitance value of C112 indicates battery characteristics, for example, the number and manner in which the strings of cells are connected. Because the power tool 522A does not include pack detect circuitry, the tool control module/circuit 600 cannot (does not) monitor/sense the capacitance on the TH terminal to determine whether or not the battery pack is capable of meeting alternate motor output control characteristics/schemes. It has a standard default for conventional multi-voltage battery packs.

Figure 63:
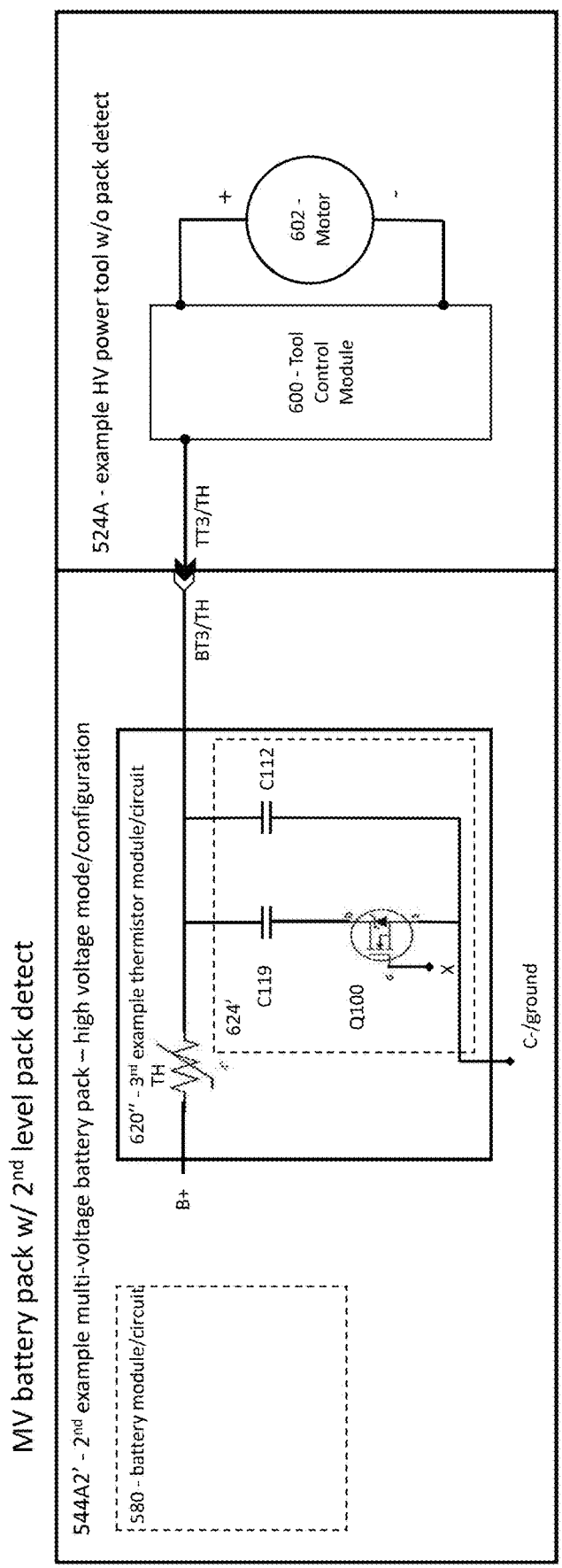
FIG. 63 is a simplified circuit diagram of an example multi-voltage battery pack with a second level of pack detection circuitry mated to an example high voltage power tool without pack detection circuitry.

Referring to FIG. 63, there is illustrated an example multi-voltage battery pack 544A2', such as the battery pack illustrated in FIG. 46b, with an example second level pack detect circuitry 624' mated to an example high voltage power tool 524A, such as the power tool illustrated in FIG. 45b, without pack detect circuitry. As illustrated in FIG. 63, because the example power tool 524A is a high voltage (e.g., 60 volt) power tool when the power tool 524A is mated to the example multi-voltage battery pack 544A2', the example multi-voltage battery pack 544A2' is in high voltage (e.g., 60 V) mode. When the battery pack 544A2' is in high voltage mode, X is of a value such that Q100 is closed. Therefore, both capacitors C112 and C119 are in the circuit between terminal BT3/TH and C−/ground. The capacitance value of C112 and C119 in parallel indicates battery characteristics, for example, the number and manner in which the strings of cells are connected. Because the power tool 524A does not include pack detect circuitry, the tool control module/circuit 600 cannot (does not) monitor/sense the capacitance on the TH terminal to determine whether or not the battery pack is capable of meeting alternate motor output control characteristics/schemes. It has a standard default for conventional multi-voltage battery packs.

The power tool does not include a tool control module/circuit that monitors/senses the capacitance on the TT3/TH terminal. The power tool control module does not adjust the output characteristics/scheme of the power tool based on the battery characteristics. The power tool has a standard default scheme for multi-voltage battery packs.

Figure 64:
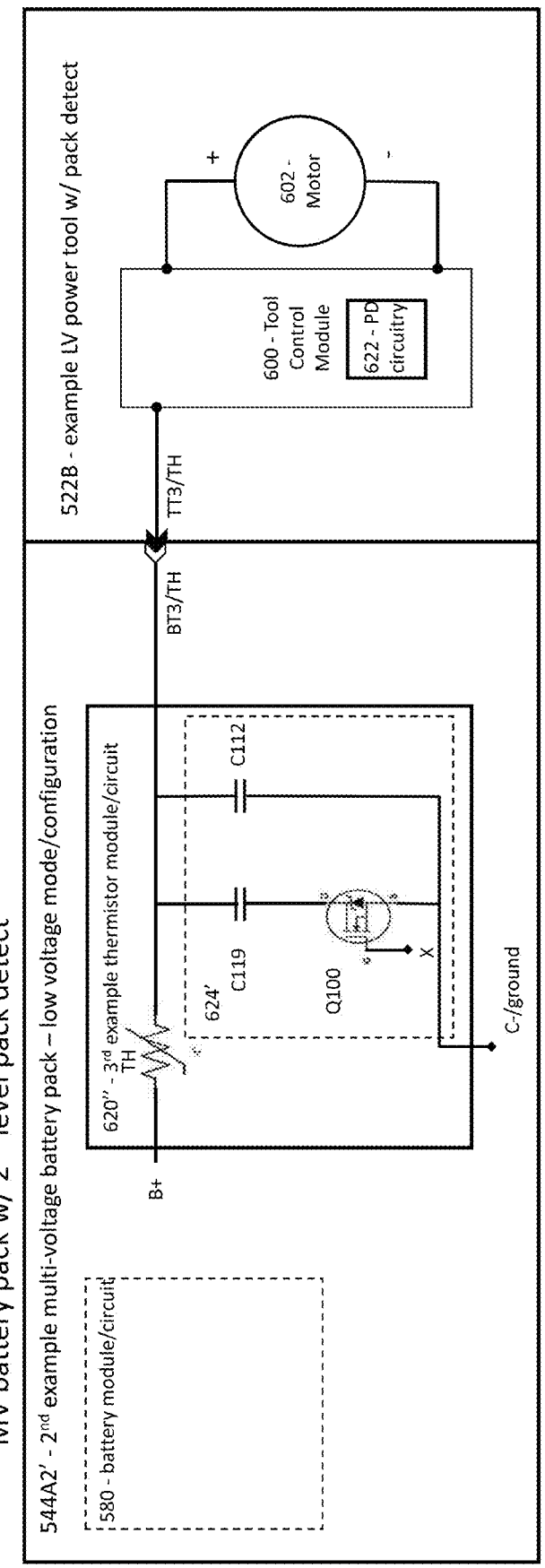
FIG. 64 is a simplified circuit diagram of an example multi-voltage battery pack with a second level of pack detection circuitry mated to an example low voltage power tool with pack detection circuitry.

Referring to FIG. 64, there is illustrated an example multi-voltage battery pack 544A2', such as the battery pack illustrated in FIG. 46b, with a second level pack detect circuitry 624' mated to an example low voltage power tool 522B, such as the power tool illustrated in FIG. 45a, with pack detect circuitry 622. As illustrated in FIG. 64, because the example power tool 522B is a low voltage (e.g., 20 volt) power tool when the power tool 522B is mated to the example multi-voltage battery pack 544A2', the example multi-voltage battery pack 544A2' is in low voltage (e.g., 20 V) mode. When in low voltage mode, X is of a value such that Q100 is open. Therefore, only C112 is in the circuit between terminal BT3/TH and C−/ground. The capacitance value of C112 indicates battery characteristics, for example, the number and manner in which the strings of cells are connected.

As the example power tool 522B includes the pack detect circuitry 622 and the battery pack includes the second level pack detect circuitry 624', the power tool 522B is able to detect characteristics about the battery pack 544A2' to enable the power tool 522B to alter its motor output control schemes. As such, the example power tool 522B will alter or select a motor output control scheme that performs best with the attached battery pack, as indicated by the capacitance sensed at the power tool thermistor terminal TT3/TH.

Figure 65:
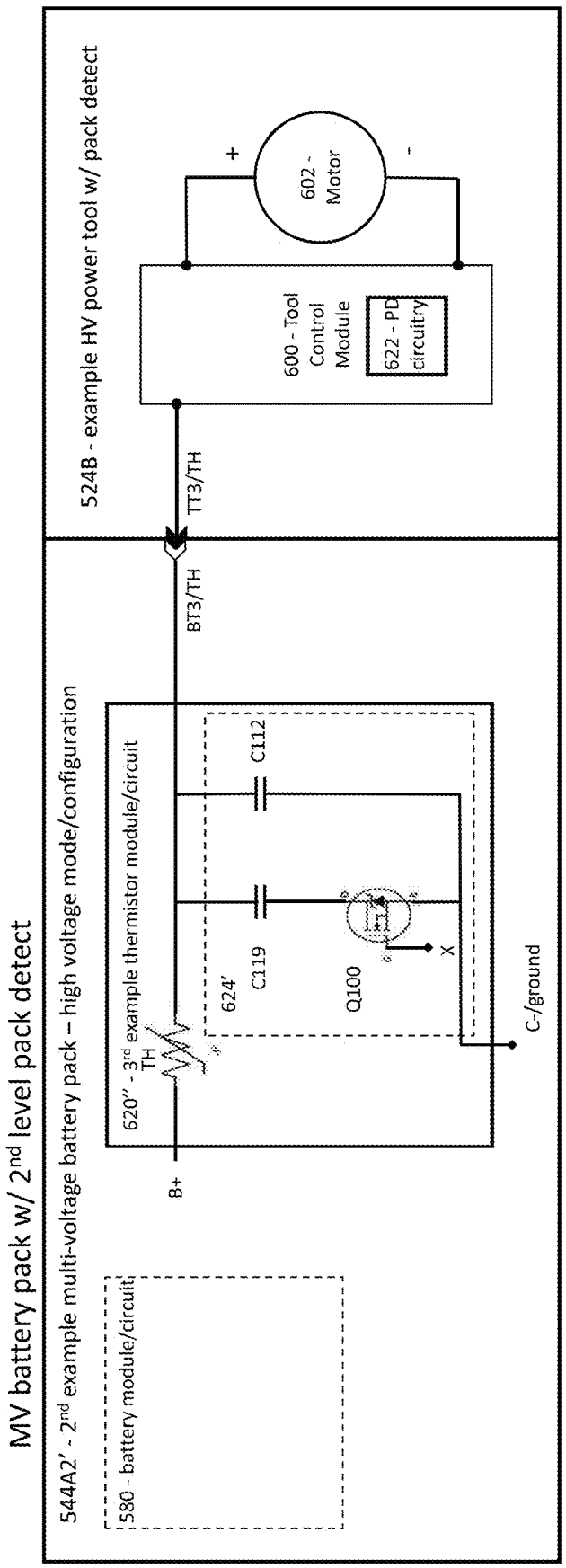
FIG. 65 is a simplified circuit diagram of an example multi-voltage battery pack with a second level of pack detection circuitry mated to an example high voltage power tool with pack detection circuitry.

Referring to FIG. 65, there is illustrated an example multi-voltage battery pack 544A2', such as the battery pack illustrated in FIG. 46b, with a second level pack detect circuitry 624' mated to an example high voltage power tool 524B, such as the power tool illustrated in FIG. 45b, with pack detect circuitry 622. As illustrated in FIG. 65, because the example power tool 524B is a high voltage (e.g., 60 volt) power tool when the power tool 524B is mated to the example multi-voltage battery pack 544A2', the example multi-voltage battery pack 544A2' is in high voltage (e.g., 60 V) mode. When the battery pack 544A2' is in high voltage mode, X is of a value such that Q100 is closed. Therefore, both capacitors C112 and C119 are in the circuit between terminal BT3/TH and C−/ground. This capacitance value indicates battery characteristics, for example, the number and manner in which the strings of cells are connected.

Capacitor C112 and capacitor C119 may have an example capacitance value of 47 nF.

As the example power tool 524B includes the pack detect circuitry 622 and the battery pack 544A2' includes the second level pack detect circuitry 624', the power tool 524B is able to detect characteristics about the battery pack 544A2' to enable the power tool 524B to alter its motor output control schemes. As such, the example power tool 524B will alter or select a motor output control scheme that performs best with the attached battery pack, as indicated by the capacitance sensed at the power tool thermistor terminal TT3/TH.

The power tool 524B may include a tool control module/circuit 600 that monitors/senses the capacitance on the TT3/TH terminal. The power tool control module 600 may adjust the output characteristics/scheme of the power tool 524B based on the battery characteristics. The power tool 524B may have a standard default output scheme and alternate output schemes for multi-voltage battery packs 544. Because the power tool 524B does have pack detection/sensing capability, the tool control module/circuit 600 can (does) monitor/sense the capacitance on the TT3/TH terminal. Therefore, the power tool 524B can (does) determine whether or not the battery pack 544A2' is capable of supplying the output (power, voltage, current) to enable the motor 602 to operate under alternate output characteristics/schemes. As such, the power tool 524B operates under the most effective and efficient output scheme possible for the attached multi-voltage battery pack 544A2'.

Figure 66:
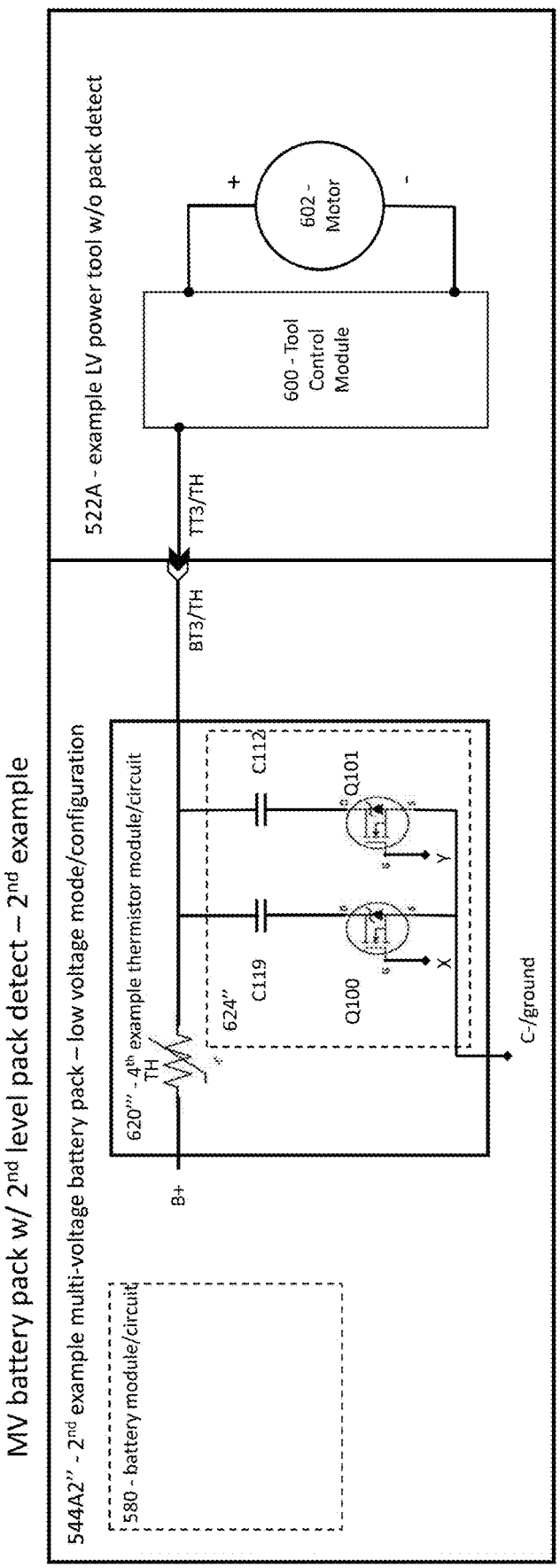
FIG. 66 is a simplified circuit diagram of an example multi-voltage battery pack with an alternative second level of pack detection circuitry mated to an example low voltage power tool without pack detection circuitry.

Referring to FIG. 66, there is illustrated an example multi-voltage battery pack 544A2", such as the battery pack illustrated in FIG. 46b, with a second example second level pack detect circuitry 624" mated to an example low voltage power tool 522A, such as the power tool illustrated in FIG. 45a, without pack detect circuitry. As illustrated in FIG. 66, because the example power tool 522A is a low voltage (e.g., 20 volt) power tool when the power tool 522A is mated to the example multi-voltage battery pack 544A2", the example multi-voltage battery pack 544A2" is in low voltage (e.g., 20 V) mode. When in low voltage mode, X is of a value such that Q100 is open and Y is of a value such that Q101 is closed so only C112 is in the circuit between terminal BT3/TH and C−/ground. The capacitance value of C112 indicates battery characteristics, for example, the number and manner in which the strings of cells are connected. Because the power tool 522A does not include pack detect circuitry, the tool control module/circuit 600 cannot (does not) monitor/sense the capacitance on the TT3/TH terminal to determine whether or not the battery pack 544A2" is capable of meeting alternate motor output control characteristics/schemes. The power tool 522A has a standard default motor output control scheme for multi-voltage battery packs 544.

Figure 67:
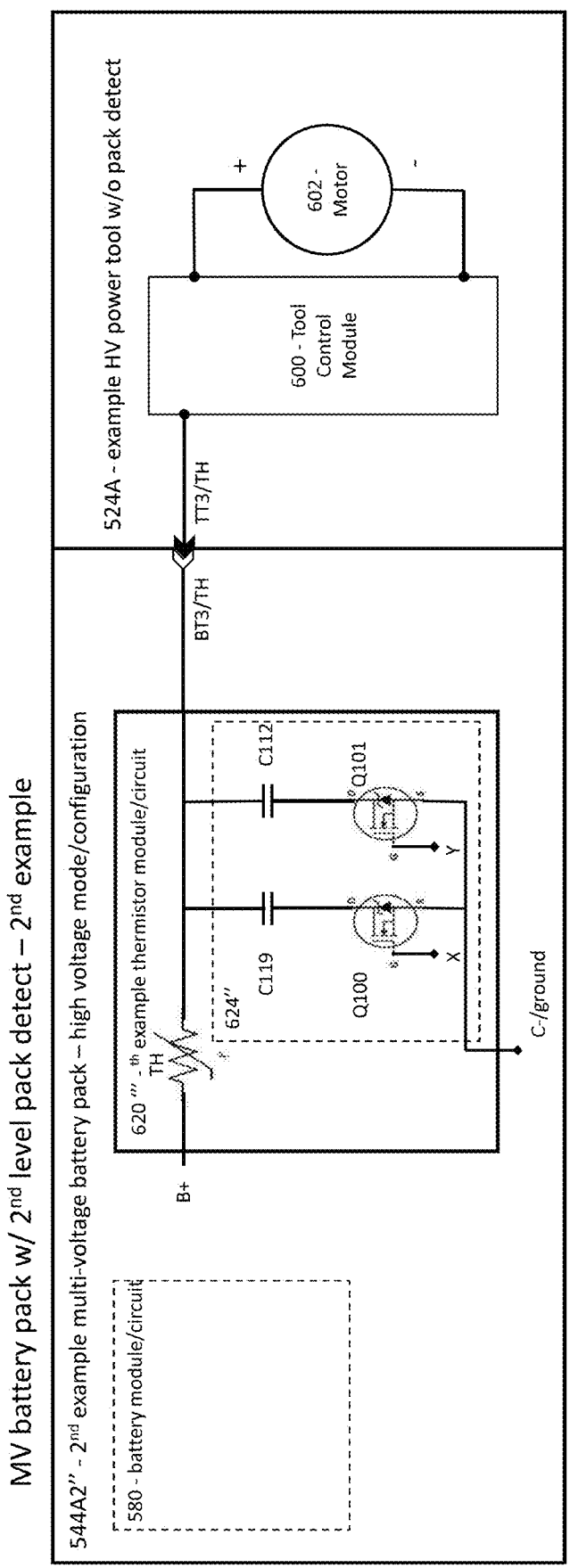
FIG. 67 is a simplified circuit diagram of an example multi-voltage battery pack with the alternative second level of pack detection circuitry mated to an example high voltage power tool without pack detection circuitry.

Referring to FIG. 67, there is illustrated an example multi-voltage battery pack 544A2", such as the battery pack illustrated in FIG. 46b, with the second example second level pack detect circuitry 624" mated to an example high voltage power tool 524A, such as the power tool illustrated in FIG. 45b, without pack detect circuitry. As illustrated in FIG. 67, because the example power tool 524A is a high voltage (e.g., 60 volt) power tool when the power tool 524A is mated to the example multi-voltage battery pack 544A2", the example multi-voltage battery pack 544A2" is in high voltage (e.g., 60 V) mode. When in high voltage mode, X is of a value such that Q100 is closed and Y is of a value such that Q101 is open so only C119 is in the circuit between terminal BT3/TH and C−/ground. The capacitance value of C119 indicates battery characteristics, for example, the number and manner in which the strings of cells are connected. Because the power tool 524A does not include pack detect circuitry, the tool control module/circuit 600 cannot (does not) monitor/sense the capacitance on the TH terminal to determine whether or not the battery pack is capable of meeting alternate motor output control characteristics/schemes. The power tool 524A has a standard default for conventional multi-voltage battery packs.

Figure 68:
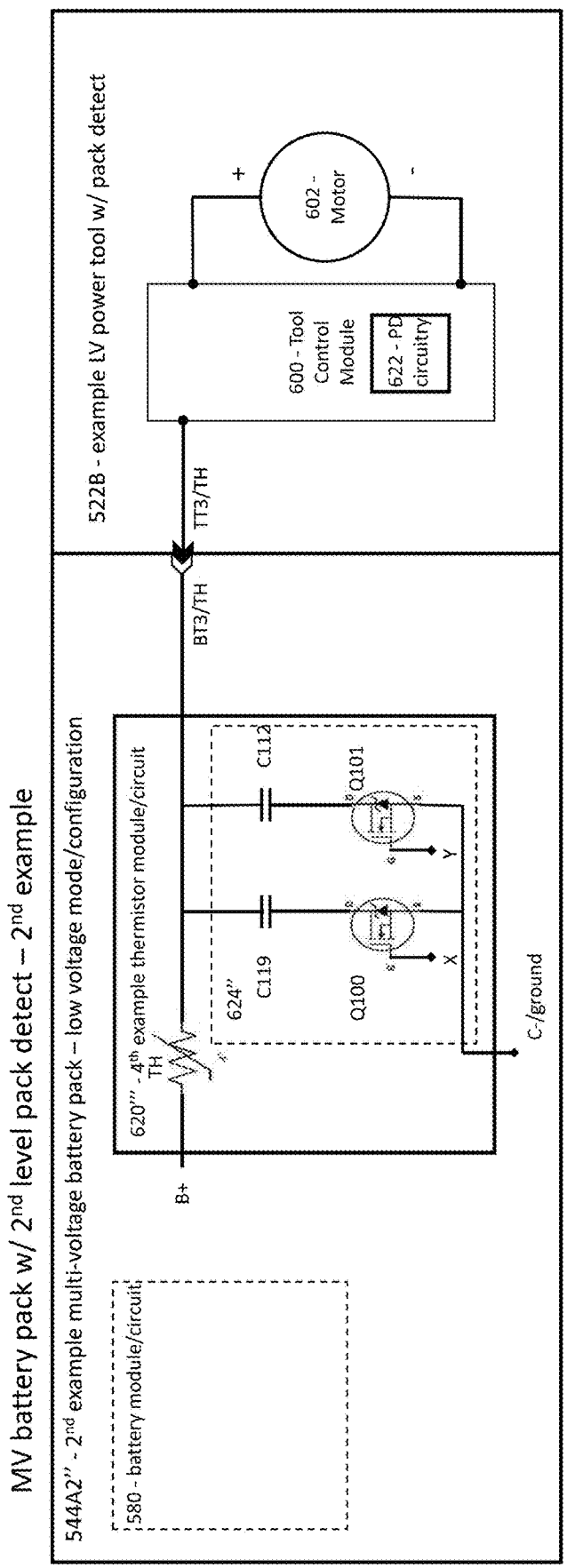
FIG. 68 is a simplified circuit diagram of an example multi-voltage battery pack with the alternative second level of pack detection circuitry mated to an example low voltage power tool with pack detection circuitry.

Referring to FIG. 68, there is illustrated an example multi-voltage battery pack 544A2", such as the battery pack illustrated in FIG. 46b, with the second example second level pack detect circuitry 624" mated to an example low voltage power tool 522B, such as the power tool illustrated in FIG. 45b, with pack detect circuitry 622. As illustrated in FIG. 68, because the example power tool 522B is a low voltage (e.g., 20 volt) power tool when the power tool 522B is mated to the example multi-voltage battery pack 544A2", the example multi-voltage battery pack 544A2" is in low voltage (e.g., 20 V) mode. When in low voltage mode, X is of a value such that Q100 is open and Y is of a value such that Q101 is closed. As such, only C112 is in the circuit between terminal BT3/TH and C−/ground. The capacitance value of C112 indicates battery characteristics, for example, the number and manner in which the strings of cells are connected. Because the example power tool 522B includes pack detect circuitry 622, the tool control module/circuit 600 monitors/senses the capacitance (capacitance value) on the TT3/TH terminal and adjusts the motor output scheme as the battery pack 544A2" is capable of meeting alternate (e.g., higher power) motor output control characteristics/schemes.

Figure 68A:
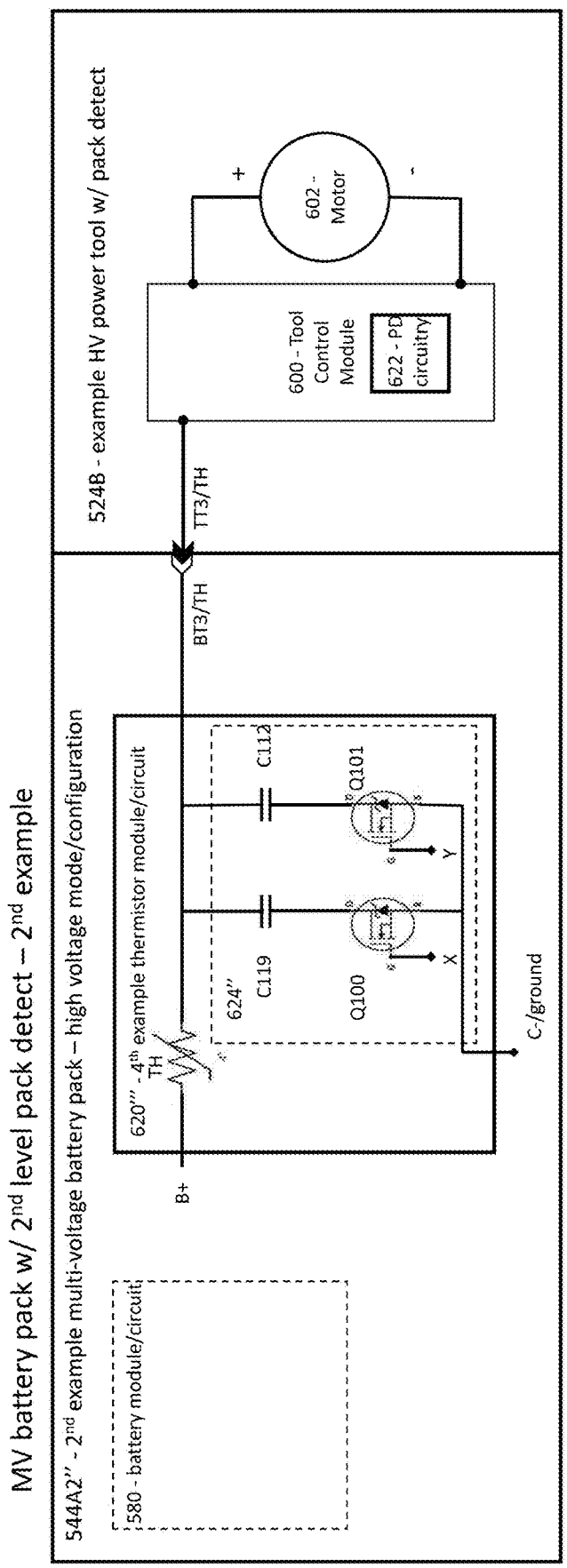
FIG. 68A is a simplified circuit diagram of an example multi-voltage battery pack with the alternative second level of pack detection circuitry mated to an example high voltage power tool with pack detection circuitry.

Referring to FIG. 68A, there is illustrated an example multi-voltage battery pack 544A2", such as the battery pack illustrated in FIG. 46b, with the second example second level pack detect circuitry 624" mated to an example high voltage power tool 524B, such as the power tool illustrated in FIG. 45b, with pack detect circuitry 622. As illustrated in FIG. 68A, because the example power tool 524B is a high voltage (e.g., 60 volt) power tool when the power tool 524B is mated to the example multi-voltage battery pack 544A2", the example multi-voltage battery pack 544A2" is in high voltage (e.g., 60 V) mode. When in high voltage mode, X is of a value such that Q100 is closed and Y is of a value such that Q101 is open. As such, only C119 is in the circuit between terminal BT3/TH and C−/ground. The capacitance value of C112 indicates battery characteristics, for example, the number and manner in which the strings of cells are connected. Because the example power tool 524B includes pack detect circuitry 622, the tool control module/circuit 600 monitors/senses the capacitance (capacitance value) on the TT3/TH terminal and adjusts the motor output scheme as the battery pack 544A2" is capable of meeting alternate (e.g., higher power) motor output control characteristics/schemes.

Alternately, referring to the FIGS. 66-68A and the example multi-voltage battery pack 544A2" illustrated therein, the example thermistor module/circuit 620''' may be configured such that (1) Q100 is open and Q101 is closed such that, of C112 and C119, only C112 is in the circuit between BT3/TH and relative ground when the multi-voltage battery pack 544A2" is coupled to a low voltage tool, (2) Q100 is closed and Q101 is open such that, of C112 and C119, only C119 is in the circuit between BT3/TH and relative ground when the multi-voltage battery pack 544A2" is coupled to a first example high voltage power tool and the example battery pack includes a first example battery module/circuit and (3) Q100 is closed and Q101 is closed such that, of C112 and C119, both C112 and C119 are in the circuit between BT3/TH and relative ground when the multi-voltage battery pack is coupled to a first example high voltage power tool and the example battery pack includes a second example battery module/circuit.

Numerous modifications may be made to the exemplary implementations described above. These and other implementations are within the scope of this application.

The invention claimed is:

1. A power tool system comprising:
a first power tool including a plurality of power tool terminals, a motor, a tool control module, the tool control module including circuitry to (1) monitor, sense and detect a capacitance value and a temperature value on a first one of the plurality of power tool terminals and (2) select a control scheme to control the motor based on the detected capacitance value; and
a multi-voltage battery pack including a plurality of battery pack terminals configured to mate with the plurality of power tool terminals, a thermistor coupled to a first one of the plurality battery pack terminals, the first one of the plurality of battery pack terminals configured to mate with the first one of the plurality of power tool terminals, additional circuitry coupled to the first one of the plurality of battery pack terminals configured to provide the capacitance value at the first one of the plurality of battery pack terminals indicative of characteristics of the multi-voltage battery pack.

2. The power tool system, as recited in claim 1, wherein the additional circuitry includes at least one capacitor connected between the first one of the plurality of battery pack terminals and a reference node.

3. The power tool system, as recited in claim 2, wherein the additional circuitry includes a switch connected in series with the at least one capacitor, the switch configured to alter the capacitance value at the first one of the plurality of battery pack terminals dependent upon a type of first power tool mated with the battery pack.

* * * * *